United States Patent
Gandhi et al.

(10) Patent No.: US 12,468,991 B2
(45) Date of Patent: *Nov. 11, 2025

(54) GAMING ENVIRONMENT MONITORING SYSTEM AND METHOD INVOLVING A GRAPHICAL REPRESENTATION

(71) Applicant: Tangam Gaming Inc., Waterloo (CA)

(72) Inventors: Maulin Gandhi, Kitchener (CA); Jason Jackson, Hamilton (CA); Philip Jones, Kitchener (CA); Rajasekhar Sappidi, Milton (CA); Prem Gururajan, Kitchener (CA)

(73) Assignee: Tangam Gaming Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,600

(22) Filed: Apr. 1, 2024

(65) Prior Publication Data

US 2025/0013954 A1 Jan. 9, 2025

Related U.S. Application Data

(63) Continuation of application No. 18/195,116, filed on May 9, 2023, now Pat. No. 11,948,108.

(51) Int. Cl.
*G06Q 10/06* (2023.01)
*G06Q 10/0631* (2023.01)
(Continued)

(52) U.S. Cl.
CPC . *G06Q 10/06312* (2013.01); *G06Q 10/06375* (2013.01); *G06Q 10/06393* (2013.01);
(Continued)

(58) Field of Classification Search
CPC .................................................. G06Q 10/06
See application file for complete search history.

(56) References Cited

U.S. PATENT DOCUMENTS 7,431,650 B2   10/2008   Kessman et al.
8,016,665 B2    9/2011   Gururajan et al.
(Continued)

FOREIGN PATENT DOCUMENTS

CA      2713064 C        5/2011
WO   WO-2007033195 A2 *  3/2007  ............. G07F 17/32

OTHER PUBLICATIONS

New BIS Safe Luxco S.À.R.L .; VizExpolrer; retrieved from the Internet on Sep. 30, 2021; <https://www.vizexplorer.com> (4 pages).
(Continued)

*Primary Examiner* — Kurtis Gills
(74) *Attorney, Agent, or Firm* — Barclay Damon LLP

(57) ABSTRACT

A gaming environment monitoring system and method includes or involves, in an embodiment, a data storage device having a plurality of instructions executable to direct one or more processors to access reference gaming deployment data. The reference gaming deployment data is related to one or more gaming units that have been operated in a plurality of subzones within one or more zones of a gaming environment. The one or more gaming units correspond to a reference gaming deployment in the gaming environment during a first period. The instructions are also executable to access changed gaming deployment data, which is related to at least one change to the reference gaming deployment. The at least one change has resulted in a changed gaming deployment that includes a set of a plurality of the subzones. The changed gaming deployment has been implemented in the gaming environment during a second period after the first period. The instructions are also executable to at least partially compare the changed gaming deployment data to the reference gaming deployment data, and the instructions are executable to perform a plurality of steps with respect to each of the subzones of the set. The steps include determining a first value related to the at least one change, wherein
(Continued)

the first value represents how many of the gaming units were moved to the subzone from any of the other subzones of the set, and the step includes determining a second value related to the at least one change, wherein the second value represents how many of the gaming units were moved away from the subzone to any of the other subzones of the set. The instructions are also executable to cause an output device to generate a graphical representation related to the set. The graphical representation includes a plurality of symbols, each of which represents one of the subzones of the set, and the graphical representation includes an indication of information that is at least partially derived from at least the first value or the second value.

20 Claims, 34 Drawing Sheets

(51) Int. Cl.
  *G06Q 10/0637* (2023.01)
  *G06Q 10/0639* (2023.01)
  *G07F 17/32* (2006.01)
  *G06Q 50/34* (2012.01)
(52) U.S. Cl.
  CPC ...... *G07F 17/3227* (2013.01); *G07F 17/3234* (2013.01); *G06Q 50/34* (2013.01)

(56) References Cited

U.S. PATENT DOCUMENTS

| | | | |
|---|---|---|---|
| 8,403,746 B2 | 3/2013 | Friedman et al. | |
| 8,512,146 B2 | 8/2013 | Gururajan et al. | |
| 9,280,866 B2 | 3/2016 | Nayak et al. | |
| 9,734,663 B2 | 8/2017 | Chun et al. | |
| 10,311,670 B2 | 6/2019 | Brahmandam et al. | |
| 10,885,748 B2 | 1/2021 | Nagaragatta et al. | |
| 11,948,108 B1 | 4/2024 | Gandhi et al. | |
| 2004/0166940 A1* | 8/2004 | Rothschild | G07F 17/32 463/42 |
| 2007/0271113 A1 | 11/2007 | Nelson et al. | |
| 2008/0248849 A1* | 10/2008 | Lutnick | G07F 17/323 463/16 |
| 2008/0261699 A1* | 10/2008 | Topham | G07F 17/32 463/42 |
| 2010/0228526 A1* | 9/2010 | Moore, III | G06Q 30/02 703/1 |
| 2011/0039610 A1* | 2/2011 | Baerlocher | G07F 17/3244 463/43 |
| 2011/0294575 A1 | 12/2011 | Morrow et al. | |
| 2013/0116032 A1* | 5/2013 | Lutnick | G07F 17/3276 463/25 |
| 2014/0073634 A1* | 3/2014 | Jones | A61K 31/541 544/131 |
| 2014/0315620 A1* | 10/2014 | Wells | G07F 9/009 463/20 |
| 2020/0090455 A1* | 3/2020 | Ambrecht | G07F 17/3218 |
| 2022/0370900 A1* | 11/2022 | Amaitis | G07F 17/3223 |

OTHER PUBLICATIONS

Wang et al.; Casino Technology: Player Tracking and Slot Accounting Systems; UNLV Gaming Research & Review Journal; vol. 6, Issue 1; on or before Dec. 31, 2001 (14 pages).
Tangam Systems; Tangam Information; dated On or before Jan. 5, 2021 (4 pages).
Quick Custom Intelligence LLC; One platform. One view. retrieved from the Internet <https://web.archive.org/web/20020201181504/https://quickcustomintelligence.com//>; Dec. 13, 2021 (2 pages).
VizExplorer; retrieved from the Internet <https://web.archive.org/web/20211225225723/https://www.vizexplorer.com/>; Jan. 4, 2022 (2 pages).
NQube; Above and Beyond; retrieved from the Internet <https://web.archive.org/web/20211219140233/https://www.nqube.com/>; Dec. 19, 2021 (8 pages).
Gaming Analytics.ai; retrieved from the Internet <https://web.archive.org/web/20220104155714/https://gaminganalytics.ai/>; Jan. 4, 2022 (3 pages).
ReelMetrics; Make Better slot Decisions; retrieved from the Internet <https://web.archive.org/web/20220116144407/https://www.reelmetrics.com/>; Dec. 22, 2021 (5 pages).
Eilers & Krejcik Gaming; retrieved from the Internet <https://web.archive.org/web/20211223211714/https://ekgamingllc.com/>; Dec. 23, 2021 (3 pages).
Slotfocus; retrieved from the Internet <https://web.archive.org/web/20220407190720/https://slotfocus.com/>; Dec. 25, 2021 (4 pages).
Tangam Systems; Tangam TYM; dated On or before Dec. 31, 2020 (4 pages).
Tangam Systems; Tangam Website; retrieved from the Internet <https://web.archive.org/web/20201127075831/https://www.tangamsystems.com/>; Nov. 27, 2021 (11 pages).
Tangam Systems; Baccarat Revenue Management, Yield-management strategies to drive Baccarat performance; Nov. 27, 2021 (12 pages).
Elwha Webpages; https://web.archive.org/web/20211018135810/https://www.ngube.com/success-stories; Elwha River Casino Case Study; Dated: Oct. 18, 2021.
Gandhi et al., Tangam Technologies Inc., U.S. Appl. No. 17/569,848, filed Jan. 6, 2022.

* cited by examiner

FIG. 16

| | | Net Theo. Impact /change/month | Change Type(s) | Change Reason(s) | Change Date Range |
|---|---|---|---|---|---|
| > Comments | | $38 K | Product Change | Swap Machine | May 12, 2021- May 14, 2021 |
| > Change Type | | $25 K | Product Change | Swap Machine | Feb 16, 2021- Feb 18, 2021 |
| > Reason Type | | $12 K | Product Change | Swap Machine | Mar 2, 2021- Mar 4, 2021 |
| > GameType | | $10 K | Product Change | Swap Machine | Mar 23, 2021- Mar 25, 2021 |
| > Status | | $6.1 K | Product Change | Swap Machine | Jan 31, 2021- Feb 3, 2021 |
| > Zone | | $5.8 K | Layout Change | Add Location | Mar 8, 2021- Mar 10, 2021 |
| > Subzone | | $5.8 K | Product Change | Swap Machine | Mar 9, 2021- Mar 11, 2021 |

FIG. 17A

| Zone, Subzone | Net Theo. Contribution PMPD Change; Performance KPIs | After Change Manufacturer, Cabinet, Status, Game Titles | Before Change Manufacturer, Cabinet, Status, Game Titles |
|---|---|---|---|
| B B-39 | Subzone: +323%<br>Zone: -9%<br>Casino: -7%<br>Util: +49%<br>Units: No change | $1.7K<br>$453<br>$348<br>55%<br>2 | SCIENTIFIC GAMES, J43<br>*OWNER.LEASED*<br><br>*Ultimate Fire Link Power 4* | SCIENTIFIC GAMES, J43<br>*OWNER.LEASED*<br><br>*Heidi's Bier Haus* |
| C C-22 | Subzone: +141%<br>Zone: +31%<br>Casino: +30%<br>Util: +126%<br>Units: No change | $1.3K<br>$481<br>$378<br>43%<br>3 | KONAMI, CONCERTO OPUS<br>*OWNER.LEASED*<br><br>*Hao Yun Lai, Treasure Lounge* | KONAMI, CONCERTO OPUS<br>*OWNER.LEASED*<br><br>*Dragon's Law Multigame* |
| C C-03 | Subzone: +71%<br>Zone: +27%<br>Casino: +29%<br>Util: +71%<br>Units: No change | $591<br>$500<br>$393<br>29%<br>10 | IGT, CRYSTAL CURVE◇ S3000<br>*OWNER.CASINO.OWNED, OWNER.LEASED*<br><br>*Dragon Lights Mystic Falls, Dragon Lights Secret Fortress, Gold Bar 7's 3R27L, Red Hot Tamales 3R27L, Zodiac Lion* | IGT, CRYSTAL CURVE◇ S3000<br>*OWNER.CASINO.OWNED, OWNER.LEASED*<br><br>*Gold Bar 7's 3R27L, Mistress of Egypt Grand Red Hot Tamales 3R27L, Zodiac Lion* |
| C C-35 | Subzone: +22%<br>Zone: +6%<br>Casino: +4%<br>Util: +28%<br>Units: No change | $728<br>$492<br>$381<br>29%<br>7 | IGT, KONAMI CRYSTAL CURVE◇ KX43<br>*OWNER.CASINO.OWNED*<br><br>*Diamond Trails Ocean Winnings, Diamond Trails Safari Winnings, Fortune Charm, Golden Egypt Grand, Golden Jungle Grand* | IGT, KONAMI CRYSTAL CURVE◇ KX43<br>*OWNER.CASINO.OWNED*<br><br>*5 Elemental Legends, Fortune Charm, Golden Egypt Grand, Golden Jungle Grand, Lion Carnival...* |

FIG. 17B

| | | | |
|---|---|---|---|
| B B-14 | Subzone: +32%<br>Zone: +21%<br>Casino: +19%<br>Util: +45%<br>Units: No change | $519<br>$435<br>$346<br><br>8 | IGT, GK19 UR<br>OWNER:CASINO:OWNED<br><br>Carnival Of Mystery, Cleopatra II,<br>Davinci Diamonds, Nefertiti,<br>Pharaohs Fortune... | IGT, GK19 UR<br>OWNER:CASINO:OWNED<br><br>Carnival Of Mystery, Cleopatra II,<br>Davinci Diamonds, Nefertiti,<br>Pharaohs Fortune... |
| B B-03 | Subzone: -<br>Zone: +31%<br>Casino: +23%<br>Util: -<br>Units: +6 | $1.1K<br>$523<br>$395<br><br>63%<br>6 | SCIENTIFIC GAMES, KASCADA K43<br>OWNER:CASINO:OWNED<br><br>Hurricane Horse - Coin Combo | |
| C C-32 | Subzone: +21%<br>Zone: +24%<br>Casino: +23%<br>Util: +57%<br>Units: No change | $759<br>$507<br>$396<br><br>33%<br>8 | SCIENTIFIC GAMES, TWINSTAR<br>MATRIX, WAVE XL<br>OWNER:CASINO:OWNED<br><br>Dragons Wealth, Fortune Age<br>Deluxe, Lobster Bay Kraken<br>Unleashed, Quick Hit Blitz Red,<br>Quick Hits Blitz Blue ... | SCIENTIFIC GAMES, TWINSTAR<br>MATRIX, WAVE XL<br>OWNER:CASINO:OWNED<br><br>Dragons Wealth, Fortune Age<br>Deluxe, Power Strike Golden<br>Scarab, Power Strike Spirit Hawk,<br>Quick Hit Blitz Red ... |

| Compare Changes Across Locations | After | Before | Difference |
|---|---|---|---|
| B-39-01 ✱ | | | |
| Swap Machine (May 13, 2021) | | | ☐ Expand All Dimensions |
| Game Title | Ultimate Fire Link Power 4 | Heidis Bier Haus | |
| Machine | 32463 | 30009 | |
| LASTACTIVEDATE | 6/7/2021 | 5/12/2021 | |
| LINKED JACKPOT | 1 | 0 | |
| Average Utilization | 57% | 36% | +58% |
| Peak-time Avg Utilization | 59% | 50% | +18% |
| Theo Win (PMPD) | $2.36 K | $553 | +327% |
| Net Theo Contribution (PMPD) | $1.9 K | $360.5 | +429% |
| B-39-02 ✱ | | | |
| Swap Machine (May 13, 2021) | After | Before | Difference |
| Game Title | Ultimate Fire Link Power 4 | Heidis Bier Haus | |
| Machine | 32464 | 30010 | |
| LASTACTIVEDATE | 6/7/2021 | 5/12/2021 | |
| LINKED JACKPOT | 1 | 0 | |
| Average Utilization | 53% | 38% | +39% |
| Peak-time Avg Utilization | 60% | 48% | +25% |
| Theo Win (PMPD) | $2.13 K | $658.6 | +224% |
| Net Theo Contribution (PMPD) | $1.59 K | $463.5 | +242% |

Comments

Start typing here to add a new comment

Add Comment

FIG. 25

Specific Location Change — B-14-06* Swap Machine (Feb 2, 2021) — Change Reason

361 — Location Change Summary — Augmented with KPIs

| | After | Before | Difference |
|---|---|---|---|
| Game Title | Pharaohs Fortune | Nefertiti | |
| Machine | 32412 | 30378 | |
| LASTACTIVEDATE | 6/7/2021 | 2/1/2021 | |
| Average Utilization | 24% | 2% | +1,100% |
| Peak-time Avg Utilization | 40% | 14% | +186% |
| Theo Win (PMPD) | $629.1 | $86.05 | +631% |
| Net Theo Contribution (PMPD) | $522.1 | $77.67 | +572% |

| Change Date Range<br>Jan 31, 2021 - Feb 3, 2021 | Zone<br>B | Subzone<br>B-14 | | | |
|---|---|---|---|---|---|
| Net Theo. Impact/Change/Month<br>$6.1 K / Month | After Change<br>42 day(s) | Before Change<br>42 day(s) | | | |
| | | | | Normalized Difference | |
| Machine Performance | | | Subzone | Zone | Casino |
| Average Utilization | 16% | 0.62x ⊙ 11% | 0.50x ⊙ +45% | +21% | +18% |
| Peak-time Avg Utilization | 57% | 1.46x ⊙ 46% | 1.28x ⊙ +24% | +11% | +14% |
| Net Theo Contribution (PMPD) | $519.1 | 1.19x ⊙ $392.9 | 1.06x ⊙ +32% | +21% | +19% |
| Theo Win (PMPD) | $622.2 | 1.12x ⊙ $466.3 | 0.99x ⊙ +33% | +22% | +20% |
| Win (PMPD) | $673.2 | 1.26x ⊙ $466.1 | 1.00x ⊙ +44% | +18% | +18% |
| Machine Count | 8 | 8 | | | |
| Denomination(s) | 0.01 | 0.01 | | | |
| AvgWager | $2.86 | $3.15 | | | |
| Handle Pulls (PMPD) | 2.46 K | 1.67 K | | | |
| Handle (PMPD) | $6.41 K | $4.8 K | | | |
| Theo Hold | 10% | 10% | | | |
| Median Pulls (PM) | 11.12 | 11.32 | | | |
| Machine Days | 336 | 336 | | | |
| Compare Changes Across Locations | | ☐ Expand All Dimensions ☐ Show All Locations | | | |
| B-14-06 *<br>Swap Machine (Feb 2, 2021) | After | Before | | Difference | |
| Game Title | Pharaohs Fortune | Nefertiti | | | |
| Machine | 32412 | 30378 | | | |
| LASTACTIVEDATE | 8/7/2021 | 2/1/2021 | | | |
| Average Utilization | 24% | 2% | | +1,100% | |
| Peak-time Avg Utilization | 40% | 14% | | +186% | |
| Theo Win (PMPD) | $629.1 | $86.05 | | +631% | |
| Net Theo Contribution (PMPD) | $522.1 | $77.67 | | +572% | |

FIG. 31

| Theo Net Contribution | Before | After |
|---|---|---|
| Casino Avg Machine Count Per Day: | 1,371.1 | 1,376.33 |
| Casino Per Week: | $2.8 M | $3.33 M |
| Casino Per Week Ratio (After / Before): | --- | 1.19 |
| Bank Avg Machine Count Per Day: | 8 | 8 |
| Bank Per Week: | $22 K | $29.07 K |
| Bank Expected Per Week: | --- | $26.23 K |
| Bank Loss Per Machine Per Week: | --- | -$355.3 |
| Bank Loss Weight: | --- | 2 |
| Estimated Bank Loss To A Location: | --- | -$710.6 |
| Zone Avg Machine Count Per Day: | 328.67 | 337.64 |
| Zone Per Week: | $852.6 K | $1.03 M |
| Zone Expected Per Week: | --- | $1.02 M |
| Zone Loss Per Machine Per Week: | --- | -$37.22 |
| Zone Loss Weight: | --- | 2.11 |
| Estimated Zone Loss Into Bank: | --- | -$78.54 |

GAMING ENVIRONMENT MONITORING SYSTEM AND METHOD INVOLVING A GRAPHICAL REPRESENTATION

CROSS-REFERENCE TO RELATED APPLICATION

This application is a continuation of, and claims the benefit and priority of, U.S. patent application Ser. No. 18/195,116, filed on May 9, 2023. The entire contents of such application are hereby incorporated herein by reference.

INCORPORATION BY REFERENCE

The entire contents of the following application are hereby incorporated into this application by reference: U.S. patent application Ser. No. 17/569,848, filed on Jan. 6, 2022.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Various types of facilities have gaming areas where customers may play various types of gaming devices. For example, casinos have spaces with slot machines and wagering tables. Larger facilities can have hundreds of gaming devices on a floor. Some of the gaming devices on a floor may be popular, while others may be unpopular or underused. The unpopular gaming devices decrease the entertainment available to players and have a negative impact on the facility's business.

Many factors can contribute to the profitability of a gaming device to a facility's business. Not all of the factors are readily apparent. For example, an unpopular gaming device's titled game could be outdated, lacking the exciting, engaging features as other titled games. On the other hand, an unpopular gaming device could be hampered by the presence of a nearby restroom or a glare caused by ceiling lighting.

For profitability and other reasons, facilities periodically make changes to their gaming floors, such as changes in the arrangements of gaming devices, removing, adding or swapping gaming devices, or changing the games run by the deployed gaming devices. With this many types of changes and the relatively high number of gaming devices on a floor, it can be cumbersome, time-consuming and difficult for facilities to determine, assess and understand the effects of their gaming floor changes.

The foregoing background describes some, but not necessarily all, of the problems, disadvantages and shortcomings related to managing the deployment of gaming devices.

SUMMARY

In an embodiment, a change monitoring system includes a data storage device having a plurality of instructions that are executable to direct at least one processor to access reference gaming deployment data based on an electronic communication between the at least one processor and a gaming management processor associated with a facility. The reference gaming deployment data is related to a subzone of a plurality of subzones within a plurality of zones of a gaming floor of the facility. The reference gaming deployment data is related to one or more gaming units that have been operated in the subzone during a first period of time. The one or more gaming units correspond to a reference gaming deployment in the subzone during the first period. The instructions are executable to direct the at least one processor to determine or access change data based on the electronic communication. The change data is associated with at least one change to the reference gaming deployment. The instructions are executable to direct the at least one processor to access changed gaming deployment data based on the electronic communication. The changed gaming deployment data is related to the subzone. The changed gaming deployment data is also related to a changed gaming deployment caused by the at least one change. The changed gaming deployment was implemented during a second period of time after the first period. The instructions are executable to direct the at least one processor to: receive an inquiry that specifies an analysis date range; determine an assumed downtime period related to the changed gaming deployment, wherein the assumed downtime period depends, at least partially, on the changed gaming deployment data; determine an analysis period that depends on the assumed downtime period; determine whether the at least one change passes a relevancy test; and in response to the inquiry and the at least one change passing the relevancy test, at least partially compare the changed gaming deployment data to the reference gaming deployment data, and process a plurality of factors to determine an output related to the at least one change. The factors include: a contribution benchmark factor that represents a relationship between a first contribution of the reference gaming deployment and a second contribution of the changed gaming deployment; an adjustment factor that represents any contribution loss that is related to one of: (a) a first loss in contribution related to any of the gaming units of the reference gaming deployment that has been removed due to the at least one change; or (b) a second loss in contribution related to any part of the gaming floor other than the subzone; a cost factor that represents a cost. The cost includes one of: (a) a first cost of operating the reference gaming deployment; (b) a second cost of operating the changed gaming deployment; or (c) a relationship between the first and second costs. The instructions are executable to direct the at least one processor to cause an output device to generate the output, wherein the output depends, at least partially, on the determination of the analysis period.

In another embodiment, a change monitoring system includes a data storage device having a plurality of instructions executable to direct at least one processor to access reference gaming deployment data based on an electronic communication between the at least one processor and at least one other processor that is associated with a gaming environment. The reference gaming deployment data is related to one or more gaming units that have been operated in the gaming environment during a first period of time. The one or more gaming units correspond to a reference gaming deployment in the gaming environment during the first period. The instructions executable to direct the at least one processor to access changed gaming deployment data based on the electronic communication with the at least one other processor. The changed gaming deployment data is related to at least one change to the reference gaming deployment.

The at least one change has resulted in a changed gaming deployment. The changed gaming deployment has been implemented during a second period of time after the first period. The instructions executable to direct the at least one processor to: at least partially compare the changed gaming deployment data to the reference gaming deployment data; process a contribution benchmark factor that represents a relationship between a first contribution of the reference gaming deployment and a second contribution of the changed gaming deployment; determine an output depending upon the processing of the contribution benchmark factor; and cause an output device to generate the output.

In yet another embodiment, a method for operating a change monitoring system includes a plurality of steps. The steps include executing a plurality of instructions to direct one or more processors to access reference gaming deployment data based on an electronic communication between a processor associated with a gaming environment and the one or more processors. The reference gaming deployment data is related to one or more gaming units that have been operated in the gaming environment during a first period of time. The one or more gaming units correspond to a reference gaming deployment in the gaming environment during the first period. The steps include executing the instructions to direct the one or more processors to access changed gaming deployment data based on the electronic communication with the processor. The changed gaming deployment data is related to at least one change to the reference gaming deployment. The at least one change has resulted in a changed gaming deployment. The changed gaming deployment has been implemented during a second period of time after the first period. The steps include executing the instructions to direct the one or more processors to: at least partially compare the changed gaming deployment data to the reference gaming deployment data; process a contribution benchmark factor that represents a relationship between a first contribution of the reference gaming deployment and a second contribution of the changed gaming deployment; determine an output depending upon the processing of the contribution benchmark factor; and cause an output device to generate the output.

Additional features and advantages of the present disclosure are described in, and will be apparent from, the following Brief Description of the Drawings and Detailed Description.

BRIEF DESCRIPTION OF THE DRAWINGS

FIG. 16 is an enlarged, top view of an example of a first section of the change summary dashboard of FIG. 15.

FIG. 17A is an upper part of an enlarged, top view of an example of a second section of the change summary dashboard of FIG. 15.

FIG. 17B is a lower part of an enlarged, top view of an example of a second section of the change summary dashboard of FIG. 15.

FIG. 19 is a top view of an example of an embodiment of an interface configured to display, in comparative fashion, changes across locations, such interface being generated through execution of the graphic generator of the change monitoring system.

FIG. 25 is an enlarged, top view of an example of a section of the interface of FIG. 22, such section displaying a comparison of changes across locations.

FIG. 28 is a top view of an example of another embodiment of an interface configured to display output (including estimated impact value) related to a gaming deployment change, such interface being generated through execution of the graphic generator of the change monitoring system.

FIG. 31 is a table that displays output (including theo net contribution) related to the gaming deployment change illustrated in FIG. 29, such table being generated through execution of the graphic generator of the change monitoring system.

DETAILED DESCRIPTION

Throughout this disclosure set forth herein, the word "including" indicates or means "including, without limitation," the word "includes" indicates or means "includes, without limitation," the phrases "such as" and "e.g." indicate or mean "including, without limitation," and the phrase "for example" refers to a non-limiting example.

Figure 1:
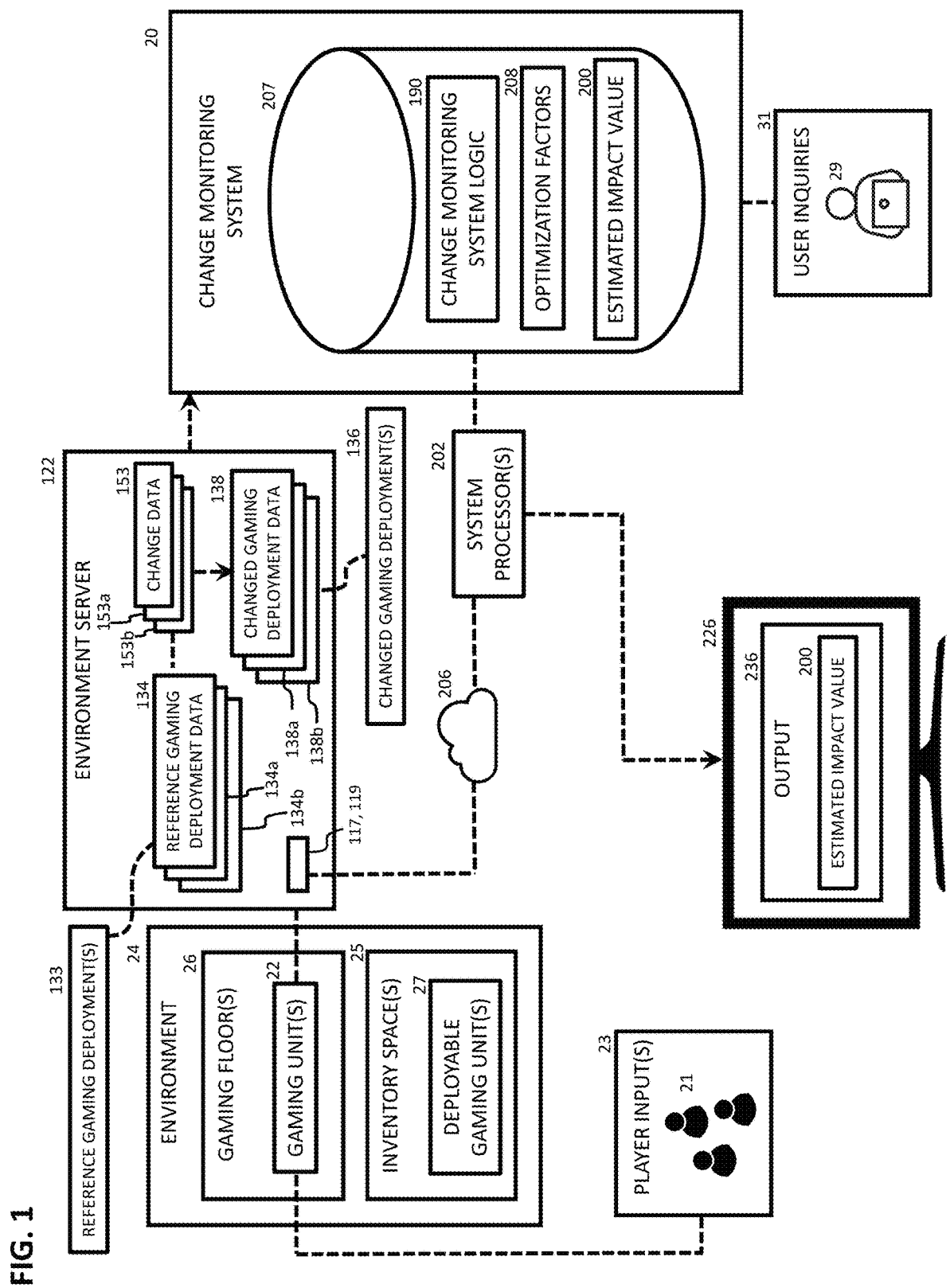
FIG. 1 is a schematic diagram illustrating an embodiment of the change monitoring system as operatively coupled to an example data architecture, illustrating the data flows related to such embodiment, including the electronic connectivity of the change monitoring system to the environment server.

Referring to FIG. 1, in an embodiment, the change monitoring system 20 is configured to automatically monitor the changes that an environment operator implements in the operator's deployments of gaming units in an environment 24. As described below, the change monitoring system 20 can automatically detect the changes and provide meaningful output 236 related to the changes. Therefore, the change monitoring system 20 can have the role, function and structure as an analyzer, detector, comparator or evaluator.

Depending upon the embodiment, the environment 24 can be a facility, vehicle or outdoor area where wagering is permitted, such as a casino building, an airport, a floating casino, a gambling ship, or any other physical wagering site. The environment operator can be the owner, operator, lessee or manager of the environment 24.

In an embodiment, the environment 24 has one or more walking surfaces, standing surfaces or gaming floors 26 where the gaming units 22 are located. In some cases, gaming units 22 may be mountable to walls or structures other than walking or standing surfaces. Therefore, it should be appreciated that a gaming floor 26 can include any surface or structure where any gaming unit 22 may be located, positioned or mounted, including any gaming site, gaming platform, gaming station or gaming unit support surface.

As described below, the environment operator has deployed the gaming units 22 to one or more gaming floors 26, where the gaming units 22 have been used by players 21. In use, the players 21 provide or submit player inputs 23 to play the gaming units 22. The player inputs 23 include money or monetary value in physical or digital form, provided by the players 21. Also, the player inputs 23 can include game play actions, such as presses of play buttons, betting buttons and manipulation of other input devices of the gaming units 22.

In an embodiment, the environment operator directly or indirectly controls, manages or uses one or more servers, such as the environment server 122. Depending upon the embodiment, each such server (including environment server 122) can include one or more data processors 117 and one or more data storage devices (or memory devices) that are operatively coupled to the one or more data processors. The environment server 122 is used by the environment operator to manage, control or monitor the gaming units 22. In an embodiment, the environment server 122 includes a facility server having at least one gaming management processor 119 that is electronically coupled to the gaming units 22. Depending upon the embodiment, the environment server 122 and facility server can be physically located at the environment 24 or facility, or the environment server 122 and facility server can be located at a site, data center or building away from the environment 24 or facility.

Also, as described further below, the environment operator can authorize or direct one more users, such as user 29, to provide or submit user requests or user inquiries 31 to the change monitoring system 20. The users can include agents or employees of the environment operator, or agents or employees of the operator's affiliates, contractors, subcontractors or implementers, including entities that render services to the environment operator.

In addition to the gaming floors 26, the environment 24 can include or be associated with one or more inventory spaces 25. The inventory spaces 25 can include a warehouse, storage room, dock area, goods-receiving area or logistics space where the environment operator receives or stores one or more deployable gaming units 27. The deployable gaming units 27 can be retrieved from the environment operator's warehouse, or the deployable gaming units 27 can be retrieved directly from the environment operator's dock area before being moved to the warehouse. The deployable gaming units 27 can be new or refurbished gaming units procured by the environment operator for future deployment to the gaming floors 26.

Depending upon the embodiment, the gaming units 22 can include player-operable devices that are operable by players without relying on a human dealer, such as video slot machines having video reels simulated to rotate, mechanical slot machines having rotating, mechanical reels, and devices and tables that operate various types of wager games, such as video roulette and video card games. Gaming units 22 can also include dealer-operable tables managed by a human dealer, such as baccarat, craps and blackjack tables.

Figure 2:
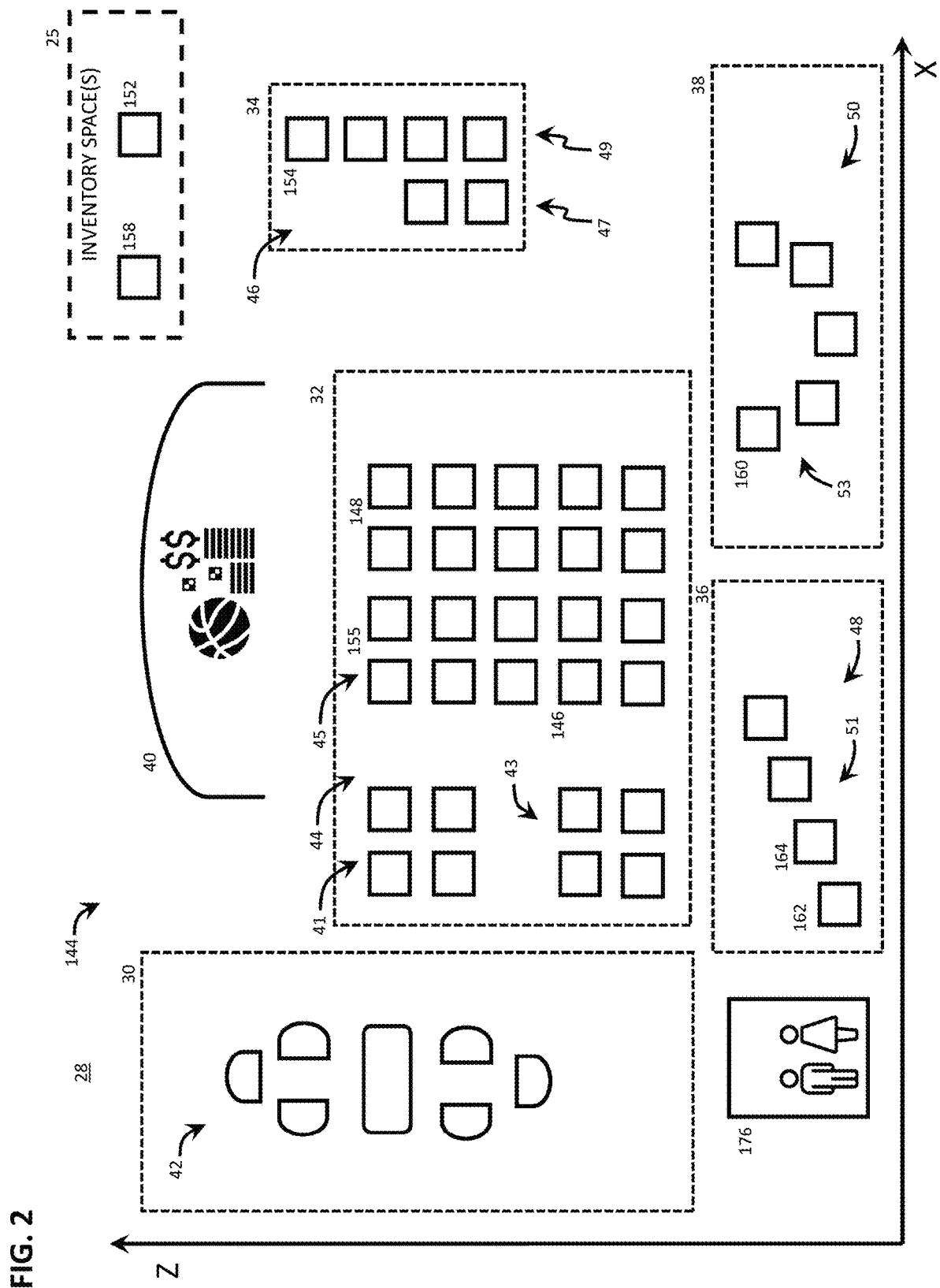
FIG. 2 is an example of a top view of a floor of an environment having a reference gaming deployment.

In an example illustrated in FIG. 2, a gaming floor 28 is divided into a plurality of zones 30, 32, 34, 36, 38, 40. Each zone 30, 32, 34, 36, 38, 40 is a specified area on gaming floor 28 which is not necessarily marked or depicted to the players. Zone 30 has a plurality of gaming units 42, which, in this case, are dealer-operable tables. Zone 32 has a plurality of gaming units 44, which, in this case, are player-operable devices, zone 34 has a plurality of gaming units 46, which, in this case, are player-operable devices, zone 36 has a plurality of gaming units 48, which, in this case, are player-operable devices, zone 38 has a plurality of gaming units 50, which, in this case, are player-operable devices, and zone 40 has a sports betting space where relatively large display screens (not shown) display sports events.

In the example illustrated in FIG. 2, zone 32 has a plurality of banks, cluster areas or subzones 41, 43, 45, zone 34 has a plurality of banks, cluster areas or subzones 47, 49, zone 36 has a bank, cluster area or subzone 51, and zone 36 has a bank, cluster area or subzone 53. A plurality of gaming units 22 are clustered together within each subzone 41, 43, 45, 47, 49, 51 and 53. In an embodiment, the clustered gaming units 22 are associated with a common theme or a common featured game, or are part of a featured game family, as described below. For example, the four gaming units 22 in subzone 41 can be Lord of the Rings™ video slot machines, and the five gaming units 22 in subzone 53 can be Motor Harley-Davidson Cycles™ video slot machines.

Figure 3:
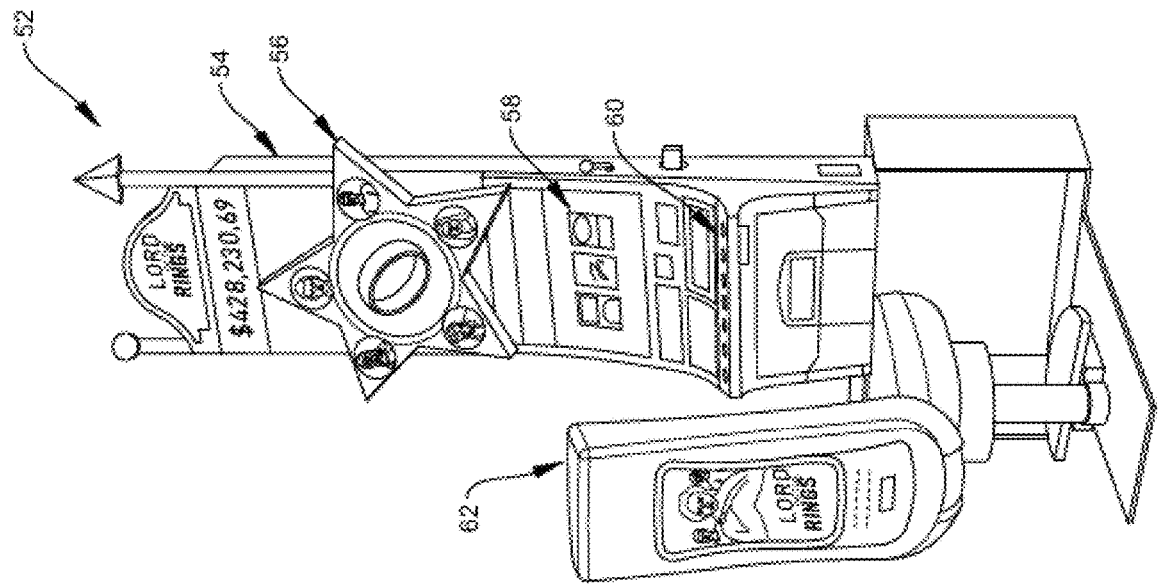
FIG. 3 is an isometric view of an embodiment of a gaming unit.

The gaming units 44, 46, 48, 50 on the gaming floor 28 can vary by type, form factor and style. For example, as shown in FIG. 3, the gaming units 44, 46, 48, 50 can include a video slot machine 52 having: (a) a cabinet 54 having a medieval age artistic design and shape; (b) an upper display device 56 generating graphics and attractive animations; (c) a lower display device 58 generating rotating video reels; (d) a plurality of player input devices 60, including a wager receiver or payment receiver; (e) a chair or seat 62; and (f) the hardware (including control board and processors), software, components, features and functions of a commercially-available video slot machine.

Figure 4:
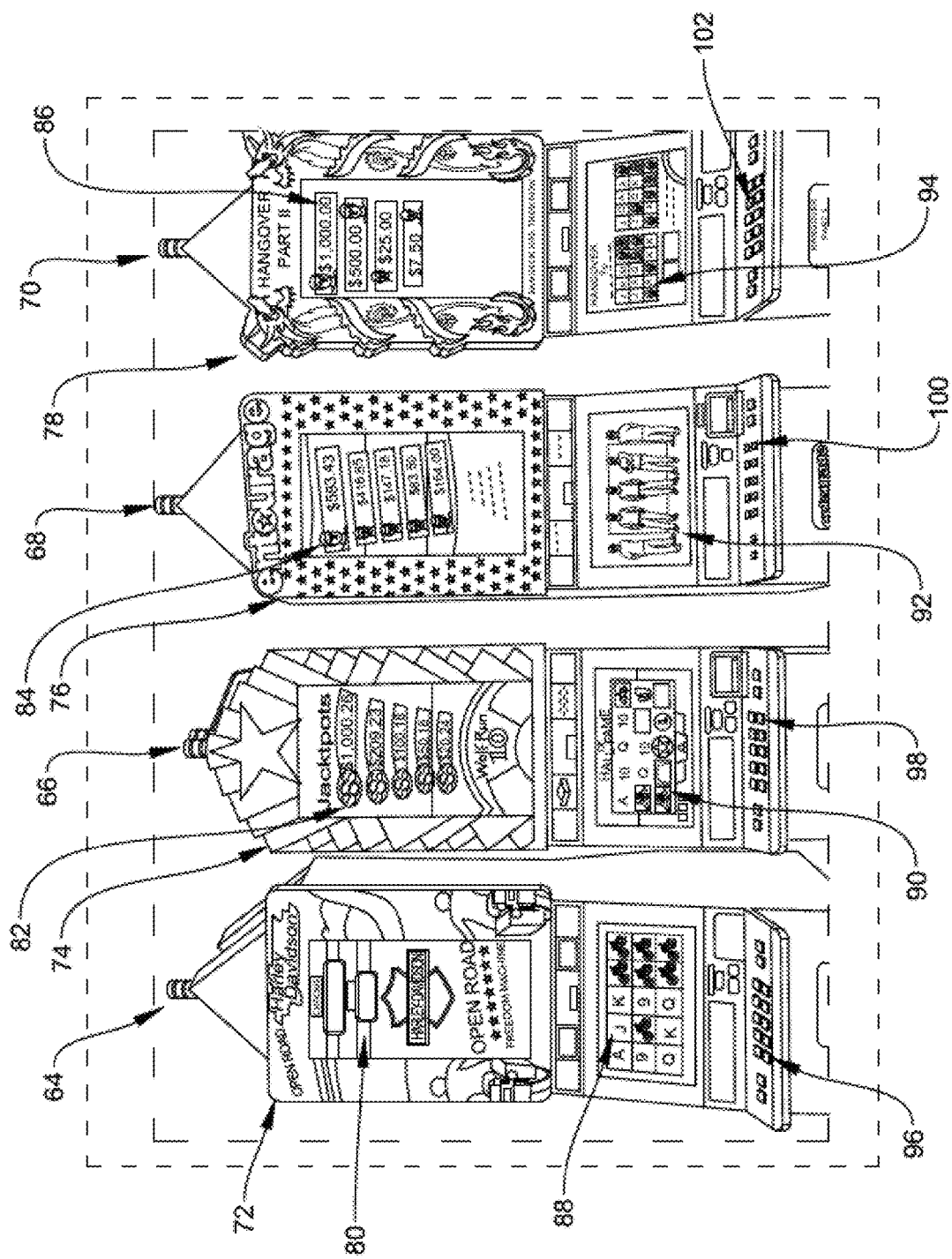
FIG. 4 is a front isometric view of an embodiment of a cluster of gaming units.

In other examples shown in FIG. 4, the gaming units 44, 46, 48, 50 can include the differently-shaped video slot machines 64, 66, 68, 70 having: (a) cabinets 72, 74, 76, 78, respectively, having different artistic designs and shapes; (b) upper display devices 80, 82, 84, 86, respectively, generating different types of graphics and attractive animations; (c) lower display devices 88, 90, 92, 94, respectively, generating different types or styles of rotating video reels; (d) player input device sets 96, 98, 100, 102, respectively, each of which includes a wager receiver or payment receiver; (e) chairs or seats (not shown); and (f) the hardware (including control board and processors) software, components, features and functions of a commercially-available video slot machine.

Over a period of time, the players' use of the gaming units 22 on the gaming floor 28 (including gaming units 44, 46, 48, 50) can vary from gaming unit 22 to gaming unit 22. For example, one of the gaming units 44 in zone 32 can have a relatively high utilization by players, and one of the gaming units 46 in zone 34 can have a relatively low utilization by players. A gaming unit 22 having a relatively low utilization can be described as an underperforming gaming unit 22. A gaming unit 22 having a relatively high utilization can be described as an overperforming gaming unit 22. Underperforming gaming units 22 can decrease the environment operator's profit level, and overperforming gaming unit 22 can increase the environment operator's profit level.

In an embodiment, to play the gaming units 22, players 21 contribute or input money (or monetary value) into the wager receivers of the gaming units 22 through use of a prepaid player card, prepaid ticket, payment card, electronic wallet or purse, cash or other methods. Alternatively, players 21 can contribute or input money (or monetary value) to a person (e.g., a human dealer) who manages the play of the gaming units 22. Each gaming unit 22 provides a player 21 with the opportunity to win a payout based on the wager the player 21 inputs. The probability of a win is based on the payout percentage (also known as a return to player (RTP) percentage) that is implemented by the environment operator. Depending upon the embodiment, the payout percentage can range from eighty percent (80%) to ninety-five percent (95%). If the payout percentage for a gaming unit 22 is, for example, eighty-five percent (85%), the gaming unit 22 can, on average, return or payout to players eighty-five percent (85%) of the collection received by the gaming unit 22.

The collection or handle includes or refers to the amount of money received by the environment operator in consideration for enabling players to play one or more gaming units 22 during a period of time.

The contribution or win includes or refers to the collection less the payout paid to players of one or more gaming units 22 during a period of time.

The net contribution includes or refers to the contribution less the costs incurred by the environment operator that relates to the one or more gaming units 22 involved in the contribution. The costs can include expenses incurred by the environment operator related to one or more gaming units 22, including: (a) any free play amount (money credited or given to the player); (b) any compensation owed to the player(s) (e.g., the value of free, complimentary accommodations, products or services, such as free drinks, meals, parking, etc.); (c) any taxes; and (d) any fees incurred by the environment operator, such as lease fees as well as revenue sharing and royalties payable to affiliates. In an embodiment, the net contribution is calculated as follows: (win−freeplay)×(1−tax %−comp %)−fees.

The term theoretical or theo, as used herein, indicates that the relevant metric or piece of output 236 is estimated, assumed, expected or anticipated based on the change monitoring system logic 207 and one or more assumptions related thereto.

The gaming units 22 can operate to generate different levels of contributions relative to a per-gaming unit average of the contributions of all of the gaming units 22 on the gaming floor 28. These collection levels can include: (a) an overperformance level that is above the per-gaming unit average, which can result from relatively high levels of wagers or relatively high frequency of wagers; (b) a first underperformance level that is below the per-gaming unit average; and (c) a second underperformance level that is below the first underpeformance level and is also the lowest of all of the contributions of all of the gaming units 22 on the gaming floor 28.

There can be a variety of reasons why a gaming unit 22 is underperforming. For example, the reasons can include: (a) the design of the featured game failing to invoke sufficient thrill and excitement; (b) the chair of the gaming unit 22 being uncomfortable; or (c) the location of the gaming unit 22 being near a glaring light or a restroom.

Figure 5:
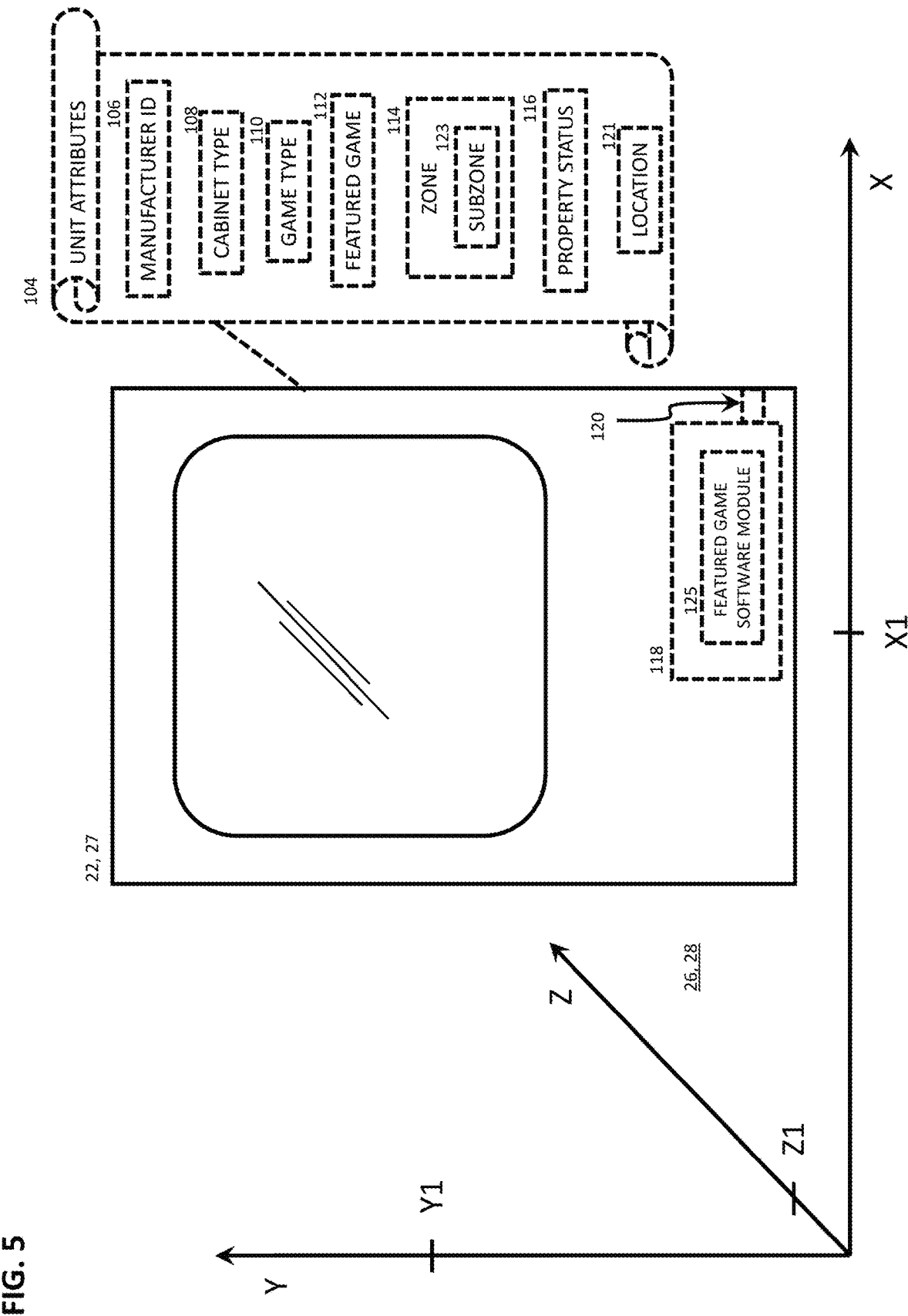
FIG. 5 is a schematic diagram illustrating an embodiment of a gaming unit located on a floor of an environment, illustrating a plurality of unit attributes of such gaming unit.

Referring to FIG. 5, in an embodiment, each gaming unit 22 and deployable gaming unit 27 includes a plurality of unit attributes 104. The unit attributes 104 include: (a) the manufacturer identification 106 of the manufacturer of the particular gaming unit, such as Scientific Games Corporation, International Game Technology PLC (IGT) or Aristocrat Technologies, Inc.; (b) a housing type or cabinet type 108, which, as described above, can vary in shape, form factor, size, artistic design, texture, material type and color; (c) a game type 110, such as video reel, mechanical reel or video cards (e.g., video poker); (d) a featured game 112, such as the particular game entitled on the front of the gaming unit (e.g., Lord of the Rings™); (e) the identification of the particular zone 114 in which the gaming unit is located; (f) the identification of any subzone 123 within which the spatial location 121 is located; (g) the property status 116 of the gaming unit 22, such as being leased to the environment operator or being owned by the environment operator; (h) a control assembly 118, including a control board, hardware, electronic circuitry, software, and one or more memory devices, processors and network connectivity devices; (i) a data transfer port 120 operatively coupled to the control assembly 118; and (j) a spatial location 121 on the gaming floor 26 specified at least by an X and Z coordinate or specified by coordinates X, Y, and Z (e.g., X1, Y1, Z1).

The featured game 112 includes a particular game logic that controls the game functionality, inputs and outputs. In an embodiment, this game logic includes a featured game software module 125 having computer-readable instructions as well as one or more data libraries and data files. Depending upon the embodiment, the data transfer port 120 can include a reprogramming port or software loading port, such as a USB port, that is configured to receive a thumb drive or data cable for the transfer of data, instructions or a software program from an external device to the control assembly 118. In an embodiment, an environment operator can store a new or different featured game on an external device, such as a laptop. The environment operator can then connect the laptop to the data transfer port 120 using a data cable. After entering a security access code using the laptop, the laptop communicates with the control assembly 118, enabling the environment operator to: (a) deactivate or delete the existing featured game software module 125; (b) load a different featured game software module onto the control assembly 118; and (c) activate the loaded featured game software module. In other embodiments, the environment operator ca change the featured game software module 125 by transmitting commands and a different featured game software module from the environment server 122 (shown in FIG. 1) to the gaming unit 22 or by wirelessly connecting an external device to the control assembly 118.

As shown in FIG. 1, an environment operator may, at any point in time, place a plurality of gaming units 22 on or more gaming floors 26, establishing a reference gaming deployment 133 of the placed gaming units 22 during a first period of time. The reference gaming deployment 133 can be alternately referred to as a baseline gaming deployment, base gaming deployment, precursory gaming deployment, prior gaming deployment, starting gaming deployment, pre-existing gaming deployment, initial gaming deployment, first gaming deployment historical gaming deployment or pre-change gaming deployment.

After the first period, the environment operator may make one or more changes to the deployed gaming units 22, establishing a changed gaming deployment 136. The environment operator may operate the changed gaming deployment 136 during a second period of time that follows the first period of time. The changed gaming deployment 136 can be alternately referred to as a varied gaming deployment, current gaming deployment, study gaming deployment, test gaming deployment, analyzable gaming deployment, subsequent gaming deployment, post gaming deployment or second gaming deployment.

The transition from the reference gaming deployment 133 to the changed gaming deployment 136 can include or be caused by one or more changes or differences between the deployments 133 and 136, such as one or more swappings of the positions of two gaming units 22, one or more changes to one or more unit attributes 104, removal of one or more gaming units 22, addition of one or more deployable gaming units 27 supplied, for example, from the inventory spaces 25, or any combination of such changes. The change data 153 describes, characterizes, specifies, relates to or is otherwise associated with: (a) each such change or difference; or (b) a combination of such changes or differences.

Figure 1A:
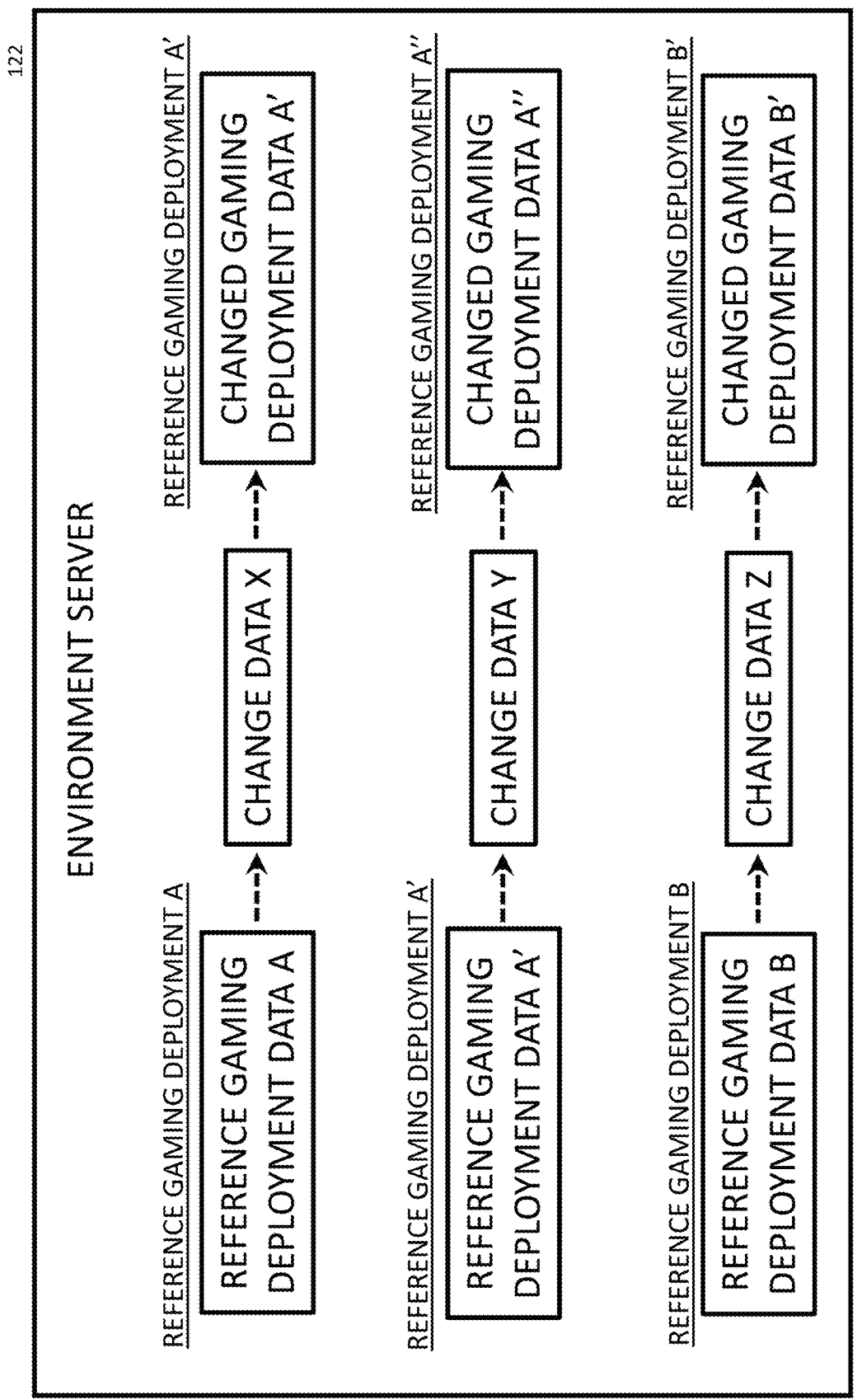
FIG. 1A is a schematic diagram of multiple sets of reference gaming deployment data, change data, and changed gaming deployment data, illustrating the results of a series of changes to different gaming deployments.

As shown in FIGS. 1 and 1A, each of the reference gaming deployments 133 is associated with reference gaming deployment data 134, such as reference gaming deployment data 134a or reference gaming deployment data 134b. Likewise, each of the changed gaming deployments 136 is associated with changed gaming deployment data 138, such as changed gaming deployment data 138a or changed gaming deployment data 138b. In the example shown in FIG. 1, the change data 153a represents the difference between the reference gaming deployment data 134a and the changed gaming deployment data 138a, and the change data 153b represents the difference between the reference gaming deployment data 134b and the changed gaming deployment data 138b.

In the example shown in FIG. 1A, reference gaming deployment A is associated with reference gaming deployment data A. While electronically coupled to the environment server 122, (a) the change monitoring system 20 detected change data X, which represents or specifies at least one change from the reference gaming deployment A to the reference gaming deployment A', which resulted in the changed gaming deployment data A', which is associated with the reference gaming deployment A', (b) then, the change monitoring system 20 detected change data Y, which represents or specifies at least one change from the reference gaming deployment A' to the reference gaming deployment A", which resulted in the changed gaming deployment data A", which is associated with the reference gaming deployment A"; and (c) the change monitoring system 20 detected change data Z, which represents or specifies at least one change from the reference gaming deployment B to the reference gaming deployment B', which resulted in the changed gaming deployment data B', which is associated with the reference gaming deployment B'.

Figure 6:
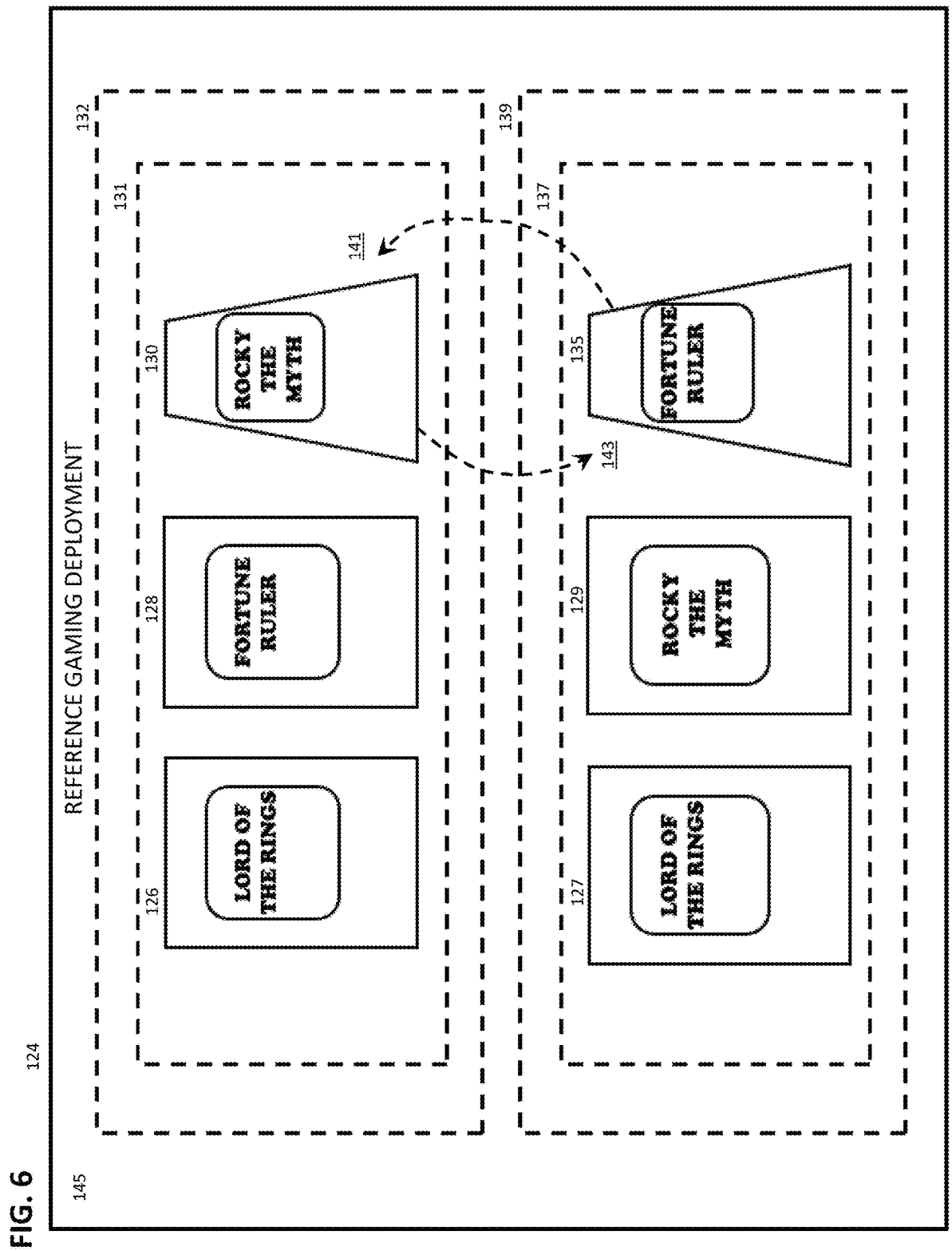
FIG. 6 is a schematic diagram illustrating a plurality of gaming units arranged in a reference gaming deployment within a plurality of subzones, each of which is located within a zone of a floor of an environment.

In the example shown in FIG. 6, the environment operator initially established a reference gaming deployment 145 on the gaming floor 124. The reference gaming deployment 145 included the following: (a) gaming units 126, 128, 130 located within a subzone 131, which is located within a zone 132; (b) gaming units 127, 129, 135 located within a subzone 137, which is located within a zone 139; and (c) the unit attributes 104 of such gaming units 126, 128, 130, 127, 129, 135. In this example, (i) the gaming unit 126 has, among other unit attributes 104, the featured game of Lord of the Rings™ and a cabinet type X, (ii) the gaming unit 128 has, among other unit attributes 104, the featured game of Fortune Ruler™ and a cabinet type X, (iii) the gaming unit 130 has, among other unit attributes 104, the featured game of Rocky the Myth™ and a cabinet type Y, (iv) the gaming unit 127 has, among other unit attributes 104, the featured game of Lord of the Rings™ and a cabinet type X, (v) the gaming unit 129 has, among other unit attributes 104, the featured game of Rocky the Myth™ and a cabinet type X, and (vi) the gaming unit 135 has, among other unit attributes 104, the featured game of Fortune Ruler™ and a cabinet type Y. The gaming units 126, 128, 130, 127, 129, 135 had been deployed and operated on the gaming floor 124 for a first period of time (e.g., sixty days). During the first period, the environment server 122, shown in FIG. 1, is operatively coupled to the gaming units 126, 128, 130, 127, 129, 135, and, based on that coupling, retrieves reference gaming deployment data 133 from the gaming units 126, 128, 130, 127, 129, 135. The reference gaming deployment data 133 can include, for example, player utilization time and contribution data related to the first period.

Figure 7:
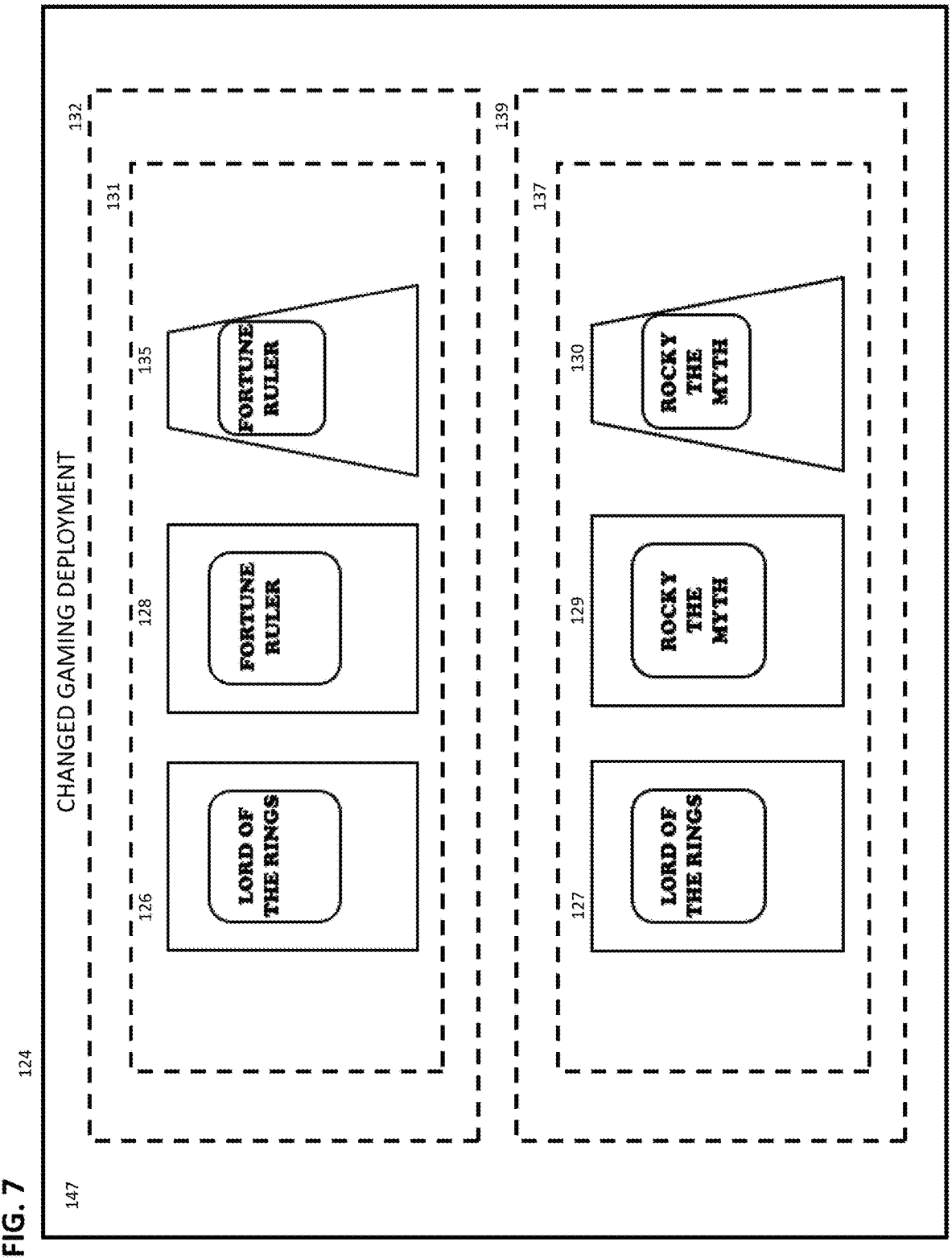
FIG. 7 is a schematic diagram illustrating a plurality of gaming units arranged in a changed gaming deployment within the subzones of FIG. 6, illustrating a plurality of gaming units of such changed gaming deployment.

Referring to FIGS. 6-7, continuing with this example, after the first period, the environment operator made one or more changes to the reference gaming deployment 145, resulting in a changed or changed gaming deployment 147. As illustrated in FIG. 6, the environment operator physically moved the entire gaming unit 130 from location 141 in subzone 131 to location 143 in subzone 137 while physically moving the entire gaming unit 135 from location 143 in subzone 137 to location 141 in subzone 131. This physical swap resulted in the changed gaming deployment 147 shown in FIG. 7. The gaming units 126, 128, 130, 127, 129, 135 (including their associated unit attributes 104) correspond to the changed gaming deployment 147, as shown in FIG. 7.

In this example, the reference gaming deployment 145 has the same or identical gaming units as the changed gaming deployment 147. The only difference between the reference gaming deployment 145 and the changed gaming deployment 147 is the swapping of positions of the gaming units 130 and 135. In other examples not illustrated, the reference gaming deployment 145 can differ from the changed gaming deployment 147 based on a variety of changes, such as changes to one or more unit attributes 104, removal of one or more gaming units, addition of one or more gaming units supplied, for example, from the inventory spaces 25, or any combination of such changes.

During the second period for the changed gaming deployment 147, the environment server 122, shown in FIG. 1, is operatively coupled to the gaming units 126, 128, 130, 127, 129, 135, and, based on that coupling, retrieves changed gaming deployment data 138 from the gaming units 126, 128, 130, 127, 129, 135. The changed gaming deployment data 138 can include, for example, player utilization time and contribution data related to the second period.

As described below, the change monitoring system 20 is configured and operable to monitor the reference gaming deployment 145 and detect the change to the changed gaming deployment 147. A user can provide or submit a user inquiry 31 to cause the monitoring system 20 to generate output 236 based on a comparison of the changed gaming deployment data 138 to the reference gaming deployment data 133. The output 236, which can include an estimated impact value 200, conveniently provides the environment operator with insights into the benefits or drawbacks of the transition from the reference gaming deployment 145 to the changed gaming deployment 147.

The change monitoring system 20 is operable to detect and store or otherwise record different types of changes between the gaming deployments 133 and 136. The following Table A provides examples of these changes, together with a description of these examples:

TABLE A

| | CHANGE TYPE | CHANGE DESCRIPTION | UNIT ATTRIBUTES VARIABLE | UNIT ATTRIBUTES CONSTANTS |
|---|---|---|---|---|
| C1 | Featured game change (a/k/a game title swap) | Change the featured game of the applicable gaming unit. Uninstall or deactivate the particular featured game in the applicable gaming unit. Then load the different featured game retrieved from the environment operator's inventory of licensed software. | Featured game | Manufacturer; Cabinet type; Zone; Property status; Game type |
| C2 | Gaming unit replacement (a/k/a cabinet swap) | Physically replace the entire gaming unit (including cabinet) with a different type of gaming unit. The different gaming unit could come from an inventory space or the floor of the environment. | Gaming unit w/associated featured game | Manufacturer; Zone; Property status; Game type |
| C3 | Gaming unit move w/ featured game (a/k/a game title move) | Physically move the entire gaming unit (including its featured game) to a different zone. This type of change is based on the assessment that the featured game is the primary cause of the gaming unit's utilization level. | Zone | Manufacturer; Cabinet type; Property status; Featured game |
| C4 | Gaming unit move w/ cabinet type | Physically move the entire gaming unit (including its cabinet type). This type of change is based on the assessment that the cabinet type is the primary cause of the gaming unit's utilization level. The environment operator can retain or change the featured game after the gaming unit is moved. | Zone | Manufacturer; Cabinet type; Property status |

TABLE A-continued

| | CHANGE TYPE | CHANGE DESCRIPTION | UNIT ATTRIBUTES | |
| | | | VARIABLE | CONSTANTS |
|---|---|---|---|---|
| C5 | Manufacturer replacement (a/k/a manufacturer swap) | Physically add gaming unit(s) of the involved manufacturer, and physically remove the replaced gaming unit(s) of the undesired manufacturer. | Manufacturer w/cabinet type | Zone; Property status; Game type |
| C6 | In-zone gaming unit move | Physically move an entire gaming unit (including its cabinet type) from one location within a zone (or subzone) to another location within such zone (or such subzone). This type of change is based on the assessment that the specific location within the zone or subzone is the primary cause of the gaming unit's utilization level. | Location within zone or subzone | Manufacturer; Cabinet type; Zone or subzone; Property status; Game type Featured game |
| C7 | Game function change | Change designated function(s) of the applicable gaming unit, such as game speed, reward level, house edge, payout schedule, etc. | Game function | Manufacturer; Cabinet type; Zone; Property status; Game type; Featured game |
| C8 | Machine function change | Change designated function(s) or output(s) generated by the applicable gaming unit, such as attraction sounds, music, soundtracks, type of light bulb or light source, light color, light patterns, lighting effects, audiovisuals, motion control of moveable attracting elements, motion sensors, light sensors, detectors, etc. | Machine function | Manufacturer; Cabinet type; Zone; Property status; Game type; Featured game |

Figure 8:
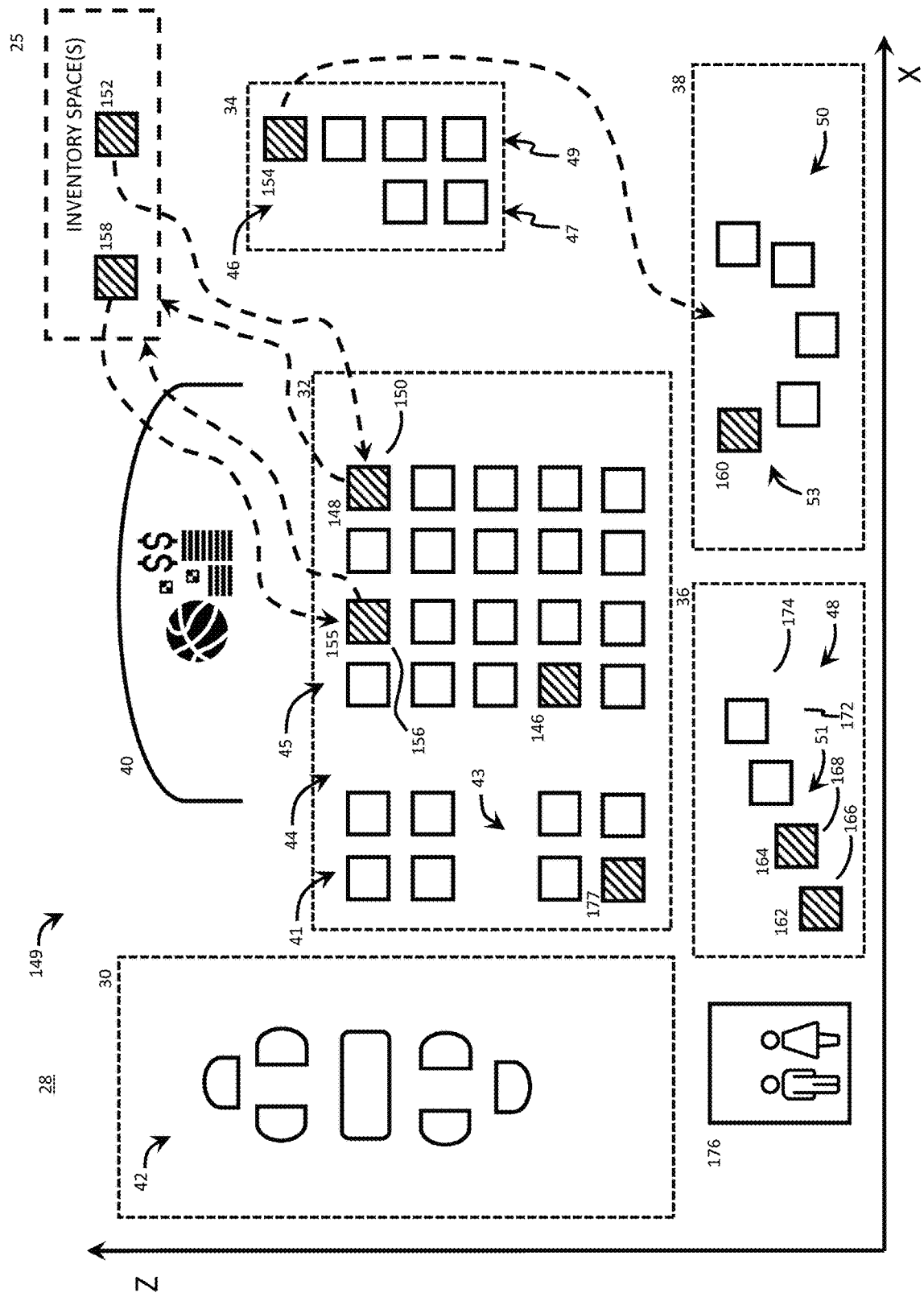
FIG. 8 is an example of a top view of the floor of FIG. 2, illustrating a plurality of potential changes to the reference gaming deployment of FIG. 2.

Referring to FIGS. 2 and 8, in an example, the gaming floor 28 initially has a reference gaming deployment 144. For any reason, the environment operator may change the reference gaming deployment 144 to any one of a plurality of different changed gaming deployments. Referring to FIG. 8 and Table A, in this example, a changed gaming deployment 149 includes: (a) C1 for changing the featured game of gaming unit 146 from, for example, Lord of the Rings™ to Fortune Ruler™ without physically moving the gaming unit 146; (b) C2 for physically moving the gaming unit 148 from a location 150 on the gaming floor 28 to an inventory space 25 and then physically moving a different gaming unit 152 to the same location 150 (in this example, the different gaming unit 152 is retrieved from the inventory space 25, but the different gaming unit 152 could, instead, be a gaming unit moved from another location on the gaming floor 28); (c) C3 for physically moving the gaming unit 154 (which has, for example, the featured game, Lord of the Rings™) from zone 34 to zone 38 without changing such featured game; (d) C4 for physically moving the gaming unit 154 (which has, for example, the featured game, Lord of the Rings™) from zone 34 to zone 38 with optionally changing such featured game to, for example, Motor Harley-Davidson Cycles™; (e) C5 for physically moving the gaming unit 155, manufactured by Scientific Games Corporation, from location 156 to the inventory space 25, and physically moving an deployable gaming unit 158, manufactured by Aristocrat Technologies, Inc., to the location 156 to replace the gaming unit 156; (f) C6 for physically moving gaming units 162, 164 from locations 166, 168, respectively, in subzone 51 to locations 172, 174, respectively, in subzone 51, in which example such moves are involved based on the evaluated profitability, which could possibly be affected by the restroom 176 being close to the gaming units 162, 164; (g) C7 for changing the payout schedule, adding bonus awards, to the featured game of the gaming unit 22; and (h) C8 for changing the color of light generated by a player attraction mechanism of the relevant gaming unit 22.

As described above, the changed gaming deployment 136 involves or is otherwise associated with one or more gaming units 22. The changed gaming deployment 136 can specify at least one change to at least one of the unit attributes 104 of one or more gaming units 22. In an embodiment, unit attributes 104 include: (a) a variable of the category of variables listed in the variable column of Table A set forth above; and (b) the constants of the constant category listed in the constant column of Table A set forth above. In this embodiment, implementing a changed gaming deployment 136 listed in Table A (e.g., C1, C2, C3, C4, C5, C6, C7 or C8) requires a change in the variable corresponding to the implemented change while holding constant (not changing) the constants corresponded to such implemented change.

Figure 9:
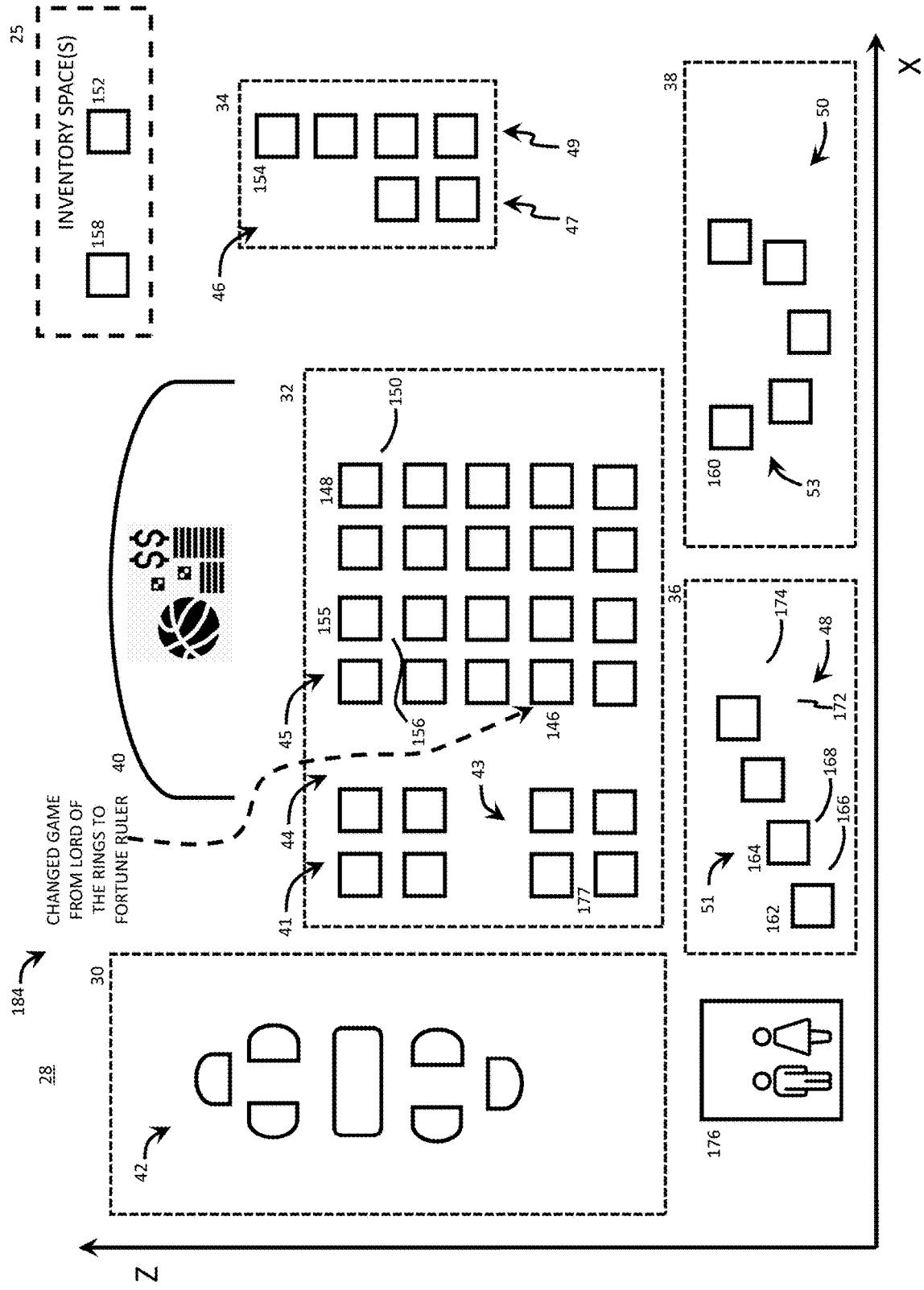
FIG. 9 is an example of a top view of the floor of FIG. 2, illustrating an implemented deployment based on featured game change to the reference gaming deployment of FIG. 2, illustrating the change of the featured game software module of one of the gaming units on the floor.

Each of the deployment changes listed in Table A will, if implemented, result in a changed gaming deployment 136. For example, the C1 change described above with respect to FIG. 8, if implemented, would result in the changed gaming deployment 184 shown in FIG. 9. The changed gaming deployment 184 is physically identical to the reference gaming deployment 144, shown in FIG. 2. This is because C1 only involves a change of the featured game of the gaming unit 146 from Lord of the Rings™ to Fortune Ruler™.

Figure 10:
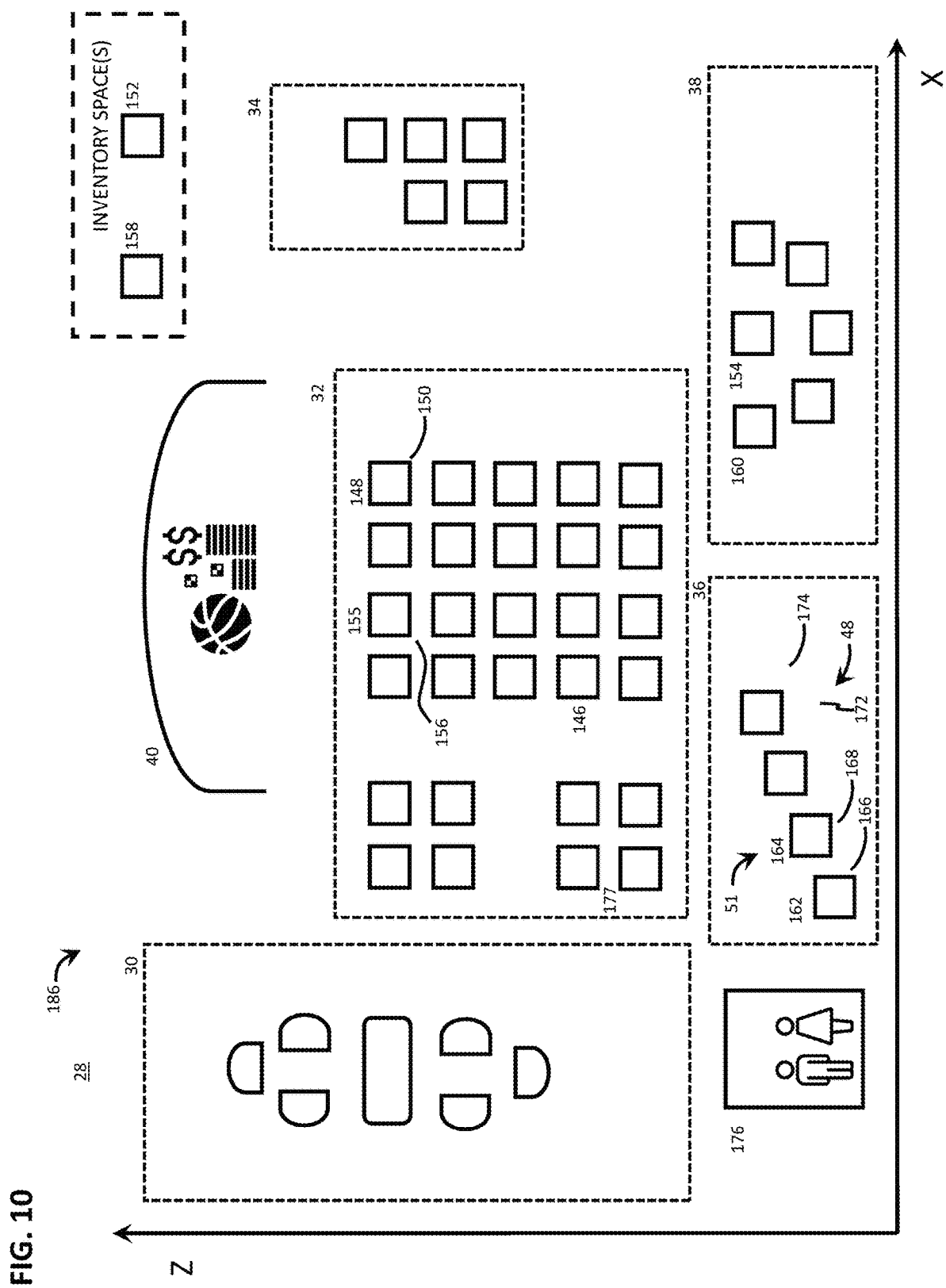
FIG. 10 is an example of a top view of the floor of FIG. 2, illustrating an implemented deployment based on a change to the reference gaming deployment of FIG. 2 that involves the moving of A gaming unit from one zone on the floor to another zone on the floor.
Figure 11:
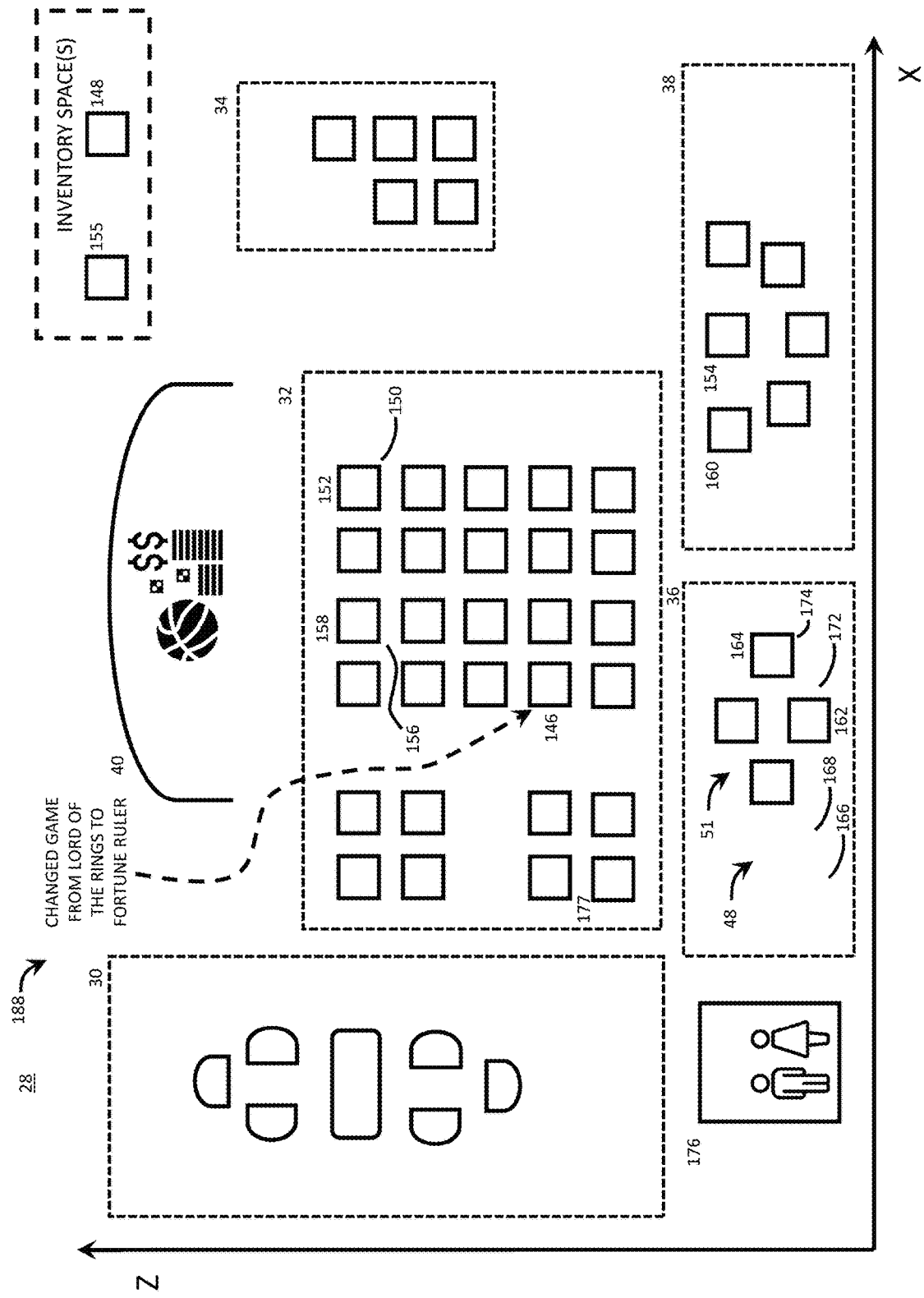
FIG. 11 is an example of a top view of the floor of FIG. 2, illustrating an implemented deployment based on several changes to the reference gaming deployment of FIG. 2 that involve the moving of a gaming unit from one zone on the floor to another zone on the floor, the moving of several gaming units from their original locations in a subzone to different locations in the subzone, the swap of several gaming units with deployable gaming units, and the changing of the featured game software module of one of the gaming units.

In another example, the C3 change described above with respect to FIG. 8 would, if implemented, result in the changed gaming deployment 186 shown in FIG. 10. The changed gaming deployment 186 is physically different from the reference gaming deployment 144. This is because C3 involves a physical move of the gaming unit 154 from zone 34 to zone 38. This is an example of a change that, if selected, would require more burden and labor by the environment operator than the C1 change. If the environment operator were to implement, for example, each of the changes C1, C2, C3, C5 and C6 described above with respect to FIG. 8, the gaming floor 28 would change from the reference gaming deployment 144, shown in FIG. 2, to the deployment 188 shown in FIG. 11.

Referring back to FIG. 1, the change monitoring system 20 includes change monitoring system logic 190. The change monitoring system logic 190 includes one or more computer programs, software modules, software applications, computer code sets, computer-readable instructions, machine-readable instructions, or processor-executable commands. The change monitoring system logic 190 is configured, structured and logically organized to cause or direct the one or more system processors 202 to perform, conduct or carryout a plurality of steps, functions or activities. In other words, the one or more system processors 202 are programmed in accordance with the change monitoring system logic 190 to perform, conduct or carryout a plurality of steps, functions or activities. Although the change monitoring system 20 does not include any system processors 202, for brevity the change monitoring system 20 may be described herein as actively performing steps and other actions that are actually carried out by the or more system processors 202 under the direction of the change monitoring system 20.

Figure 12:
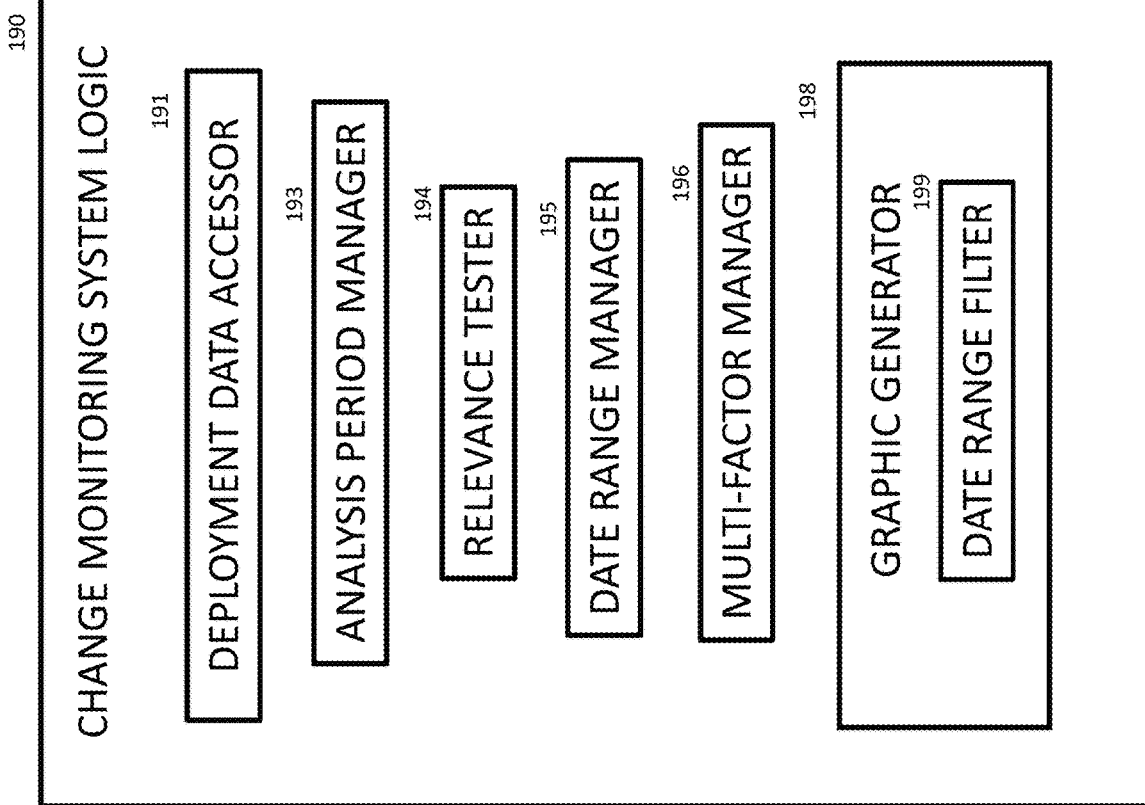
FIG. 12 is a schematic diagram illustrating an embodiment of the change monitoring system logic.

In the embodiment shown in FIG. 12, the change monitoring system logic 190 includes a deployment data accessor 191, an analysis period manager 193, a relevance tester 194, a date range manager 195, a multi-factor manager 196, and an output generator or graphic generator 198, all of which can be arranged in a single software module or each of which can be arranged in a separate software module. In the case of separate software modules, the software modules are programmatically coupled to one another.

The deployment data accessor 191 is executable to direct the change monitoring system 20 to access or receive and to also process reference gaming deployment data 133, shown in FIG. 1. The accessed reference gaming deployment data 133 is related to a plurality of the gaming units 22 that the environment operator has previously operated on the one or more gaming floors 26. As described above, in an embodiment, the gaming units 22 and their unit attributes 104 collectively specify, characterize or correspond to the reference gaming deployment 133 on the one or more gaming floors 26.

In one embodiment, the gaming units 22 are electronically coupled (through a wire-based or wireless communication medium) to the environment server 122, which, in turn, is electronically coupled to the data communication network 206, such as the Internet. Similarly, the one or more system processors 202 are electronically coupled to the data communication network 206 as well as the change monitoring system 20, which is stored in one or more data storage devices 207.

Through this architecture, the change monitoring system 20 is in electronic communication with the environment server 122. In an embodiment, the one or more system processors 202 are in electronic communication with the gaming management processor 119. While the change monitoring system 20 is electronically coupled to the environment server 122, the deployment data accessor 191 is configured to access and process reference gaming deployment data 133 that is stored within or fed by the environment server 122. In an embodiment, this access occurs automatically on a periodic basis, such as hourly, daily or by the minute. As described below, in an embodiment, the deployment data accessor 191 is configured to operate in an auto-detection mode in which the deployment data accessor 191 automatically detects and processes the occurrence of changed gaming deployment data 138 within the environment server 138. This occurrence indicates and is related to a transition from the reference gaming deployment data 133 to the changed gaming deployment data 138.

Figure 13:
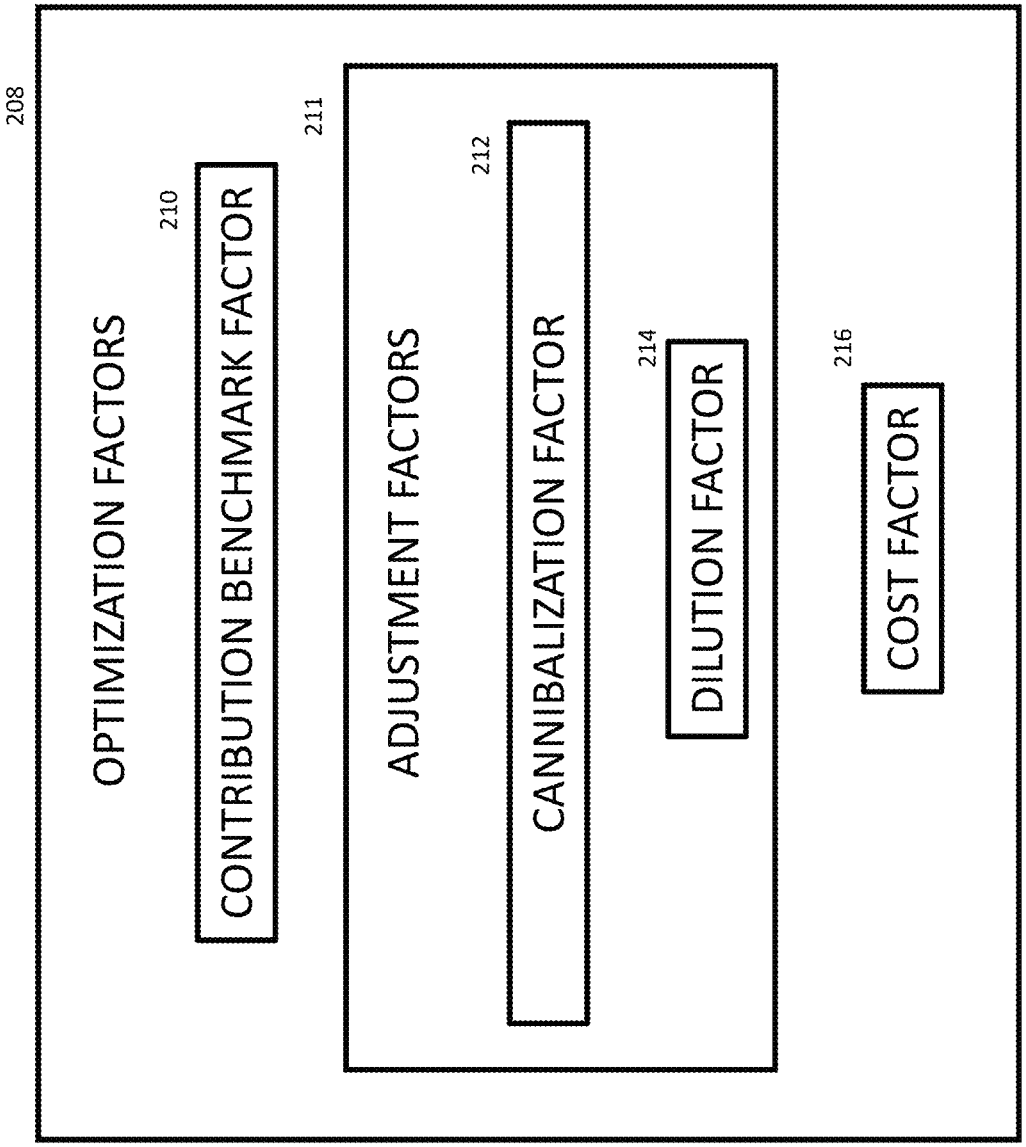
FIG. 13 is a schematic diagram illustrating an embodiment of the optimization factors of the change monitoring system.

In an embodiment, the reference gaming deployment data 133 includes data and metrics that specify or characterize the gaming units 22, their unit attributes 104 and the historical performance of the gaming units 22 on the gaming floor 26 during a first period. FIG. 13 provides an example of reference gaming deployment data 133 related to a single gaming unit 22 of a reference gaming deployment 133. As shown, the reference gaming deployment data 133 includes a plurality of different types of performance metrics.

As indicated above, the deployment data accessor 191 is executable to direct the change monitoring system 20 to receive or otherwise access changed gaming deployment data 138, shown in FIG. 1, related to a plurality of the gaming units 22 that the environment operator has operated on the one or more gaming floors 26. This operation of the changed gaming deployment 136 occurred after the first period during which the gaming units 22 were operated as the reference gaming deployment 133. As described above, in an embodiment, the gaming units 22 and their unit attributes 104 collectively specify, characterize or correspond to the changed gaming deployment 136, which is a variation or modification of the reference gaming deployment 133.

Through the architecture illustrated in FIG. 1, as described above, the deployment data accessor 191 is configured to access or receive and also process changed gaming deployment data 138 that is stored within or fed by the environment server 122. In accessing or detecting changed gaming deployment data 138, the deployment data accessor 191 detects a transition from the reference gaming deployment 133 to the changed gaming deployment 136. In an embodiment, the deployment data accessor 191 automatically searches for, and automatically accesses or receives, changed gaming deployment data 138 on a periodic basis, such as hourly, daily or by the minute. As described below, in an embodiment, the deployment data accessor 191 is configured to operate in an auto-detection mode in which the deployment data accessor 191 automatically accesses and processes changed gaming deployment data 136 that is stored within or transmitted by the environment server 122.

In an embodiment, the changed gaming deployment data 138 includes a plurality of pieces of data or metrics that specify or characterize the gaming units 22, their unit attributes 104 and the historical performance of the gaming units 22 on the gaming floor 26 during a second period that follows the first period of the reference gaming deployment 133.

In an embodiment, the analysis period manager 193 is operable to improve the reliability and meaningfulness of the output 236, including the estimated impact value 200. Once the environment operator physically puts the changed gaming deployment 136 in place, it can take time (e.g., seven days or more) for the environment operator to fully install, test and activate the gaming units 22 of the changed gaming deployment 136. During this pre-implementation downtime, the gaming units 22 are incapable of yielding a collection for the environment operator. Also, once the gaming units 22 of the changed gaming deployment 136 have been activated, one of more of such gaming units 22 can occasionally transition to a disabled state for a relatively short period, such as eight hours, or one or two days. The disabled state can occur as the result of a defect, a temporary malfunction, or an intentional shutoff for handling a repair, routine maintenance or other matter concerning the gaming units 22. During the pre-implementation downtime and the downtime of the disabled state, the gaming units 22 are incapable of yielding a collection for the environment operator. As described below, the analysis period manager 193 prevents the lack of collection during this actual downtime from skewing or affecting the determination of the estimated impact value 200 or other output 236.

As illustrated in FIG. 1, the change monitoring system 20 is directly or indirectly in electronic communication with the environment server 122, which, in turn, is in electronic communication with the gaming units 22, which receive player inputs 23, including collections. As such, the change monitoring system 20 is operable to sense or detect when, and how long, any gaming unit 22 has not received any collection. In an embodiment, the change monitoring system 20 performs such detection by accessing gaming unit operation data stored within the environment server 122.

In one embodiment, it is assumed that the absence of any collection from any applicable gaming unit 22 for a period of time is an indicator that such gaming unit 22 has undergone downtime during such period. Based on this assumption, the analysis period manager 193 generates or produces an assumed downtime period for the gaming unit 22. For example, the analysis period manager 193 is configured to count the number of days that the applicable gaming unit 22 had zero handle (zero collection) after the change involving such gaming unit 22. If the gaming unit 22 had four days of no collection, for example, the analysis period manager 193 would determine a count of four days as the value of the assumed downtime period.

In another embodiment, the analysis period manager 193 establishes or determines the assumed downtime period as the sum of number of days the applicable gaming unit 22 had zero handle (zero collection) and a predetermined or designated number of days (e.g., one day). In this example, the designated number of one day accounts for the fact that the environment operator's technician may install a change (e.g., change a cabinet type) partway through a day (e.g., at 4 PM), in which case the gaming unit 22 would have only been active with the new cabinet for part of that day.

In an embodiment, the analysis period manager 193 uses the assumed downtime period to calculate an analysis period for comparing the reference gaming deployment 133 to the changed gaming deployment 136. The change monitoring system 20 uses the analysis period to determine the output 236, including the estimated impact value 200. In an embodiment, as described below, the change monitoring system 20 enables the user to provide a user inquiry 31 that specifies an analysis date range for comparing the performance of the reference gaming deployment 133 to the performance of the changed gaming deployment 136. For example, the user may have specified an analysis date range of Aug. 1, 2023 to Aug. 24, 2023. In this example, the analysis period manager 193 may have determined the assumed downtime period as four days, as described above.

In this example, the analysis period manager 193 would determine and implement an extended period or analysis period that is equal to twenty-eight days based on the following formula: [duration of the specified analysis date range (24 days)]+[adjustment for the assumed downtime period (4 days)]. This enables the deployment data accessor 191 to access or collect changed gaming deployment data 138 for the duration of twenty-eight days, which is considered important for assessing performance that corresponds to the length of the desired analysis date range (twenty-four days) specified by the user. In this way, the analysis period manager 193 provides the change monitoring system 20 with advantages and technical improvements, including an enhanced capability to access and analyze changed gaming deployment data 138 with increased efficiency, speed and effectiveness for generating the output 236. In an embodiment, the analysis period is an integer representing a quantity of days independent of any real or actual calendar dates.

The relevance tester 194 is operable to improve the relevance, reliability and meaningfulness of the estimated impact value 200 and other output 236. In an embodiment, the relevance tester 194 analyzes each change that constitutes the changed gaming deployment 136 for relevancy. In an embodiment, the relevance tester 194 specifies a relevance condition or relevance test, which is applied to each change. In an embodiment, the relevance tester 194 determines whether each of the changes passes or fails the relevance test. If a change passes the relevance test, the change monitoring system 20 uses the changed gaming deployment data 138 related to such change to determine the output 236. If the change fails the relevance test, the change monitoring system 20 classifies the change as an assumed null change and excludes the assumed null change (and its associated changed gaming deployment data 138) from the determination of the output 236. An assumed null change may alternately be referred to as a false positive or a null change.

It should be appreciated that the relevance test is based on or otherwise depends upon one or more assumptions regarding factors or events that are considered or expected to be irrelevant, noise or of relative low importance to environment operators. The relevance tester 194 prevents the assumed null changes from affecting the estimated impact value 200 or other output 236. In one embodiment, an assumed null change is a change in a gaming unit 22 that is: (a) part of the addition of such gaming unit 11 to a location on the floor 26; or (b) part of the removal of such gaming unit 22 from such location. For example, in a first period, a location X of a subzone may be empty. Due to a change, the environment operator may have installed gaming unit Y at the location X, where the gaming unit Y dwells for a second period. The gaming unit Y may have several attributes, including a cabinet type and featured game. In analyzing this change, the relevance tester 194 would determine that the physical addition of gaming unit Y to location X is a change to be used in determining the output 236. However, the relevance tester 194 would determine that the cabinet type change and the feature game change are assumed null changes, which do not pass the relevance test. This is because these changes are part of the addition of gaming unit Y to location X. By treating these changes as assumed null changes, the relevance tester 194 avoids the potential confusion or skewing of output 236 that could be caused by attributing performance variations to changes that are potentially double-counted or effectively already relied upon.

In an embodiment, the relevance tester 194 automatically (on a continuous or periodic basis) tracks or determines whether the changed gaming deployment data 138 related to each change satisfies the relevance test, and if and when any such data fails the relevance test, the relevance tester 194 causes the change monitoring system 20 to exclude such data from the determination of the estimated impact value 200 and other output 236. In this way, the relevance tester 194 provides the change monitoring system 20 with advantages and technical improvements, including an enhanced capability to track progress toward satisfying the relevance test with increased efficiency, speed and effectiveness for generating the estimated impact value 200 and other output 236.

In an embodiment, the date range manager 195 helps avoid conflicts caused by a chain or sequence of two or more changes to a gaming deployment. For example, an environment operator may run a gaming deployment A, then change the gaming deployment A to gaming deployment A1, and then change the gaming deployment A1 to gaming deployment A3. In seeking a performance comparison of deployment A1 to deployment A, a user may submit a user inquiry 31 that specifies an analysis date range. In this example, the date range manager 195 would analyze and assess whether the deployment date (start date) of gaming deployment A2 precedes the end date of the analysis date range. If so, the date range manager 195 would automatically adjust the end date of the analysis date range to match the end date of the deployment of the gaming deployment A1. For example, the user may have specified an analysis date range of Jun. 2, 2023 to Jun. 17, 2023 to receive a performance comparison of deployment A1 to deployment A. If the gaming deployment A2 had a deployment date (start date) prior to Jun. 17, 2023, such as Jun. 15, 2023, the date range manager 195 would automatically change the end date of the analysis date range from Jun. 17, 2023 to Jun. 15, 2023. In this way, the date range manager 195 provides the change monitoring system 20 with advantages and technical improvements, including an enhanced capability to monitor and resolve date range conflicts with increased efficiency, speed and effectiveness to avoid generating the estimated impact value 200 or other output 236 based on undesired data, that is, date sourced from a non-targeted gaming deployment.

Referring to FIGS. 12-13, the multi-factor manager 196 is configured to process a plurality of adjustment or optimization factors 208 to produce the estimated impact value 200 and other output 236. The optimization factors 208 optimize or increase the usefulness and meaning of the output 236 to the environment operator. As shown in FIG. 1, the change monitoring system 20 generates, includes or stores the optimization factors 208, which, in an embodiment, include a contribution benchmark factor 210, adjustment factors 211 (including cannibalization factor 212 and dilution factor 214) and a cost factor 216. Depending upon the embodiment, each of the optimization factors 208 can include one or more thresholds, conditions, mathematical relationships (including comparisons or comparators), parameters, metrics, values, formulas or any suitable combination of the foregoing.

The optimization factors 208 improve the reliability and usefulness of the output 236 for the benefit of the environment operator. In an embodiment, the optimization factors 208 are predetermined, and the change monitoring system 20 is prepopulated with the optimization factors 208. In another embodiment, the change monitoring system 20 generates or modifies some or all of the optimization factors 208 during or after the periods of deployment of the gaming deployments 133 and 136. In an embodiment, the change monitoring system 20 is configured to enable users to modify or customize the optimization factors 208 based on their preferences.

In an embodiment, the contribution benchmark factor 210 includes a formula, value or metric that represents, indicates or yields a relationship between a first contribution of the reference gaming deployment 133 and a second contribution of the changed gaming deployment 136, such as a comparison between the first and second contributions. In an embodiment, contribution benchmark factor 210 indicates whether the second contribution is less than or greater than the first contribution.

It should be appreciated that some environment operators may have multiple facilities. For example, a single environment operator may own or control facilities A and B, where facility A has gaming floor A, and facility B has gaming floor B. In this example, the environment operator may have implemented: (a) a change from a reference gaming deployment 133 to a changed gaming deployment 136 on gaming floor A; and (b) a different change from a reference gaming deployment 133 to a changed gaming deployment 136 on gaming floor B. The change monitoring system 20 is operable to store or generate a contribution benchmark factor A associated with facility A and a contribution benchmark factor B associated with facility B. For example, the contribution benchmark factor A can represent or indicate a relationship (e.g., comparison) between the contributions of the gaming deployments 133 and 136 at facility A, and the contribution benchmark factor B can represent or indicate a relationship (e.g., comparison) between the contributions of the gaming deployments 133 and 136 at facility B.

Depending on the embodiment, the benchmark factor 210 is usable to represent, indicate or yield a relationship between a plurality of contributions or a plurality of net contributions. In an embodiment, the contribution benchmark factor 210 represents, indicates or yields a relationship between a first net contribution of the reference gaming deployment 133 and a second net contribution of the changed gaming deployment 136, such as a comparison between the first and second net contributions. In this embodiment, the contribution benchmark factor 210 indicates whether the second net contribution is less than or greater than the first net contribution.

The cannibalization factor 212 is used by the change monitoring system 20 to account for the loss in collection caused by the removal of a gaming unit 22 (or featured game thereof) from a subzone. For example, the cannibalization factor 212 is established based on the assumption that the applicable gaming unit, without the change, would have resulted in a certain amount of collection. The removal of such gaming unit, therefore, would cause the loss of that collection—a cannibalizing effect. In an embodiment, the cannibalization factor 212 includes a formula, value or metric that is applicable to the output 236 to account for this cannibalizing effect. In an embodiment, the cannibalization factor 212 includes a deduction amount. The cannibalization factor 212 enables the change monitoring system 20 to discount any gain in collection of the applicable gaming unit by such deduction amount. This adjustment helps improve the reliability and meaningfulness of the output 236, including the estimated impact value 200. In an embodiment, the multi-factor manager 196 causes the change monitoring system 20 to process the cannibalization factor 212 to produce the estimated impact value 200 and other output 236.

The dilution factor 214 is used by the change monitoring system 20 to account for the potential incidental diversion (or taking) of collection from a part of the floor 26 other than the applicable zone or subzone where the gaming deployment change has been implemented. In some cases, a transition from the reference gaming deployment 133 to a changed gaming deployment 136 may involve a set of changes, including physically moving a gaming unit 22 from subzone A of the gaming floor 26 to subzone B of the gaming floor 26. In subzone A, the gaming unit 22 may have yielded a monthly average collection of $15,000, for example. The full set of changes implemented in the changed gaming deployment 136, including moving gaming unit 22 to subzone B, may have yielded a monthly average collection of $20,000. However, in this example, this higher yield was largely achieved by diverting or taking collection from subzone A. To properly assess the dilutive impact of implementing the changed gaming deployment 136, the dilution factor 214 is used by the change monitoring system 20 to reduce or offset the $20,000 collection by $15,000, resulting in an adjusted collection of $5,000 for the changed gaming deployment 136.

In another dilutive example, a gaming floor 26 may be configurable to have zone A, which includes subzones A1, A2 and A3. A reference gaming deployment 133 may have been the deployment for subzone A3, and a changed gaming deployment 136 may be subzone A3', which differs from subzone A3. The change or difference between subzone A3 and A3' could possibly cause a dilution or indirect loss that is incurred by a subzone other than subzone A3', such as a loss of collection of subzone A1 or A2. This indirect loss could be an unintended or unanticipated consequence. For example, the addition of featured game XYZ to subzone A3' could possibly cause a loss in collections of subzone A1 that also has the featured game XYZ. To address this impact, the dilution factor 214 includes a value or metric that represents an indirect loss (if any) of collection that is incurred by any subzone other than the subzone involved with the gaming deployment change. The dilution factor 214 enables the change monitoring system 20 to account for any indirect loss of collection incurred by subzones other than the subzone involved in the changed gaming deployment 136. In an embodiment, the multi-factor manager 196 causes the change monitoring system 20 to process the dilution factor 214 so as to discount or reduce the assessed benefit of the changed gaming deployment 136 by any indirect loss in collection or net contribution, resulting in the output 236, including the estimated impact value 200.

In an embodiment, the cost factor 216 includes a formula, value or metric that represents, indicates or yields a first cost related to the reference gaming deployment 133, a second cost related to the changed gaming deployment 136, a relationship between the first cost and the second cost (e.g., a comparison between the first cost and the second cost), or a combination of the foregoing. In an embodiment, the cost factor 216 includes the difference between the first cost and the second cost. In another embodiment, the cost factor 216 indicates whether the second cost is less than or greater than the first cost. Depending upon the embodiment, the first cost and the second cost can each include: (a) a free play credit owed to one or more players; (b) a value of compensation owed to one or more of players; (c) an amount of taxes; (d) a lease fee owed to one or more gaming unit owners; (e) a portion of revenue owed according to a revenue sharing arrangement; (f) a royalty amount; or (g) any combination of the foregoing. The cost factor 216 enables the change monitoring system 20 to compare or account for the cost differences between the gaming deployments 133 and 136. The cost differences affect the determination of the output 236, including the estimated impact value 200. In an embodiment, the multi-factor manager 196 causes the change monitoring system 20 to process the cost factor 216 to produce the estimated impact value 200. It should be appreciated that the cost factor enables the change monitoring system 20 to account for macroeconomic events and information that are important to environment operators. For example, the amount of taxes, lease fees and other operating costs can non-linearly vary from gaming deployment to gaming deployment. Relying upon the cost factor 216, the change monitoring system 20 is operable to use this cost differential to determine output 236, including estimated impact value 200.

The change monitoring system 20 is operable to produce output 236, shown in FIG. 1, according to the multi-factor manager 196 and other logic 190. In an embodiment, the output 236 includes the estimated impact value 200. The estimated impact value 200 describes, provides or indicates a theoretical, estimated or assumed financial impact that has been caused by the transition from the reference gaming deployment 133 to the changed gaming deployment 136. In an embodiment, the change monitoring system 20 automatically calculates and determines the estimated impact value 200 according to the change monitoring system logic 190. The estimated impact value 200 provides the environment operator with a convenient, easy-to-understand metric that indicates whether the changed gaming deployment 136 is advantageous over the reference gaming deployment 133, and if so, to what extent.

In an embodiment, the output 236 also provides, displays or indicates information that describes a comparison of the performance of the reference gaming deployment 133 to the performance of the changed gaming deployment 136. In an embodiment, the output 236 includes the performance information for each of the deployments 133 and 136, which includes a plurality of additional key performance indicators itemized by zone, subzone and facility. In an embodiment, the output 236 includes dollar amounts, percentages, numbers or symbols that indicate or represent average utilization, peak time average utilization, net theoretical net contribution, theoretical win, machine count, denominations, average wager, handle pulls, handle or collection, theoretical hold or house edge, median pulls per minute, and machine days. A performance indicator described herein as theoretical or theo represents an anticipated or estimated outcome determined in accordance with the change monitoring system logic 208.

Referring back to FIG. 12, in an embodiment, the graphic generator 198 is configured to generate graphical representations of the output 236. The graphical representations can include graphical user interfaces, images, charts, tables, graphs, reports, text, symbols or a combination thereof. In an embodiment, the graphic generator 198 is executable to produce the output 236, as shown in FIG. 1. As shown in FIG. 12, in an embodiment, the graphic generator 198 includes a date range filter 199. The date range filter 199 is configured to enable a user to input a user inquiry 31 to set a desired analysis date range for the production of the output 236. The analysis date range can be a calendar-based period, such as a real or actual calendar date of Aug. 1, 2023 to Aug. 10, 2023. In this example, the date range filter 199 would direct the change monitoring system 20 to determine, filter and display the output 236 (including the estimated impact value 200) so that the output 236 is only based on changes, events and conditions that occurred during the analysis date range of Aug. 1, 2023 to Aug. 10, 2023.

In an embodiment, the change monitoring system 20 is configured to execute the change monitoring system logic 190 with respect to the gaming deployments 133 and 136. The execution results in the estimated impact value 200, which informs the environment operator of the impact of the transition from the reference gaming deployment 133 to the changed gaming deployment 136. The change monitoring system 20 enables the environment operator to easily and conveniently receive information and insights (including the estimated impact value 200) related to the effects of the environment operator's transition from the reference gaming deployment 133 to the changed gaming deployment. This substantially reduces the labor and burden traditionally faced by the environment operator in the operator's efforts to understand whether a gaming deployment change has caused a financial improvement for the operator's business and, if so, the relative degree of such improvement.

Figure 14:
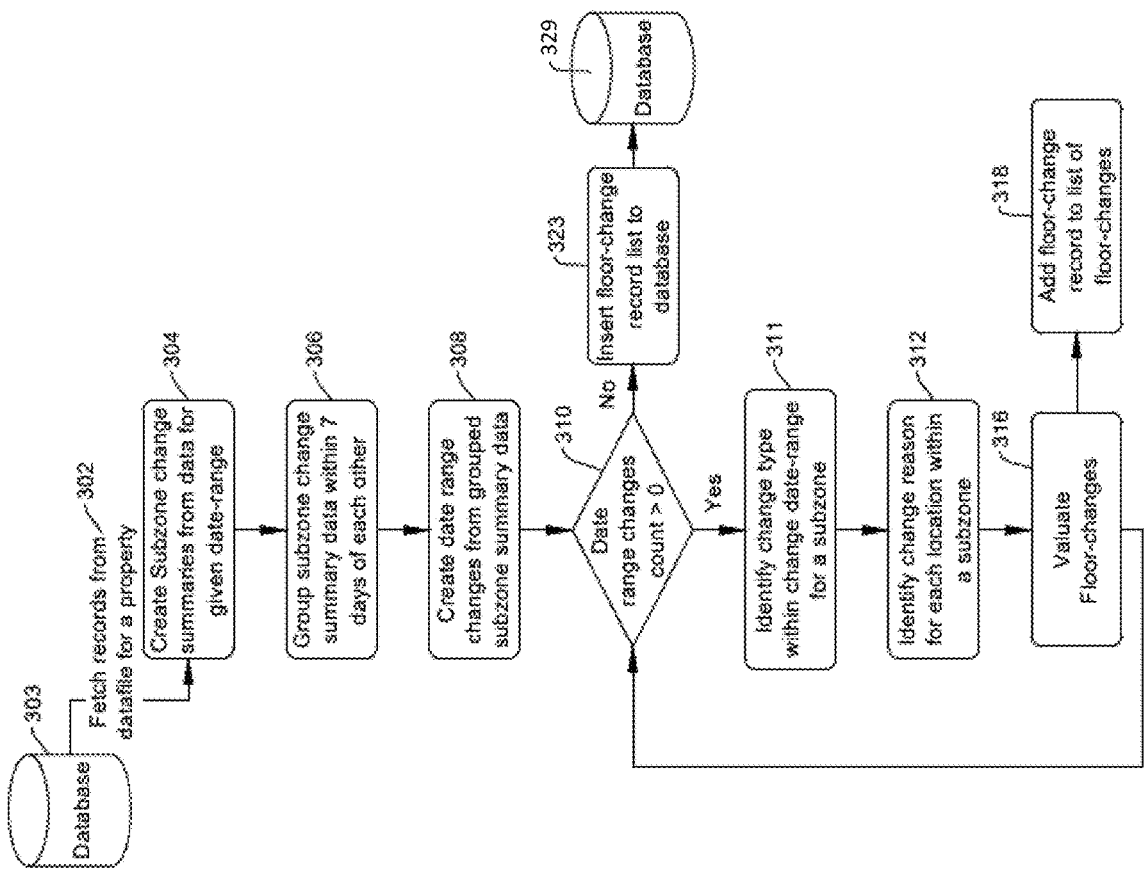
FIG. 14 is a flow chart illustrating an embodiment of the method of operation of the change monitoring system.
Figure 15:
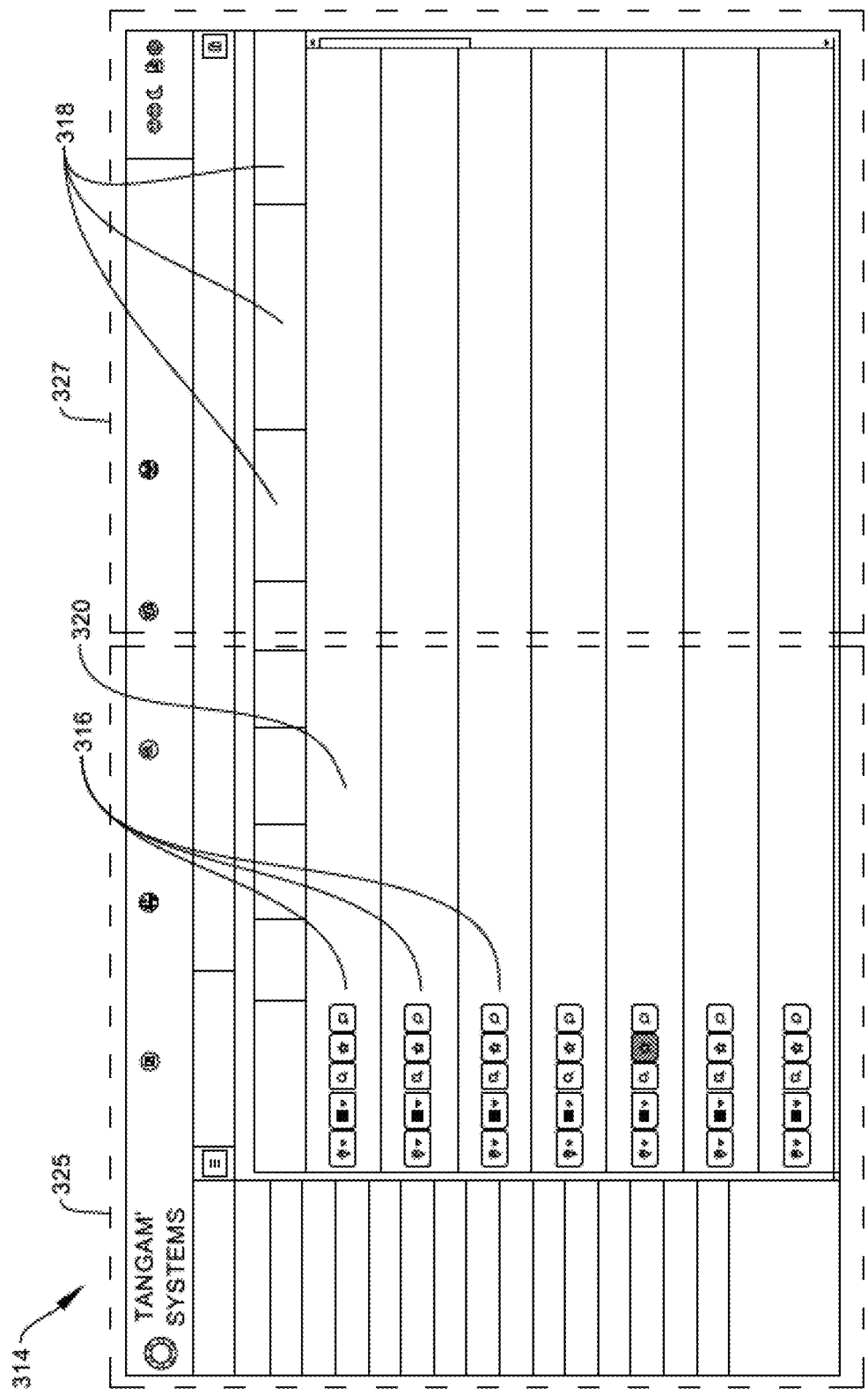
FIG. 15 is a top view of an example of an embodiment of a change summary dashboard generated through execution of the graphic generator of the change monitoring system.

Referring to FIG. 14, in an embodiment, the change monitoring system 20 is configured to automatically perform a method that includes a plurality of steps to generate a floor change record list, which includes a list of floor changes. In an embodiment, this record list is part of the output 236 shown in FIG. 1. As shown in FIG. 14, in step 302, the change monitoring system 20 fetches records from a data file of a facility database 303, which is part of the environment server 122 shown in FIG. 1. In step 304, the change monitoring system 20 creates subzone change summaries from data for an analysis date range specified by the user. The change summaries are also part of the output 236 shown in FIG. 1. In step 306, the change monitoring system 20 groups the changes (and associated change summaries) that are generated within seven days of each other. In step 308, the change monitoring system 20 creates date range changes from the grouped change summary data. In decision step 310, the change monitoring system 20 determines whether the count of the date range changes is greater than zero. If yes, (a) the change monitoring system 20 proceeds to step 311, identifying the change type within the change date range for a subzone, (b) the change monitoring system 20 identifies the change reason for each location within a subzone, as indicated by step 312, (c) the change monitoring system 20 values the floor changes, as indicated by step 316, and adds the floor change record to the record or list of floor changes, as indicated by step 318, and (d) the change monitoring system 20 repeatedly loops back to the decision step 310 until the answer to the decision step 310 is no, at which time the change monitoring system 20 inserts the floor change record list to a database 329 (which is part of the data storage device 207 shown in FIG. 1), as indicated by step 323.

Referring to FIGS. 15-18, the graphic generator 198 produces a change summary dashboard 314 (having dashboard sections 325 and 327), a product change interface 315 and a change comparison interface 317. The change summary dashboard 314 indicates or represents the output 236 that is related to the floor change record list transmitted to the database 329. The output 236 is based upon and filtered according to the filtered period or analysis date range 313, which, in the example shown, is Dec. 16, 2020-Jun. 7, 2021. Each of the rows 316 corresponds to a single change that causes a reference gaming deployment 133 to become a changed gaming development 136. The columns 318 provide the following categories of information, itemized by column: (a) Net Theo Impact Change/Mo., such as $38K, which is an example of the estimated impact value 200 related to one of the changes; (b) Change Type(s), such as Product Change; (c) Change Reasons(s), such as Swap Machine; (d) Change Date Range, such as May 12, 2021-May 14, 2021, which operates to filter the data displayed in the applicable row of the change summary dashboard 314; (e) Zone, Subzone, such as B, B-39; (f) Net Theo Net contribution PMPD Change, Performance KPIs, such as: (i) Subzone: +323% and $1.7K, indicating a 323% increase in the Net Theo Net contribution of the changed subzone and a $1.7K net contribution that occurred within a 24 day period following the change of the subzone; (ii) Zone: −9% and $453, indicating a 9% decrease in the zone of the changed subzone and a $453 net contribution per gaming unit per day of such zone; (iii) Casino: −7% and $348, indicating a 7% net contribution decrease in the casino's entire gaming floor and a $348 net contribution per gaming unit per day of such gaming floor; (iv) Util: +49% and 55%, indicating a 49% increase in player utilization of the changed subzone and a 55% player utilization at the changed subzone; (v) Units: No change, and 2, indicating no change in the quantity of gaming units of the changed subzone and the subzone's gaming unit quantity of 2; (g) After Change (Manufacturer, Cabinet, Status, Game Titles), such as SCIENTIFIC GAMES, J43, OWNER LEASED, Ultimate Fire Link Power 4, indicating the change of the featured game from Heidis Bier Haus to Ultimate Fire Link Power 4; and (h) Before Change (Manufacturer, Cabinet, Status, Game Titles), such as SCIENTIFIC GAMES, J43, OWNER LEASED, Heidis Bier Haus.

As shown in FIG. 16, in addition to the analysis date range 313, the change summary dashboard 314 displays a Change Date Range column 319. For each change in a row 316, the Change Date Range column 319 displays the change date ranges (e.g., May 12, 2021-May 14, 2021, Feb. 26, 2021-Feb. 18, 2021, etc.) related to the rows 316 of the changes. Each change date range in a row 316 is related to the particular change described in such row 316. The change date range describes the specific period during which such particular change was deployed.

Figure 18:
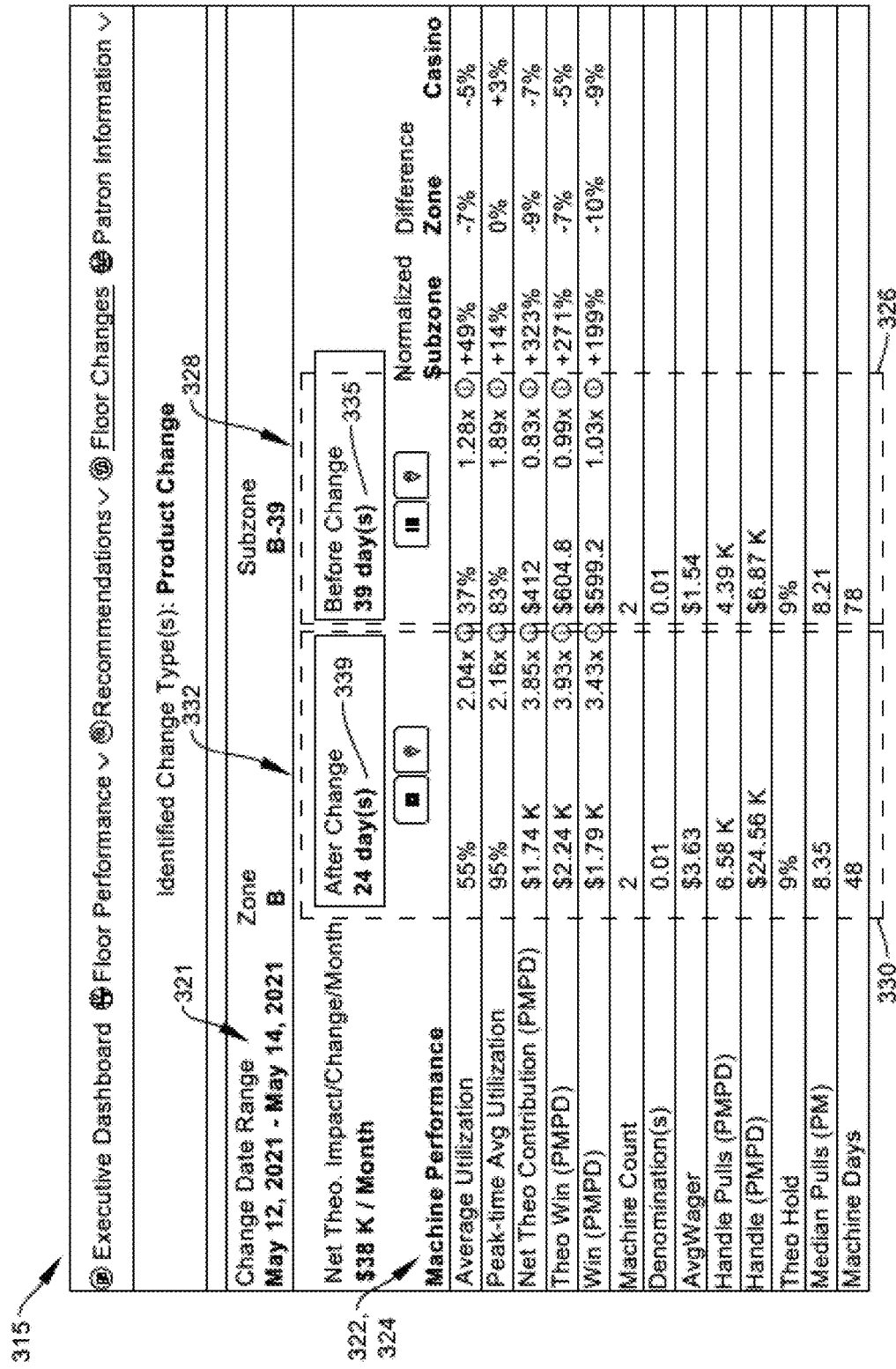
FIG. 18 is a top view of an example of an embodiment of a product change interface generated through execution of the graphic generator of the change monitoring system.

In the example shown in FIG. 18, the product change interface 315 displays greater detail regarding the change described in the first row 320 of the change summary dashboard 314. The product change interface 315 enables the user to set the desired filtered period or analysis date range 321, which causes the filtering of the information shown in the product change interface 315. In the example shown, the user set the analysis date range 321 to May 12, 2021 to May 14, 2021. In this example, the product change interface 315 displays deployment data categories 322 in column 324, reference gaming deployment data 326 in column 328, and changed gaming deployment data 330 in column 332.

As shown in FIG. 18, for the reference gaming deployment 333, the change monitoring system 20 collected or accessed the reference gaming deployment data 326 that occurred or was created during a first deployment period 335 of thirty nine days. For the changed gaming deployment 337, the change monitoring system 20 collected or accessed the changed gaming deployment data 330 that occurred or was created during a second deployment period 339 of twenty four days.

In the example shown in FIG. 19, the change comparison interface 317 displays a plurality of change sections 334 and 336. Change section 334 displays information related to the gaming unit #B-39-01 stationed at location B-39-01 within subzone B-39, and the change section 336 displays information related to the gaming unit #B-39-02 stationed at location B-39-02 within the same subzone B-39. Each of the changes sections 334 and 336 displays deployment data categories 322 in column 338, reference gaming deployment data 340 in a before column 342, changed gaming deployment data 344 in an after column 346, and a difference column 348, which displays the percentage change between commonly categorized data pieces of the before and after columns 342 and 346, respectively. The change comparison interface 317 enables the user to compare the performances of the gaming units #B-39-01 and #B-39-02 within the same changed subzone B-39. For example, as shown, gaming unit #B-39-01 has a 428% increase in Net Theo Net contribution caused by the change, but gaming unit #B-39-02 only has a 242% increase in Net Theo Net contribution caused by the change.

Figure 20:
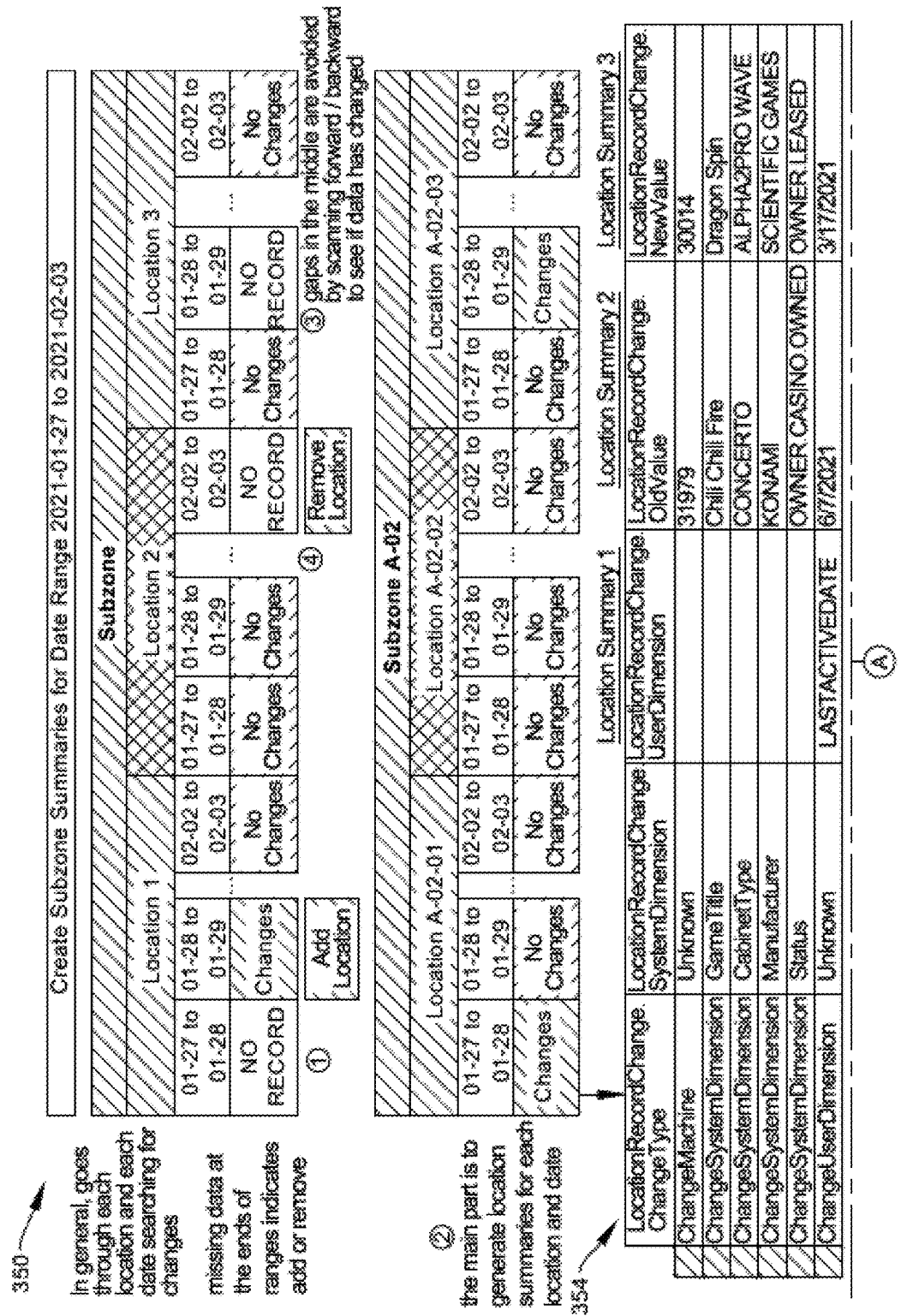
FIG. 20 is a schematic data diagram of an example of an embodiment of an interface configured to display subzone summaries for a specified analysis date range, such interface being generated through execution of the graphic generator of the change monitoring system.
Figure 21:
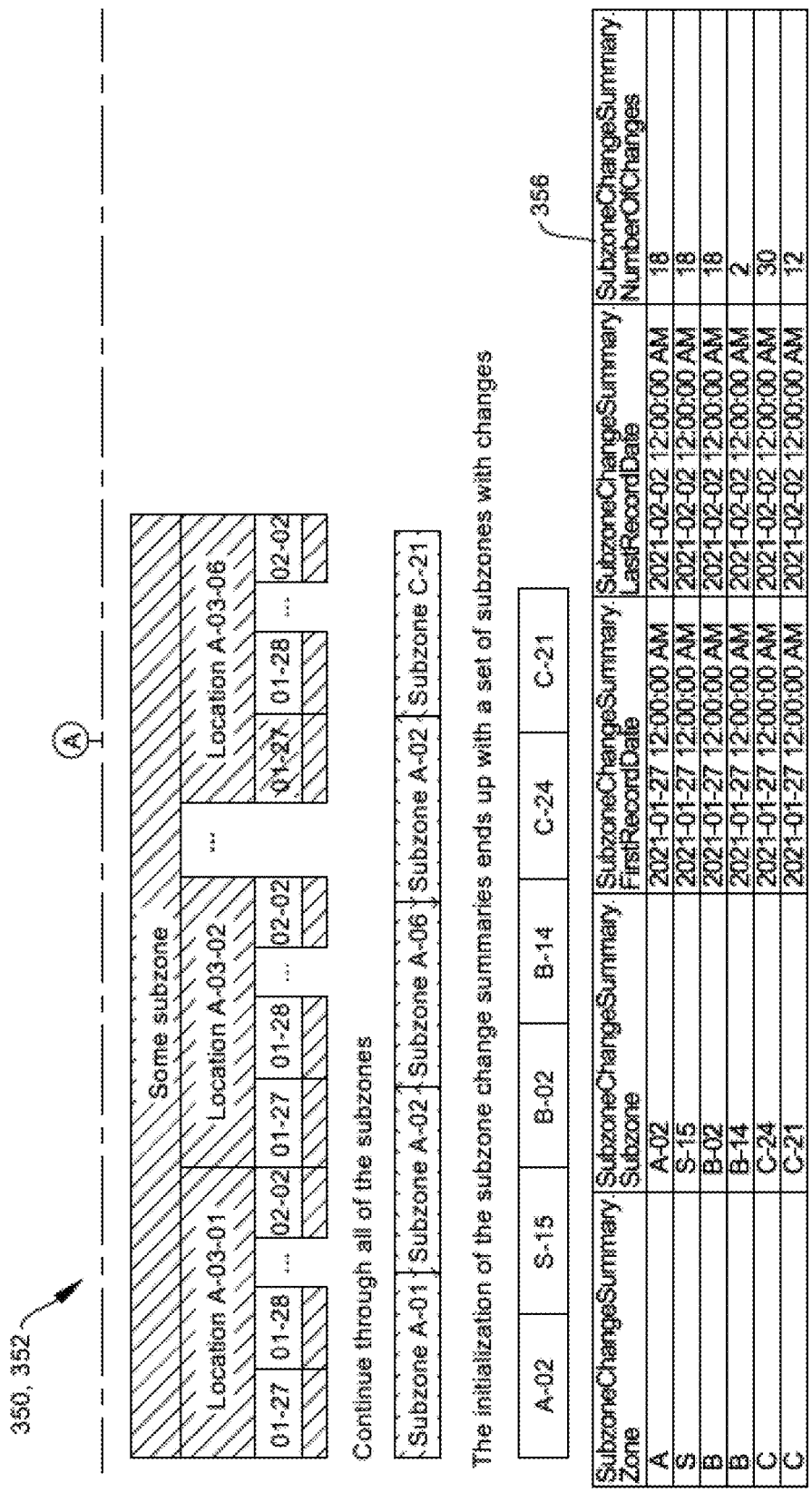
FIG. 21 is a schematic data diagram of the example of FIG. 20, illustrating how some subzones do not have changes and also illustrating the production of summaries of subzones with changes, such interface being generated through execution of the graphic generator of the change monitoring system.

As illustrated in the data diagram 350 shown in FIGS. 20-21, in an embodiment, the change monitoring system 20 is operable in an auto-detection mode to automatically perform a detection method that includes a plurality of steps. The detection method involves fetching records from a data file associated with a facility of the environment operator. Performing the detection method, the change monitoring system 20 searches each location for each change, and retrieves all unit attributes 104 or machine file dimension records from the environment server 122 for a given filtered period or analysis date range for the changes. In the example shown in FIGS. 20-21, the analysis date range is 2021 Jan. 27 to 2021 Feb. 3. The change monitoring system 20 then: (a) groups the changes by their facility (e.g., casino), zone, subzone and date values, determining a result, (b) maps each result to a subzone record; and (c) orders or arranges the results by date in ascending order. As shown in the data diagram 350, Location 1 of a facility's zone has no change (no record) from 01-27 to 01-28, changes from 01-28 to 01-29 (the addition of a gaming unit), and no further changes (no records) from 01-29 through 02-03.

Each subzone record contains all unit attributes 104 for a given subzone (and the gaming units 22 within it) at a given date. If an environment operator has multiple facilities (e.g., casinos), some of which are to be excluded from the analysis of the change monitoring system 20, the change monitoring system 20 will only group the records of the excluded facilities by zone, subzone and date.

As shown in the data diagram 352, the detection method also involves creating subzone change summaries from data for a given date range. Performing the detection method, the change monitoring system 20 takes each collection of subzone records along with the given date range and starts identifying summary information on the collection as a whole, such as the facility (e.g., casino), zone, subzone, the earliest and the latest record. Next, the change monitoring system 20 begins to process and scan for changes at the gaming unit level using the ordered subzone records.

Referring to FIGS. 20-21, once the change monitoring system 20 detects the presence or occurrence of at least two subzone records in the collection (reference gaming deployment data 133 and changed gaming deployment data 138), the change monitoring system 20 uses the following procedure to detect and add gaming unit change summaries:

Step 1: Identify the first subzone record and check if it occurs within the specified analysis date range. If so, then this record constitutes a location summary for each of the locations in the subzone.

Step 2: Referring to the summary section 354 in FIG. 20, for each location on each record (except the last), search for a matching location on a newer record within a certain time frame. Regardless of whether a match is found, the change monitoring system 20 generates a location summary with or without gaming unit attributes depending on the success of finding a match. In the example shown, matches were found for the locations of gaming units #31979 and #30014, so the change monitoring system 20 generated the different location summaries for these two locations.

Step 3: For each location identified on each record (except the first), search for a matching location on an older record within a certain time frame. If a match is found, ignore as it would be a duplicate, having been detected in the previous step #2. If a match is not found, the location was added sometime before, so the change monitoring system 20 will generate a location summary for each of locations of the subzone.

Step 4: Similar to the previous step 1 in this procedure, the change monitoring system 20 identifies the last record and checks to determine if such record occurs within the specified analysis date range. If so, then the record was removed sometime after, in which case the change monitoring system 20 will generate a location summary for each of locations of the subzone.

After the change monitoring system 20 performs the foregoing four steps, the change monitoring system 20 has completed generating a preliminary subzone change summary. Next, the change monitoring system 20 performs a relevance control step. In the relevance control step, the change monitoring system 20 filters out or removes all subzone change summaries that the change monitoring system 20 determines or assumed to be redundant, irrelevant or otherwise null, as described above. For this step, the change monitoring system 20 does not count the assumed null changes (e.g., false positives) as changes. As described above, in one embodiment, an assumed null change is a change in a gaming unit that is part of the addition of the gaming unit to a location or the removal of the gaming unit from the location. After removing the assumed null changes, the total number of changes on a subzone is equal to the sum of all detected changes in the location summaries for the subzone. In the example illustrated in FIG. 21, the change monitoring system 20 calculates the number of changes (change quantity 356) in a location summary according to the following method:

An added or removed location (an added location without start data or a removed location without end data) counts as a single change.

If a location's gaming unit was changed, this counts as one change unless such change is an assumed null change.

If a location's gaming unit's attributes (e.g., game title, game type, cabinet type, manufacturer, status and/or denomination) are changed, each such changed attribute counts as one change unless such change is an assumed null change.

If a location's user dimensions or user preferences (anything other than the listed, predetermined or default dimensions) were changed, each such change counts as one change unless such change is an assumed null change.

Figure 22:
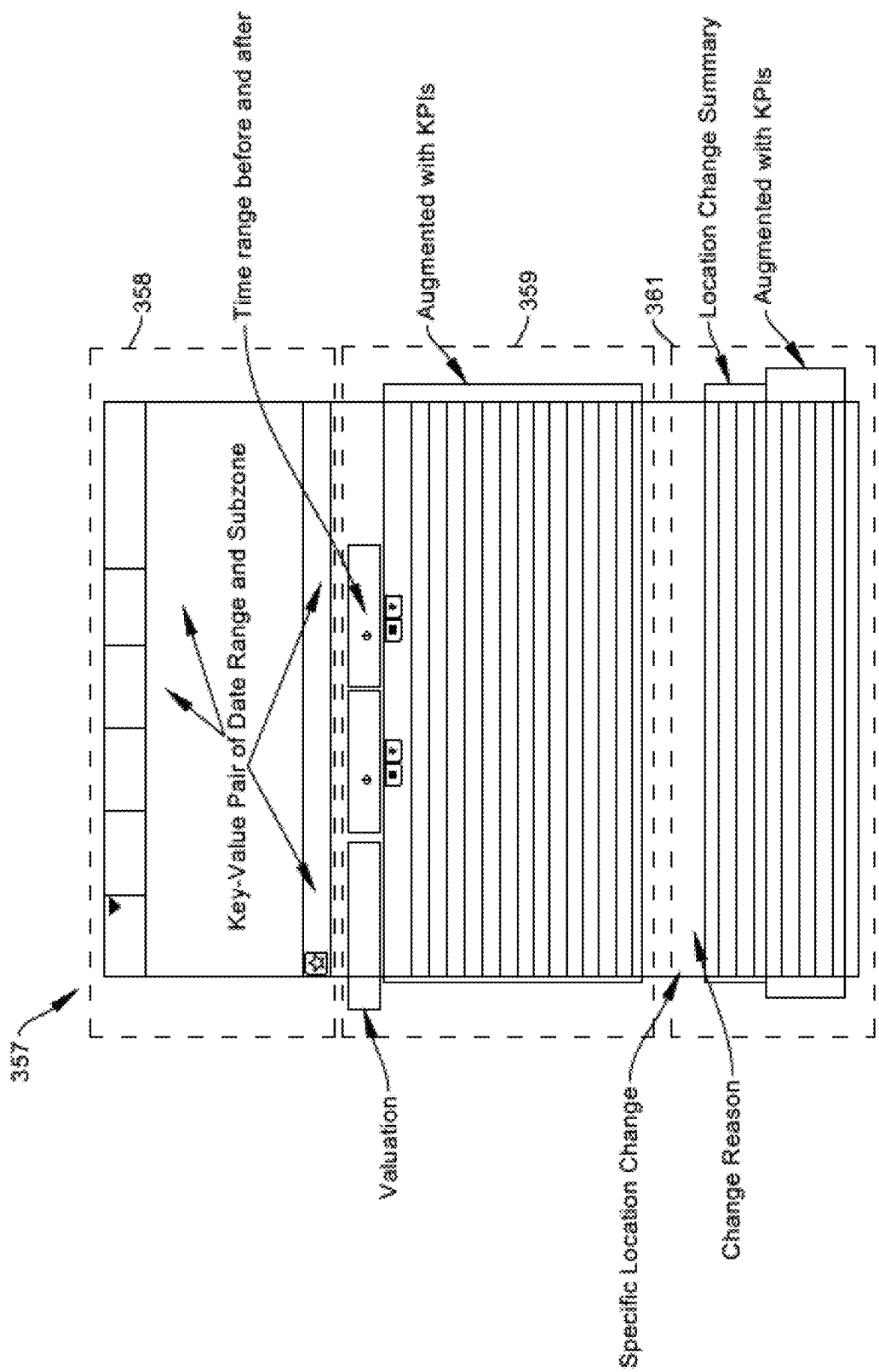
FIG. 22 is a top view of an example of an embodiment of an interface configured to display output (including estimated impact value) related to a gaming deployment change, such interface being generated through execution of the graphic generator of the change monitoring system.
Figure 23:
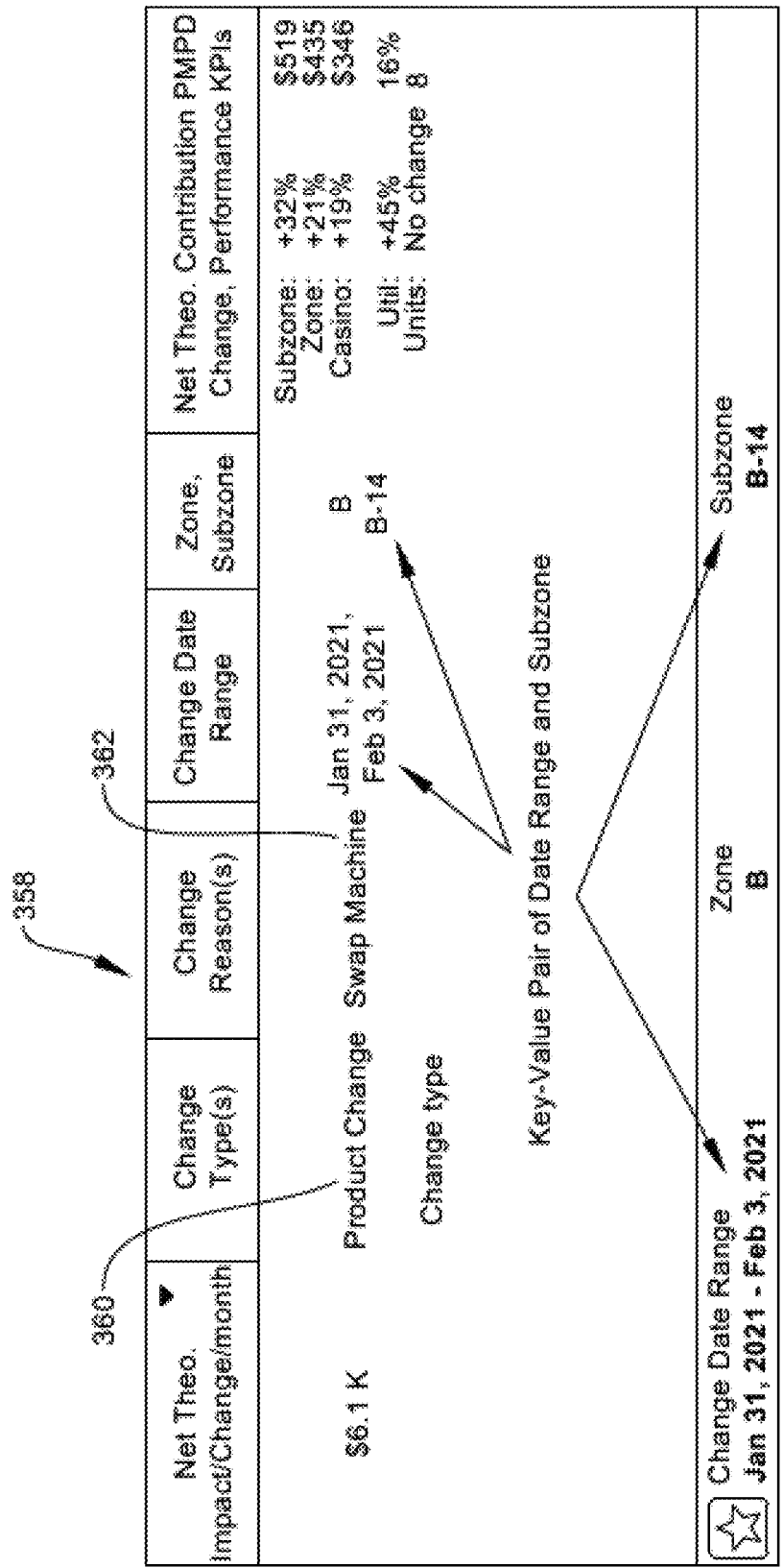
FIG. 23 is an enlarged, top view of an example of a change summary section of the interface of FIG. 22.
Figure 24:
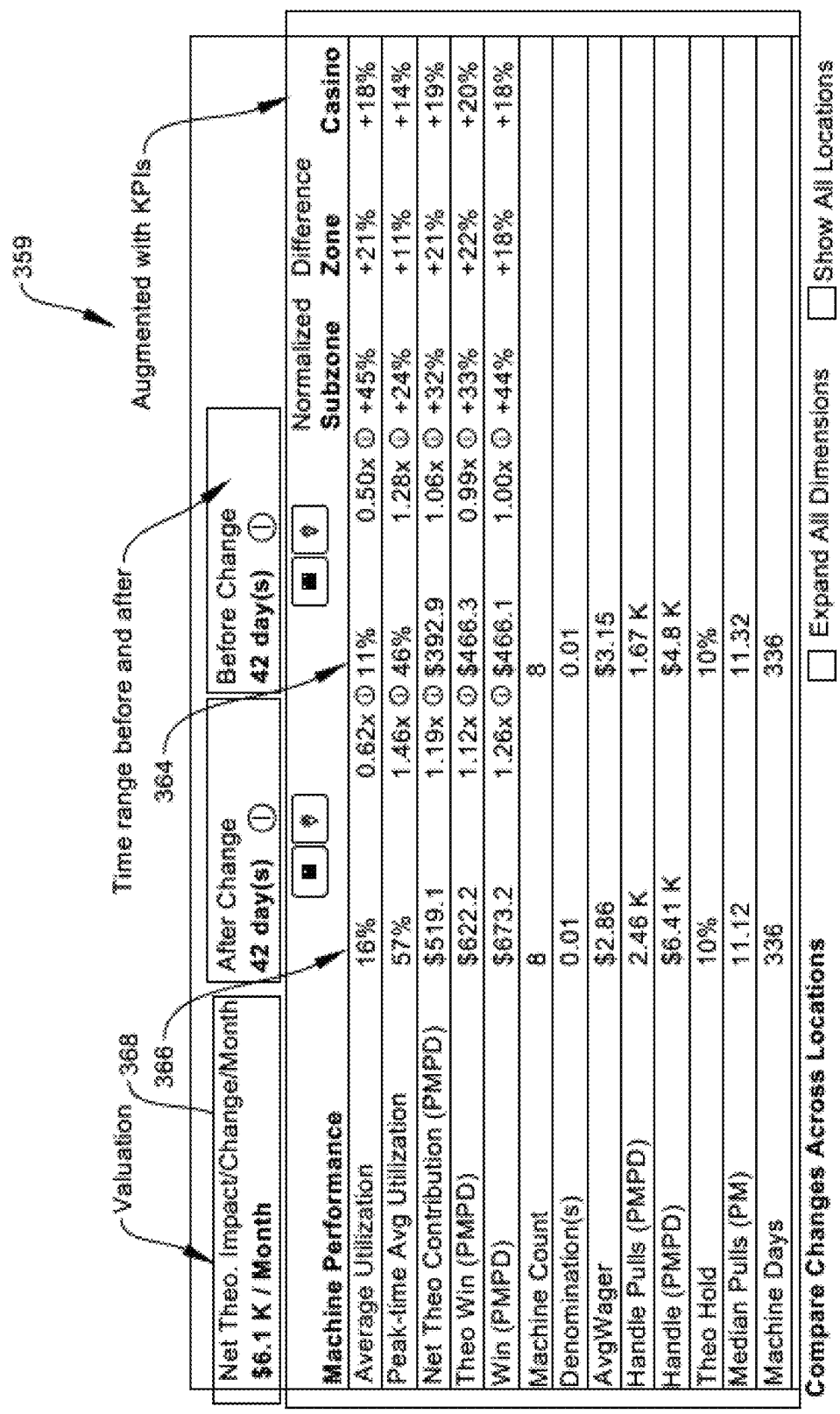
FIG. 24 is an enlarged, top view of an example of a comparative performance summary section of the interface of FIG. 22.

Referring to FIGS. 22-24, the change monitoring system 20 is configured to group or categorize a plurality of changes (and the associated summary data) that have occurred within a designated time proximity (e.g., seven days) of each other. This grouping method is based on the experimental finding that it is usually the case that a series of changes made around the same period of time are part of or related to the same change made by the environment operator. It would, therefore, be helpful for the environment operator to see all of the change information related to that change in a single interface, table, chart or summary. For example, the environment operator may have changed the featured game of a gaming unit on day one and then changed the cabinet type on day four. Because these two changes occurred within seven days of each other, the change monitoring system 20 is configured to group these two changes together to create the finalized change summaries.

For a given subzone change summary, the change monitoring system 20 initially groups the subzone's location change summaries by their start and end date, then filters out or removes the location summaries that have assumed null changes (via the relevance control step described above) and then extracts the start and end date of each summary to obtain all date ranges that contain changes.

In the example shown in FIG. 22, the change monitoring system 20 generated a change summary interface 357, which includes a change summary 358, a performance comparison summary 359, and a location change summary 361. Using these date ranges, the change monitoring system 20 then generates a list of change summaries by date, such as the change summary 358 shown in FIG. 23. The change summary 358 includes a change date range and an identified subzone, among other data. The date range is classified as the key, and the data of the change summary 358 (or the identified sub-zone thereof) is identified as the value. The pairing of such key and such value is classified or referred to as the key value pair (KVP).

Finally, the full summary list of change summaries (only one of which is shown in FIG. 22, change summary 358) is ordered by the start date, then the end date of each KVP in ascending order. With that complete, the change monitoring system 20 then runs a grouping method on the summary list in a loop provided that more than one KVP exists. If this is not the case, grouping does not occur. The grouping method has the following steps:

Step 1: Set the previous KVP to be the first change in the summary list.

Step 2: Starting with the second KVP as the current change, check whether the current change started within seven days of the end of the previous change. If the current change did start within seven days, then the two changes are considered part of or related to the same change and are marked as such. This step 2 is repeated with updated values for the previous and current change (previous=current, current=next change in the iteration).

Step 3: If, however, the changes are too far apart in time (more than seven days apart), then there will not be any more changes which are grouped with the previous change since the summary list was ordered by date. As such, the loop terminates, the changes which were identified to be in the same group are removed from the summary list and the amalgamated change summary is generated.

The change monitoring system 20 then conducts an amalgamation method that includes the following amalgamation steps to generate an amalgamated summary, which incorporates the group of identified changes (and their associated summaries):

Step 1: Order all changes in the group by their start and end date, and record the first and last change.

Step 2: Initialize a new location summary by using the start date of the first change and the end date of the last change as the start date and end date of the new summary. Also, set the location for this change.

Step 3: Populate the location records of the new summary using the starting record of the first change and the ending record of the last change (if not an assumed null change).

Step 4: Populate the changes in the new summary with the changes of each summary in the ordered group.

Step 5: Update the number of changes found in the new location summary.

The change monitoring system 20 repeats this amalgamation method using the new first KVP in the list as the previous change until there are no more KVPs in the list, at which point all groups for the current subzone change summary have been generated.

As described above, a single change summary produced by the change monitoring system 20 can include a group of changes, as described above, which may be referred to as a grouped summary. For each grouped summary, the change monitoring system 20 generates the final change record via the following process:

Step 1: Obtain the date ranges of each grouped summary and order by start date, then end date in ascending order.

Step 2: For each date range, perform the following:

(a) Determine whether the date range falls within the analysis date range. If the date range occurs entirely before the specified analysis date range, move to the next date range. Otherwise, begin collecting details for the change record.

(b) Record the downtime (e.g., number of inactive days) by counting the number of days with zero handle (zero collection) after the change, up to a maximum of seven days.

(c) Determine the first record date range. If the first record date range is the same as the first date range, then the first record date range is equal to the date range of the first record in the corresponding subzone change summary. If not, the first record date range is equal to the day following the end date of the previous date range (to avoid including the change date itself).

(d) Obtain the last record date range. If the last record date range is the same as the last date range then the last record date rate is equal to the date range of the last record in the subzone change summary. If not, the last record date range is equal to the day preceding the start date of the next date range (once again, to avoid including the change date itself).

(e) Compute the number of days before the change. If the current change date range is after the first date range, then this number of days is equal to the difference between the two date ranges, expressed in days (up to a maximum value of forty-two days). If not, the value is set to zero.

(f) Prior to computing the number of days after the change, generate an analysis period by adjusting the end date of the current date range by an extension that is equal to the number of downtime days (e.g., inactive days) plus one day via the formula, num inactive days+1. This is to avoid including downtime days in the production of the estimated impact value 200. The one day factor accounts for the fact that the environment operator's technician may install a change (e.g., change a cabinet type) partway through a day (e.g., at 2 PM), in which case the gaming unit would have only been active with the new cabinet for part of that day. The one day factor, therefore, enables the change monitoring system 20 to use one additional day of performance data to produce the output 236, including the estimated impact value 200. However, if this adjustment pushes the end date past the end of data, the end date is adjusted to be equal to the specified end date. In other words, the end date specified by the user within the analysis date range functions as a limit or cap on the downtime-based adjustment process described above.

(g) Compute the number of days after the change. If the current date range is before the last date range, then the count of computed days is equal to the difference between date range and the last date range, expressed in days. If not, the count is set to a value of zero. The maximum value for this day count is set to 42 days, which functions as limit or cap on the number of days after the change that are used to produce the estimated impact value 200.

(h) Initialize a change record having: (i) the location details from the subzone change summary; (ii) the change start date and end date from the current date range; (iii) the number of days before and after the change based on the calculations performed in the foregoing steps (e) and (g); and (iv) the detailed changes from the grouped summaries for the current date range and the identified change types from the current grouped summaries, including the change type description 360 and the change reason 362, as shown in FIG. 23.

(i) Augment the change record with additional information, such as: (a) key performance indicator (KPI) values 364 and 366 before and after the change, respectively; and (b) the estimated impact value 368, as shown in FIGS. 24-25.

Depending on the circumstance, a change in a gaming deployment can result in more than one move on a floor 26. In many instances, a change may result in a positive net impact in one zone, and a negative net impact in another zone. This can make it difficult for an environment operator to recognize and understand the impact of a change from a holistic perspective of the entire floor 26. In an embodiment, the change monitoring system 20 is configured to provide data and graphics regarding the changes with respect to a holistic perspective of the entire floor 26. In an embodiment, the graphic generator 198, shown in FIG. 12, is configured to cause the display device 226 to graphically or visually show, indicate, illustrate or depict how the gaming units 22 moved across subzones of the floor 26.

Figure 26:
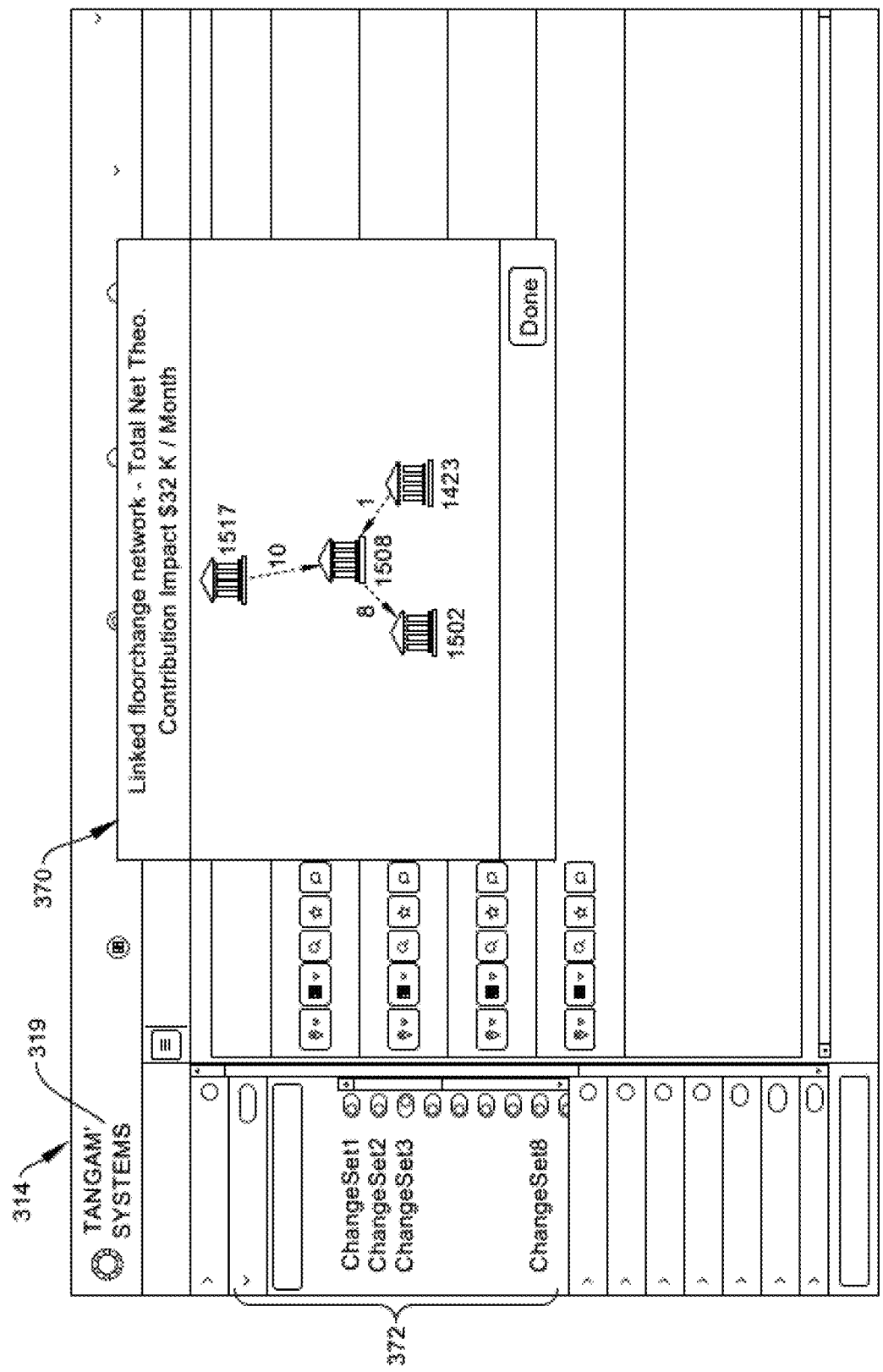
FIG. 26 is a top view of an example of an embodiment of a linked floor change dashboard related to a gaming deployment change, illustrating a popup display of an embodiment of a linked floor change interface, such linked floor change dashboard being generated through execution of the graphic generator of the change monitoring system.
Figure 27:
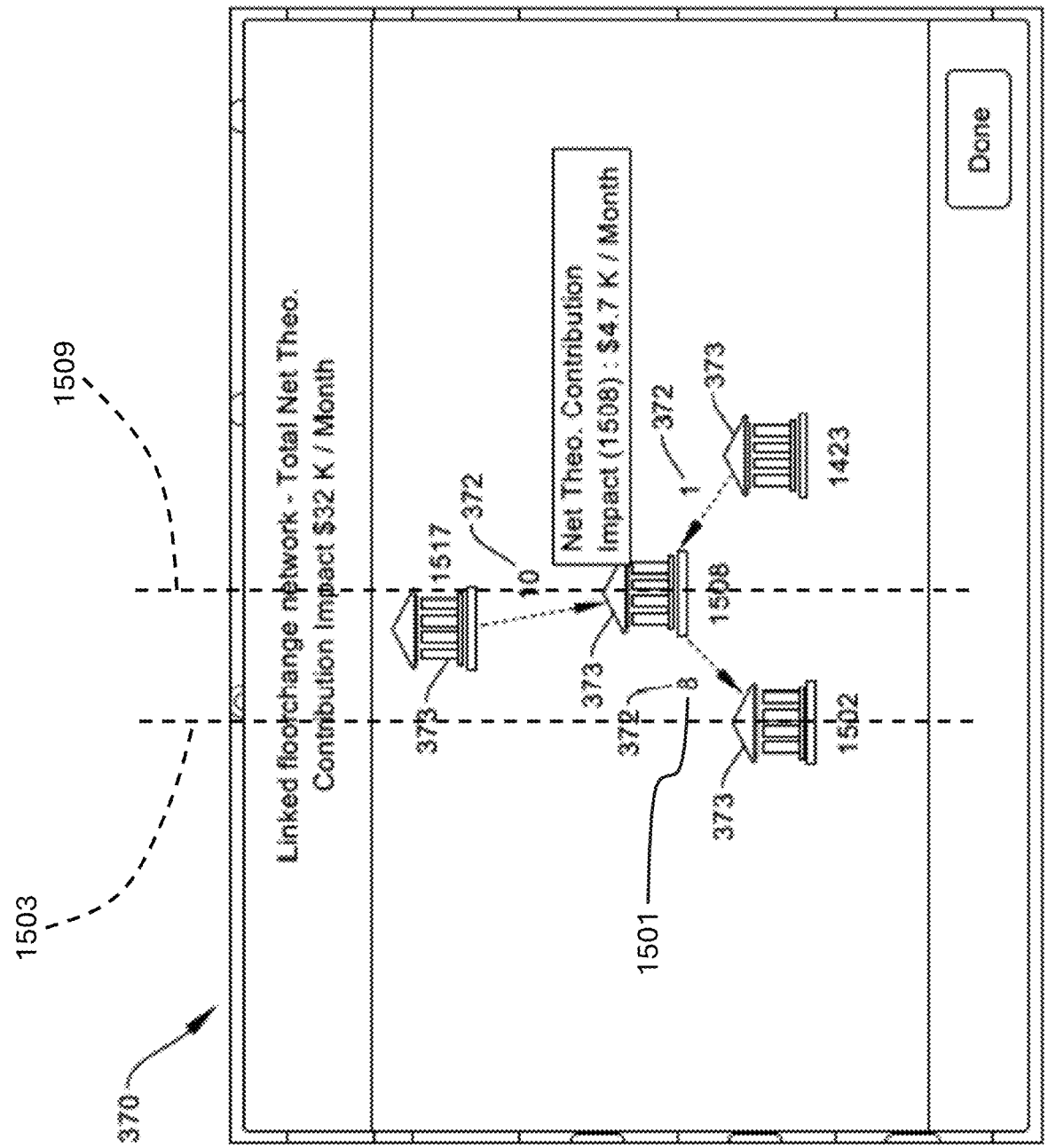
FIG. 27 is enlarged, top view of an example of the linked floor change interface of FIG. 26.

In an embodiment, referring to FIGS. 26-27, for any given date range, the change monitoring system 20 groups the location records based on matching unit attributes 104 of the gaming units 22. For all groups of the location records, if there are multiple changes with overlapping dates within a group, and subzones are different for those location records, the change monitoring system 20 classifies or identifies such changes as a linked changed set, and the change monitoring system 20 assigns a common group identification (ID) to the associated floor change records. Once the floor change records are linked, the graphic generator 198 generates a linked floor change interface 370, shown in FIG. 26, according to the common group IDs. As shown, the linked floor change interface 370 is a popup that is displayed when the user inputs one or more inputs into a LinkedFloorChange section 372 within the change summary dashboard 314.

The linked floor change interface 370 shows the linked floor changes in the selected analysis date range in the form of change sets 1, 2 and so on. These change sets contain two or more linked floor-change records.

In an embodiment, the LinkedFloorChange section 372 displays a plurality of change set filters, such as the change set filters shown in FIG. 26, including ChangeSet 1 through Change Set 9. Each such change set filter has an associated on/off toggle switch. In the example shown, the user turned on the switch for the ChangeSet 3 filter, which resulted in the display of the change sets 10, 1 and 8 in the linked floor change interface 370. If the user switches on the ChangeSet—NotLinked element (such as the ChangeSet 1—Not Linked), the change monitoring system 20 would display records for the selected change set (e.g., ChangeSet 3) that are not linked to the ChangeSet 1 or any other floor change.

In an embodiment, the change monitoring system 20 detects location moves across subzones and removes or filters-out any moves within any subzone. The change monitoring system 20 then graphically represents the cross-subzone moves as described above.

Referring to FIG. 27, the linked floor change interface 370 includes a map or flow diagram that visually provides insight into how changes across four subzones are linked or related to each other. In this example, the gaming unit movements involve subzones #1517, #1508 (through which vertical axis 1509 extends), #1502 (through which vertical axis 1503 extends) and #1423. The directional lines (dotted lines with arrowheads) indicate or depict the direction of movement of the applicable gaming units from one subzone to another. The linked floor change interface 370 has gaming unit quantity indicators 372 that indicate how many gaming units moved from one subzone to another subzone. In the example shown, the gaming unit quantity indicators 372 indicate that ten gaming units moved from subzone #1517 to subzone 1508, one gaming unit moved from subzone #1423 to subzone #1508, and eight gaming units (indicated by quantity indication 1501) moved from subzone #1508 to subzone #1502. This provides the environment operator with visual impact information, including: (a) the estimated impact value ($32K/Month) caused by all of the changes depicted in the linked floor change interface 370; and (b) the fact that subzone #1508 experienced a net impact of a gain of three gaming units based on its receipt of eleven gaming units and loss of eight gaming units. If a user clicks on or hovers over a particular subzone symbol 373, the linked floor change interface 370 displays the estimated impact value 200 related to such symbol 373. In the example shown, the user hovered over the symbol of subzone #1508, and, in response, the linked floor change interface 370 displayed the estimated impact value 200 associated with the change to such subzone: "Net Theo Net contribution Impact (1508): $4.7K/Month."

In an embodiment, the change monitoring system logic 190 specifies or is configured to specify a plurality of change types and change reason classifications, classes or categories for each change involved the reference gaming deployment 133 changing to the changed gaming deployment 136. In an embodiment, a single change type is associated with a plurality of change reason categories. The following Table B provides a description of one embodiment of such change types, a description of each such change type, and such change reason categories:

TABLE B

| CHANGE TYPES | DESCRIPTION | CHANGE REASON CATEGORIES |
| --- | --- | --- |
| Settings Change | Any change or alteration of any setting of a gaming unit | Par Change Denomination Change Jackpot Change Status Change Game Family Change |

TABLE B-continued

| CHANGE TYPES | DESCRIPTION | CHANGE REASON CATEGORIES |
|---|---|---|
| Product Change | Any physical move of a gaming unit that is positioned at an existing location; and/or Any change to such gaming unit other than a Settings Change | Game Title Conversion Cabinet Move Manufacturer Move New Machine Game Type Change Move From Previous Location |
| Floor Layout Change | Any change to the floor in which a location is added or removed | Add Location Remove location Temporary Floor Removal Machine (Gaming Unit) Added, Then Removed |

In an embodiment, the change monitoring system 20 is configured to process each change, and identify the change's change type within the analysis date range for the applicable subzone. The change monitoring system 20 is operable to control the output device 226 to display records of floor changes for a complete subzone. Within a subzone, there can be multiple locations, and different locations may have different change types. The change monitoring system 20 is operable to: (a) process the grouped subzone summary data; (b) iterate the change date ranges for each date range; and (c) use the location summaries data set to determine whether the change was a product change, setting change or floor layout change. If the summaries have any add or remove location changes, the change monitoring system 20 treats such changes as a floor layout change. In case of no layout change, the change type could be a product or a setting change, and, lastly, if any location summary has both a product change and a setting change, based on the hierarchy, the change monitoring system 20 would treat such multi-change as a product change. For all of the location summaries for a particular subzone, the change monitoring system 20 evaluates a list of change types and associates the list with a floor change record.

The change monitoring system 20 is configured and operable to identify the change reason category for each location within a subzone. The change monitoring system 20 evaluates floor change reasons for each location within a subzone. After the change types are determined for a subzone, the change monitoring system 20 loops through each location summary. If any location summary has any add or remove location changes, the change monitoring system 20 searches for the start location and end location within that summary. If the start location is found null, the change monitoring system 20 will specify the change reason category as: add location. If the end location was not found, the change monitoring system 20 will specify the change reason category as: remove location.

In cases where the location summary has both add and remove location changes and when the start location and end location data set exists, the change monitoring system 20 will use the gaming unit serial number timeline data to evaluate whether such changes have been caused by a new machine (new gaming unit) change. Then, the change monitoring system 20 determines whether such changes included a gaming unit move from a previous location by processing the gaming unit location timelines. If such changes did not include a move from the previous location, then the change monitoring system 20 determines whether such changes include product changes, such as Manufacturer Move, Cabinet Change, Game Title Change, Game Type change. The change monitoring system 20 performs such determination in such hierarchical order and generates the first reason found for the product change. Next, the change monitoring system 20 determines whether such changes include settings changes, such as Denomination, Jackpots, Par, Game Family, etc. The change monitoring system 20 performs such determination in such hierarchical order and generates the first reason found for the settings change. As described above, with respect to each location within a subzone, the change monitoring system 20 determines the individual change reasons and associates with a floor change record.

To evaluate the impact of any change or transition from a reference gaming deployment 133 to a changed gaming deployment 136, the conventional method is for environment operators to focus on how the changed gaming units 22, themselves, performed before versus after the change. This conventional method is a relatively narrow approach that can grossly overestimate the value of the changes by not accounting for a variety of factors, such as macroeconomic factors (e.g., such as a rise in operational costs due to national inflation or an economic recession or a governmental increase in taxes), cannibalization (e.g., handle pulls that were going to occur at the removed games regardless of the change), and dilution (e.g., diversion of handle pulls from similar games into the newly changed locations).

To provide a more reliable estimate of the value of any change (or set of changes), there are many metrics that could be applied, such as win, theoretical win, net contribution, theoretical net contribution, handle, etc. In one tested embodiment of the change monitoring system 20, it has been found that the theoretical net contribution provides highly valuable information to environment operators, in part, because the theoretical net contribution accounts for fees, free play, tax and compensation. In such embodiment, the estimated impact value 200 includes the theoretical net contribution. In executing the change monitoring system logic 190, the change monitoring system 20 uses the performance of the environment operator to account for the macroeconomic factors and the performance of the subzone and zone for the cannibalization and dilution effects. The change monitoring system 20 is operational to evaluate all of the locations in the subzone that have either directly changed or indirectly changed due to their game title being affected by the direct changes. If a location is added or removed, the change monitoring system 20 automatically detects such change and evaluate such change using the subzone's overall performance. If the subzone itself is added or removed, then the change monitoring system 20 automatically detects such change and evaluate such subzone using the zone's overall performance.

In an embodiment, the change monitoring system logic 190 includes a valuation algorithm that is executed by the change monitoring system 20 to produce the estimated impact value 200. The valuation algorithm is executable to assess, project, anticipate or estimate the financial or business impact of a change (or set of changes) from a reference gaming deployment 133 to a changed gaming deployment 136. In an embodiment, the valuation algorithm is operable in the context of the example shown in FIG. 28. In such example, the change monitoring system 20 produced the change summary 375. For each step of the valuation algorithm, the description provided below includes the identifiers as they relate to the floor change at subzone B-14, where the gaming unit at a single location B-14-06 was changed from Nefertiti to Pharaohs Fortune. Note that there are only two more locations at this subzone B-14 that have these game titles-locations B-14-04 and B-14-05. The valuation algorithm includes a plurality of steps which, in this example, were performed to produce the estimated impact value 200: Net Theo Impact/Change/Month in the amount of $6.1K/Month.

Figure 29:
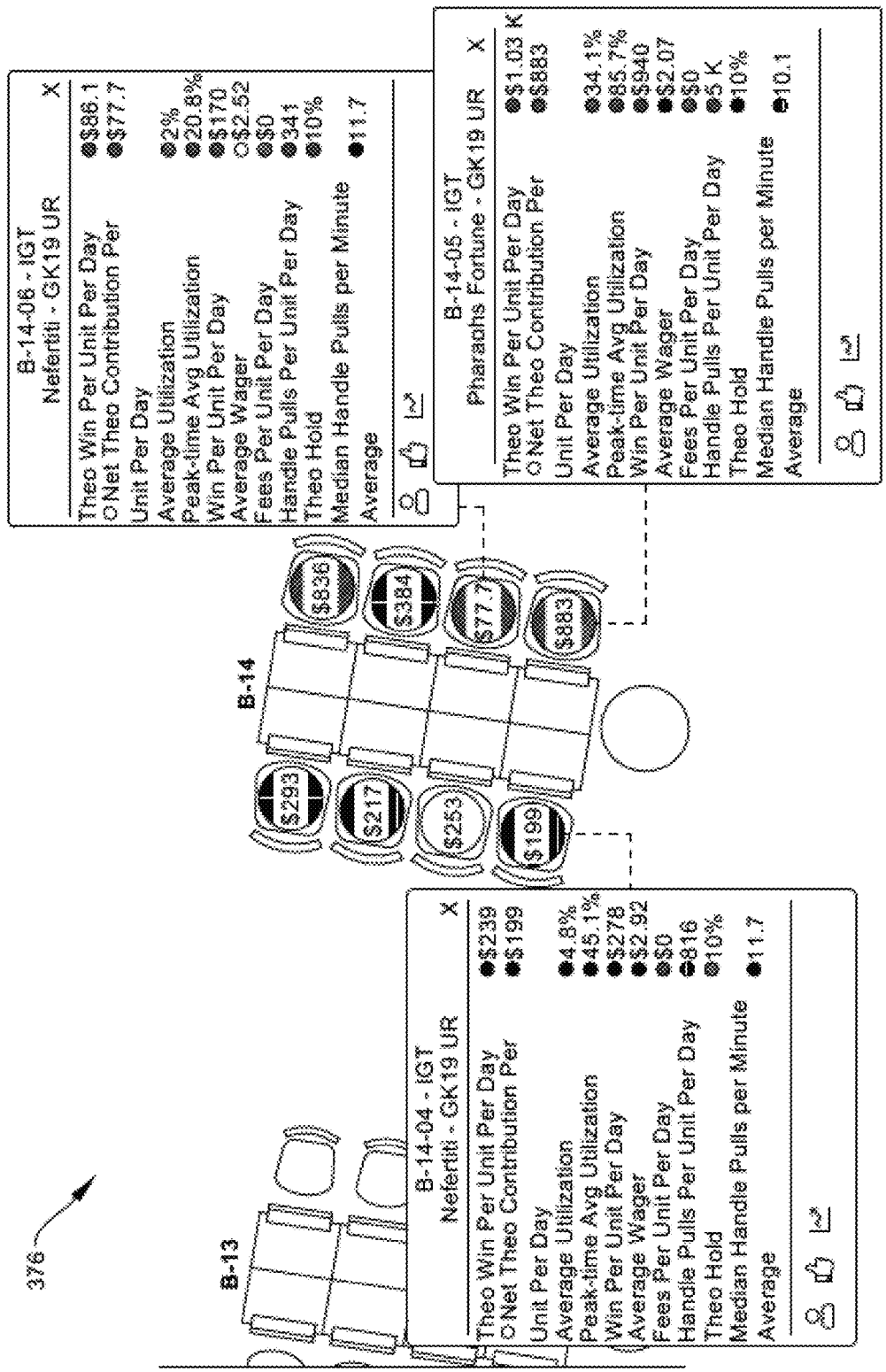
FIG. 29 is a top view of an example of an embodiment of a before-change floor map interface related to a gaming deployment change, such interface being generated through execution of the graphic generator of the change monitoring system.

With respect to the results of the valuation algorithm, as illustrated in FIG. 28, the graphic generator 198 is configured to generate the before-change floor map interface 376 shown in FIG. 29. For each of the locations B-14-06, B-14-04, and B-14-05 of the reference gaming deployment 133, the before-change floor map interface 376 displays the following reference gaming deployment data 133: the estimated impact value determined for the past performance of such location and other data of such past performance. Also, the before-change floor map interface 376 displays a top plan view of the spatial arrangement of the each of the locations B-14-06, B-14-04, and B-14-05, including color coded, encircled values of the Net Theo Contribution Per Unit Per Day. The color system for the before-change floor map interface 376 includes a spectrum ranging from a low value (red) to a high value (green) with intermediary colors, for example, of orange to white to light green.

Figure 30:
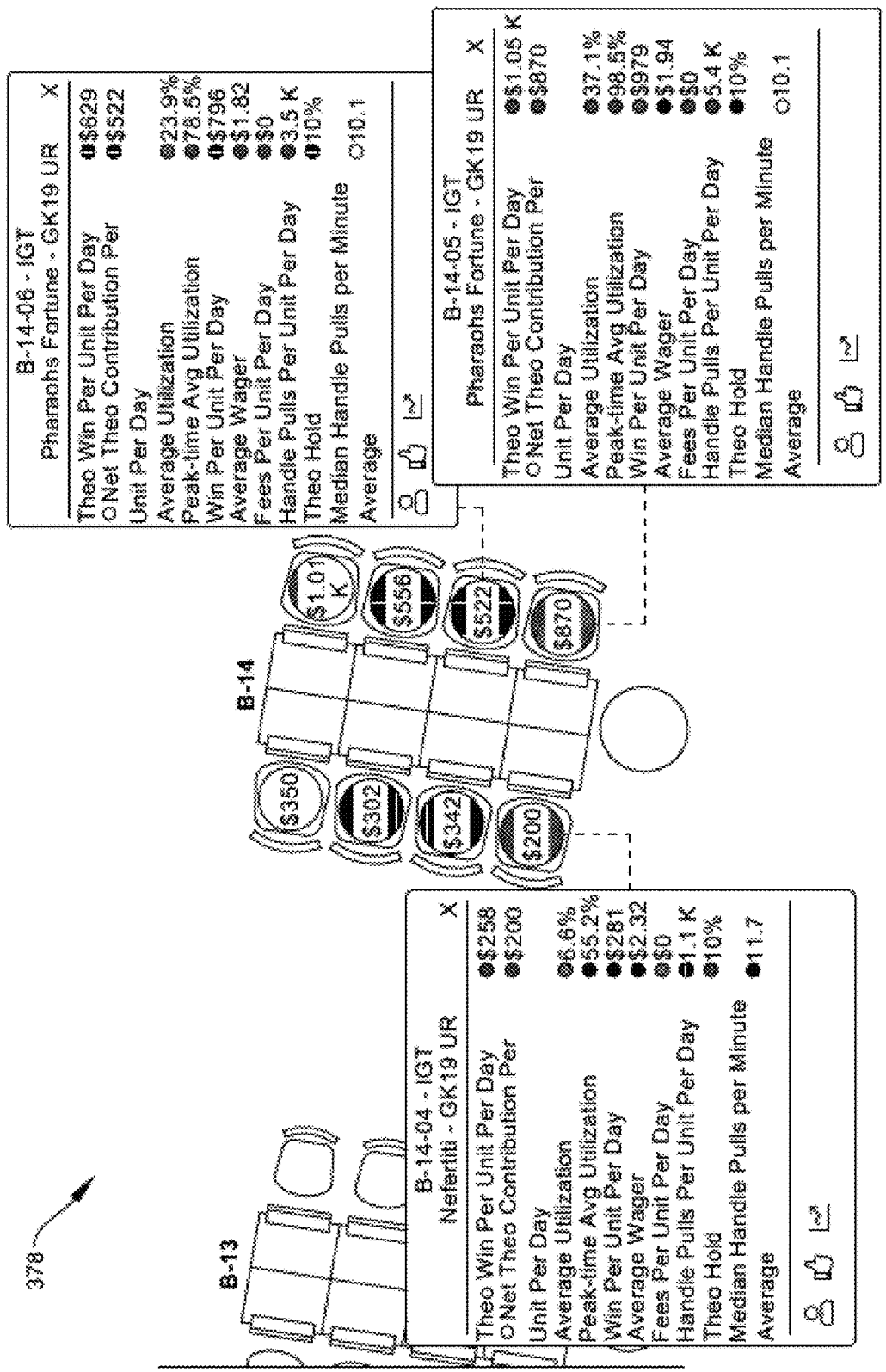
FIG. 30 is a top view of an example of an embodiment of an after-change floor map interface related to the gaming deployment change illustrated in FIG. 29, such interface being generated through execution of the graphic generator of the change monitoring system.

Also, with respect to the results of the valuation algorithm, as illustrated in FIG. 28, the graphic generator 198 is configured to generate the after-change floor map interface 378 shown in FIG. 30. For each of the locations B-14-06, B-14-04, and B-14-05 of the changed gaming deployment 136, the after-change floor map interface 378 displays the following changed gaming deployment data 138: the estimated impact value determined for the current performance of such location and other data of such current performance. Also, the after-change floor map interface 378 displays a top plan view of the spatial arrangement of each of the locations B-14-06, B-14-04, and B-14-05, including color coded, encircled values of the Net Theo Contribution Per Unit Per Day. The color system for the after-change floor map interface 378 includes a spectrum ranging from a low value (red) to a high value (green) with intermediary colors, for example, of orange to white to light green.

Referring to FIG. 31, continuing with the example described in FIG. 28, the graphic generator 198 is configured to generate the itemized data pieces of the Theo Net Contribution for the reference gaming deployment 133 (listed in the Before column) and the changed gaming deployment 136 (listed in the After column).

Figure 32:
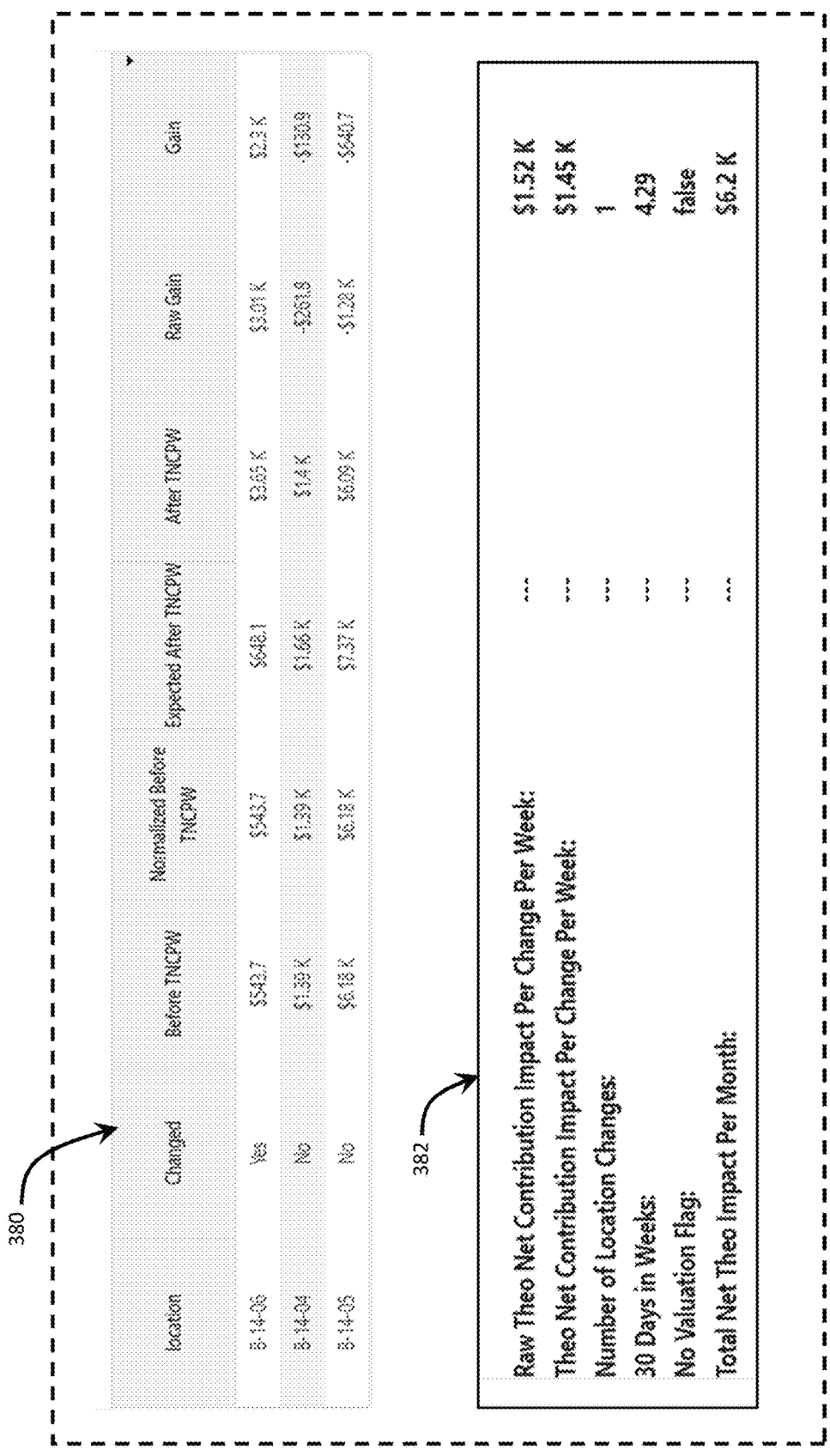
FIG. 32 is a set of tables that display additional output (including total net theo impact per month) related to the gaming deployment change illustrated in FIG. 29, such set of tables being generated through execution of the graphic generator of the change monitoring system.

In an embodiment, the valuation algorithm is usable to produce and output the Theo Net Contribution Impact Per Change Per Week (TNCPW). As illustrated in FIG. 32, the graphic generator 198 is configured to generate a table 380 that indicates, for each of the locations B-14-06, B-14-04, and B-14-05, a yes/no change indicator, a before TNCPW value, a normalized before TNCPW value, an expected after TNCPW, a raw gain, and a gain. The table 382 displays a sum of the gains from the table 380, yielding the Raw Theo Net Contribution Impact Per Change Per Week. By subtracting the absolute value of estimated zone loss into subzone, the change monitoring system 20 produces the "Theo Net Contribution Impact Per Change Per Week."

In an embodiment, the change monitoring system logic 190, optimization factors 208, estimated impact values 200 and the other data received by the change monitoring system 20 over the data communication network 206 (including the reference gaming deployment data 133 and changed gaming deployment data 134) are configured and structured to be stored in a database. A processor, such as one of the system processors 202, can access such database over any suitable type of network, or the processor can access such database directly if the database and processor are parts of a single server unit, including a system server. In addition, network access devices operated by users can access such database over any suitable type of network. Depending upon the embodiment, the network can include one or more of the following: a wired network, a wireless network, a local area network (LAN), an extranet, an intranet, a wide area network (WAN) (including the Internet and the data communication network 206), a virtual private network (VPN), an interconnected data path across which multiple devices may communicate, a peer-to-peer network, a telephone network, portions of a telecommunications network for sending data through a variety of different communication protocols, a Bluetooth® communication network, a radio frequency (RF) data communication network, an infrared (IR) data communication network, a satellite communication network or a cellular communication network for sending and receiving data through short messaging service (SMS), multimedia messaging service (MMS), hypertext transfer protocol (HTTP), direct data connection, Wireless Application Protocol (WAP), email or any other suitable message transfer service or format.

In an embodiment, system processors 202 can include a data processor or a central processing unit (CPU). The data storage device 207 can include one or more data storage devices, including a database, a hard drive with a spinning magnetic disk, a Solid-State Drive (SSD), a floppy disk, an optical disk (including a CD or DVD), a Random Access Memory (RAM) device, a Read-Only Memory (ROM) device (including programmable read-only memory (PROM)), electrically erasable programmable read-only memory (EPROM), electrically erasable programmable read-only memory (EEPROM)), a magnetic card, an optical card, a flash memory device (including a USB key with non-volatile memory, any type of media suitable for storing electronic instructions or any other suitable type of computer-readable storage medium.

Users can use or operate any suitable input/output (I/O) device to transmit inputs that are directly or indirectly received by the system processors 202 and change monitoring system 20, including a personal computer (PC) (including a desktop PC, a laptop or a tablet), smart television, Internet-enabled TV, person digital assistant, smartphone, cellular phone, a mobile communication device, a smart speaker, an electronic microphone, a virtual reality headset, or an augmented reality headset. In one embodiment, such I/O device has at least one input device (including a touchscreen, a keyboard, a microphone, a sound sensor or a speech recognition device) and at least one output device (including a speaker, a display screen, a monitor or an LCD). In an embodiment, the change monitoring system 20 includes speech and sound generation logic that, when executed by one or more system processors 202, causes such I/O device to generate sounds and audible output that corresponds to (or is a text-to-speech conversion of) the textual, visual and graphical outputs generated by the system processors 202 based on the change monitoring system 20.

In an embodiment, the computer-readable instructions, formulas, algorithms, logic and programmatic structure of the change monitoring system logic 190 are implemented with any suitable programming or scripting language, including, but not limited to, C, C++, Java, COBOL, assembler, PERL, Visual Basic, SQL Stored Procedures, Extensible Markup Language (XML), Hadoop, "R," json, mapreduce, python, IBM SPSS, IBM Watson Analytics, IBM Watson and Tradeoff Analytics. The change monitoring system logic 190 can be implemented with any suitable combination of data structures, objects, processes, routines or other programming elements.

In an embodiment, the change monitoring system 20 includes one or more algorithms and related data libraries that are configured to perform random or pseudo-random functions, including random or pseudo-random processing of data to at least partially analyze or generate the output 236. Such algorithms can include heuristic logic having random functionality operable to approximate a global optimum or solution of a given function.

In an embodiment, the interfaces based on the change monitoring system logic 190 (including the graphic generator 198) can be Graphical User Interfaces (GUIs) structured based on a suitable programming language. Each GUI can include, in an embodiment, multiple windows, pulldown menus, popup elements, buttons, scroll bars, iconic images, wizards, mouse symbols or pointers, and other suitable graphical elements. In an embodiment, the GUI incorporates multimedia, including sound, voice, motion video and virtual reality interfaces to generate outputs based on the execution of the change monitoring system logic 190.

In an embodiment, the memory devices and data storage devices described above are non-transitory mediums that store or participate in providing instructions to a processor for execution. Such non-transitory mediums can take different forms, including non-volatile media and volatile media. Non-volatile media can include, for example, optical or magnetic disks, flash drives, and any of the storage devices in any computer. Volatile media can include dynamic memory, such as main memory of a computer. Forms of non-transitory computer-readable media therefore include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read programming code and/or data. Many of these forms of computer readable media may be involved in carrying one or more sequences of one or more instructions to a processor for execution. In contrast with non-transitory mediums, transitory physical transmission media can include coaxial cables, copper wire and fiber optics, including the wires that comprise a bus within a computer system, a carrier wave transporting data or instructions, and cables or links transporting such a carrier wave. Carrier-wave transmission media can take the form of electric or electromagnetic signals, or acoustic or light waves such as those generated during RF and IR data communications.

It should be appreciated that at least some of the subject matter disclosed herein includes or involves a plurality of steps or procedures that specify one or more methods. In an embodiment, some of the steps or procedures occur automatically as controlled by a processor or electrical controller. In another embodiment, some of the steps or procedures occur manually under the control of a human. In yet another embodiment, some of the steps or procedures occur semi-automatically as partially controlled by a processor or electrical controller and as partially controlled by a human.

As will be appreciated, aspects of the disclosed subject matter may be embodied as a system, method, or computer program product. Accordingly, aspects of the disclosed subject matter may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the disclosed subject matter may take the form of a computer program product embodied in one or more computer readable mediums having computer readable program code embodied thereon.

Aspects of the disclosed subject matter are described herein in terms of steps and functions with reference to flowchart illustrations and block diagrams of methods, apparatuses, systems and computer program products. It should be understood that each such step, function block of the flowchart illustrations and block diagrams, and combinations thereof, can be implemented by computer program instructions. These computer program instructions may be provided to a processor of any suitable computer or programmable data processing apparatus to produce a machine, such that the instructions, which execute via the processor of the computer or other programmable data processing apparatus, create results and output for implementing the functions described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions described herein.

Additional embodiments include any one of the embodiments described above, where one or more of its components, functionalities or structures is interchanged with, replaced by or augmented by one or more of the components, functionalities or structures of a different embodiment described above. As indicated above, U.S. patent application Ser. No. 17/569,848, filed on Jan. 6, 2022, is incorporated herein by reference. In an embodiment, the change monitoring system 20 or any method, algorithm or concept described herein is a part of one or more of the systems, methods, logic, algorithms, instructions, datasets, devices or concepts disclosed in such application, resulting in a combinatory system, method, logic, algorithm, instruction set, dataset, device or concept.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed

The invention claimed is:

1. A gaming environment monitoring system comprising:
a data storage device comprising a plurality of machine-readable instructions executable to direct at least one processor to:
access reference gaming deployment data based on an electronic communication between the at least one processor and at least one other processor that is associated with a gaming environment, wherein:
the reference gaming deployment data is related to one or more gaming units that have been operated in a plurality of subzones within one or more zones of the gaming environment, wherein each of the gaming units is configured to exhibit a featured game; and
the one or more gaming units correspond to a reference gaming deployment in the gaming environment during a first period;
detect changed gaming deployment data based on the electronic communication with the at least one other processor, wherein:
the changed gaming deployment data is related to at least one change to the reference gaming deployment;
the at least one change has resulted in a changed gaming deployment; and
the changed gaming deployment has been implemented in the gaming environment during a second period after the first period;
detect whether the at least one change caused an occurrence of a cross-subzone event, wherein the cross-subzone event comprises a first change and a second change, wherein:
the first change comprises at least one of:
(a) a first movement of one or more of the gaming units from a first subzone of the subzones to a second subzone of the subzones; or
(b) a first deactivation of a first featured game of one or more of the gaming units of the first subzone, and a first activation of the first featured game for one or more of the gaming units of the second subzone; and
the second change comprises at least one of:
(a) a second movement of one or more of the gaming units from the second subzone to the first subzone; or
(b) a second deactivation of a second featured game of one or more of the gaming units of the second subzone, and a second activation of the second featured game for one or more of the gaming units of the first subzone; and
generate a common group identification depending on the occurrence of the cross-subzone event, wherein the common group identification correlates the first subzone involved in the cross-subzone event with the second subzone involved in the cross-subzone event; and
at least one graphical user interface configured in accordance with the machine-readable instructions, wherein the at least one graphical user interface is displayable by an output device operatively coupled to the at least one processor, wherein the at least one graphical user interface comprises a floor-change representation related to the cross-subzone event, wherein the floor-change representation comprises:
a first subzone indication that identifies the first subzone;
a second subzone indication that identifies the second subzone;
a first quantity indication that indicates a first quantity of one or more of the featured games that, due to the cross-subzone event, were either: (a) moved, as part of one or more of the gaming units, from the first subzone to the second subzone; or (b) deactivated in any of the gaming units of the first subzone, and activated in any of the gaming units of the second subzone; and
a second quantity indication that indicates a second quantity of one or more of the featured games that, due to the cross-subzone event, were either: (a) moved, as part of one or more of the gaming units, from the second subzone to the first subzone; or (b) deactivated in any of the gaming units of the second subzone, and activated in any of the gaming units of the first subzone.

2. The gaming environment monitoring system of claim 1, wherein:
the data storage device comprises a non-transitory medium that stores the machine-readable instructions;
the machine-readable instructions are configured to program the at least one processor;
the floor-change representation comprises one of a diagram or a map;
the machine-readable instructions are executable to direct the at least one processor to automatically perform the detecting of the changed gaming deployment data; and
the machine-readable instructions are executable to direct the at least one processor to automatically perform the detecting of whether the at least one change caused the cross-subzone event.

3. The gaming environment monitoring system of claim 1, wherein the machine-readable instructions are configured to be executed to direct the at least one processor to display a popup image in response to receiving an input in association with a graphical element that comprises one of the first subzone indication, the second subzone indication, or one of the gaming units of the first or second subzones, wherein the popup image is located within the graphical user interface.

4. The gaming environment monitoring system of claim 1, wherein the floor-change representation comprises a line extending from the first subzone indication to the second subzone indication.

5. The gaming environment monitoring system of claim 4, wherein the line comprises a dotted format.

6. The gaming environment monitoring system of claim 1, wherein:
the floor-change representation comprises at least part of a floor map; and
the graphical user interface comprises at least one linking symbol, wherein the at least one linking symbol illustrates a relationship between the first subzone and the second subzone.

7. The gaming environment monitoring system of claim 1, wherein:
the floor-change representation comprises at least part of a floor map;
the first subzone indication extends at least partially along a first vertical axis, wherein the first vertical axis extends along the part of the floor map;

the second subzone indication extends at least partially along a second vertical axis, wherein the second vertical axis extends along the part of the floor map;

the second vertical axis is spaced apart from the first vertical axis; and at least one of the first quantity indication and the second quantity indication is located between the first and second vertical axes.

8. The gaming environment monitoring system of claim 1, wherein the graphical user interface comprises a window that overlays part of the floor-change representation, wherein the window comprises information other than the first and second quantities, wherein the information relates to one of: the first subzone, the second subzone, or any one of the gaming units of the first or second subzones.

9. The gaming environment monitoring system of claim 6, wherein the at least one linking symbol comprises a line.

10. The gaming environment monitoring system of claim 9, wherein the line comprises an arrowhead.

11. The gaming environment monitoring system of claim 1, wherein:

the floor-change representation comprises at least part of a floor map of the gaming environment;

the first subzone indication comprises a first subzone symbol;

the second subzone indication comprises a second subzone symbol; and the first quantity indication and the second quantity indication each comprise one of text or a numeral.

12. The gaming environment monitoring system of claim 1, wherein the instructions are executable to direct the at least one processor to change the graphical user interface in response to one or more inputs from a user.

13. A gaming environment monitoring system comprising:

a data storage device comprising a plurality of instructions executable to direct one or more processors to:

access reference gaming deployment data based on an electronic communication between the one or more processors and at least one other processor that is associated with a gaming environment, wherein:

the reference gaming deployment data is related to one or more gaming units that have been operated in a plurality of subzones within one or more zones of the gaming environment, wherein each of the gaming units is configured to exhibit a featured game; and the one or more gaming units correspond to a reference gaming deployment in the gaming environment during a first period;

detect changed gaming deployment data based on the electronic communication with the at least one other processor, wherein:

the changed gaming deployment data is related to at least one change to the reference gaming deployment;

the at least one change has resulted in a changed gaming deployment; and the changed gaming deployment has been implemented in the gaming environment during a second period after the first period;

detect whether the at least one change caused an occurrence of a cross-subzone event, wherein the cross-subzone event comprises:

a first removal of one or more of the featured games from a first subzone of the subzones, and a first provision of the one or more featured games in a second subzone of the subzones; and a second removal of one or more of the featured games from a second subzone of the subzones, and a second provision of the one or more featured games in the first subzone of the subzones;

generate a common group identification depending on the occurrence of the cross-subzone event, wherein the common group identification correlates the first subzone involved in the cross-subzone event with the second subzone involved in the cross-subzone event; and at least one graphical user interface configured in accordance with the instructions, wherein the at least one graphical user interface is displayable by an output device operatively coupled to the one or more processors, wherein the at least one graphical user interface comprises:

at least a portion of a floor map, wherein the portion is related to the cross-subzone event;

a first subzone indication that identifies the first subzone;

a second subzone indication that identifies the second subzone;

a first quantity indication that indicates a first quantity of the one or more of the featured games that have been removed from the first subzone and provided in the second subzone based on the cross-subzone event; and a second quantity indication that indicates a second quantity of the one or more of the featured games that have been removed from the second subzone and provided in the first subzone based on the cross-subzone event.

14. The gaming environment monitoring system of claim 13, wherein:

the floor map describes one or more floors of the gaming environment;

the first subzone indication comprises a first subzone symbol;

the second subzone indication comprises a second subzone symbol;

the first quantity indication and the second quantity indication each comprise one of text or a numeral;

the instructions are executable to direct the one or more processors to automatically perform the detecting of the changed gaming deployment data; and the instructions are executable to direct the one or more processors to automatically perform the detecting of whether the at least one change caused the cross-subzone event.

15. The gaming environment monitoring system of claim 14, wherein the graphical user interface comprises at least one linking symbol, wherein the at least one linking symbol illustrates a relationship between the first subzone and the second subzone; and the first removal, the second removal, the first provision, and the second provision each comprises one of: (a) a physical movement of one or more of the gaming units from one of the subzones to another one of the subzones; or (b) a deactivation of one or more of the featured games of one or more of the gaming units at one of the subzones, and an activation of the one or more of the featured games in one or more of the gaming units at a different one of the subzones.

16. The gaming environment monitoring system of claim 13, wherein the graphical user interface comprises a line extending from the first subzone indication to the second subzone indication, wherein the line comprises one of a solid format or a dotted format.

17. The gaming environment monitoring system of claim 13, wherein:
the first subzone indication extends at least partially along a first vertical axis, wherein the first vertical axis extends along the portion of the floor map;
the second subzone indication extends at least partially along a second vertical axis, wherein the second vertical axis extends along the portion of the floor map;
the second vertical axis is spaced apart from the first vertical axis; and
at least one of the first quantity indication and the second quantity indications is at least partially located between the first and second vertical axes.

18. A method of operation of a gaming environment monitoring system, wherein the method comprises:
processing of machine-readable instructions by one or more processors to:
access reference gaming deployment data based on an electronic communication between the one or more processors and at least one other processor that is associated with a gaming environment, wherein:
the reference gaming deployment data is related to one or more gaming units that have been operated in a plurality of subzones within one or more zones of the gaming environment, wherein each of the gaming units is configured to exhibit a featured game; and
the one or more gaming units correspond to a reference gaming deployment in the gaming environment during a first period;
detect changed gaming deployment data based on the electronic communication with the at least one other processor, wherein:
the changed gaming deployment data is related to at least one change to the reference gaming deployment, wherein the at least one change involves moving a plurality of the gaming units within the gaming environment;
the at least one change has resulted in a changed gaming deployment; and
the changed gaming deployment has been implemented in the gaming environment during a second period after the first period;
detect whether the at least one change caused an occurrence of a cross-subzone event, wherein the cross-subzone event comprises:
a first removal of one or more of the featured games from a first subzone of the subzones, and a first provision of the one or more featured games in a second subzone of the subzones; and
a second removal of one or more of the featured games from a second subzone of the subzones, and a second provision of the one or more featured games in the first subzone of the subzones;
generate a common group identification depending on the occurrence of the cross-subzone event, wherein the common group identification correlates the first subzone involved in the cross-subzone event with the second subzone involved in the cross-subzone event; and
generate at least one graphical user interface that comprises:
at least a portion of a floor map related to the gaming environment, wherein the portion is related to the cross-subzone event;
a first subzone indication that identifies the first subzone;
a second subzone indication that identifies the second subzone;
a first quantity indication that indicates a first quantity of the one or more of the featured games that have been removed from the first subzone and provided in the second subzone based on the cross-subzone event; and
a second quantity indication that indicates a second quantity of the one or more of the featured games that have been removed from the second subzone and provided in the first subzone based on the cross-subzone event.

19. The method of claim 18, wherein:
the floor map describes one or more floors of the gaming environment;
the first subzone indication comprises a first subzone symbol;
the second subzone indication comprises a second subzone symbol; and
the first quantity indication and the second quantity indication each comprise one of text or a numeral.

20. The method of claim 18, wherein:
the graphical user interface comprises at least one linking symbol, wherein the at least one linking symbol illustrates a relationship between the first subzone and the second subzone;
the first subzone indication extends at least partially along a first vertical axis, wherein the first vertical axis extends along the portion of the floor map;
the second subzone indication extends at least partially along a second vertical axis, wherein the second vertical axis extends along the portion of the floor map;
the second vertical axis is spaced apart from the first vertical axis; and
at least one of the first quantity indication and the second quantity indication is at least partially located between the first and second vertical axes.

* * * * *